United States Patent
Guo et al.

(10) Patent No.: US 10,312,780 B2
(45) Date of Patent: Jun. 4, 2019

(54) DOUBLE-ROTOR SWITCHED RELUCTANCE MACHINE WITH SEGMENTED ROTORS

(71) Applicant: McMaster University, Hamilton (CA)

(72) Inventors: Teng Guo, Hamilton (CA); Nigel Schofield, Hamilton (CA); Ali Emadi, Burlington (CA)

(73) Assignee: McMaster University, Hamilton (CA)

( * ) Notice: Subject to any disclaimer, the term of this patent is extended or adjusted under 35 U.S.C. 154(b) by 303 days.

(21) Appl. No.: 14/918,800

(22) Filed: Oct. 21, 2015

(65) Prior Publication Data

US 2017/0117784 A1    Apr. 27, 2017

(51) Int. Cl.
| | |
|---|---|
| H02K 16/02 | (2006.01) |
| H02K 3/00 | (2006.01) |
| H02K 1/24 | (2006.01) |
| H02K 15/02 | (2006.01) |

(52) U.S. Cl.
CPC ............. *H02K 16/02* (2013.01); *H02K 1/246* (2013.01); *H02K 15/02* (2013.01)

(58) Field of Classification Search
CPC ............ H02K 1/14; H02K 1/146; H02K 1/24; H02K 1/246; H02K 3/12; H02K 3/24; H02K 7/00; H02K 7/006; H02K 7/18; H02K 7/181; H02K 7/1815; H02K 9/22; H02K 15/02; H02K 16/02; H02K 16/04; H02K 19/02; H02K 19/103; H02K 19/12; H02K 9/19; H02K 19/20; H02K 19/24; H02K 19/32; H02K 21/12; H02K 21/22; H02K 21/222; H02K 21/44
See application file for complete search history.

(56) References Cited

U.S. PATENT DOCUMENTS

| | | | |
|---|---|---|---|
| 5,053,666 A | * | 10/1991 | Kliman .................... H02K 9/19 |
| | | | 310/216.075 |
| 5,386,162 A | | 1/1995 | Horst |
| 5,936,373 A | | 8/1999 | Li et al. |
| 5,973,462 A | | 10/1999 | Kalpathi et al. |
| 5,986,418 A | | 11/1999 | Horst et al. |

(Continued)

FOREIGN PATENT DOCUMENTS

JP          07163105 A  *  6/1995  ............. H02K 16/02

*Primary Examiner* — Tran N Nguyen
(74) *Attorney, Agent, or Firm* — Bereskin & Parr LLP/S.E.N.C.R.L, S.R.L.; Stephen M. Beney; Reshika Dhir

(57) ABSTRACT

Various embodiments are described herein for a double-rotor switched reluctance machine with segmented rotors. In one example embodiment, the double-rotor switched reluctance machine comprises an interior rotor, an exterior rotor spaced from the interior rotor and concentrically disposed outside the interior rotor, and at least one stator disposed concentrically with the interior rotor and the exterior rotor. The interior rotor, the exterior rotor and the at least one stator are disposed within one machine set to provide an interior switched reluctance machine and an exterior switched reluctance machine. In the various embodiments described herein, at least one of the interior rotor and the exterior rotor comprises an array of magnetically isolated segments and filler segments. The interior switched reluctance machine and the exterior switched reluctance machine can operate as two motors, two generators, or a motor and a generator simultaneously.

20 Claims, 28 Drawing Sheets

(56) References Cited

U.S. PATENT DOCUMENTS

| | | | |
|---|---|---|---|
| 6,257,027 B1* | 7/2001 | Imai | D06F 37/304 |
| | | | 68/12.12 |
| 6,495,941 B1* | 12/2002 | Nishimura | F02N 11/04 |
| | | | 310/168 |
| 7,205,694 B2* | 4/2007 | Mecrow | H02K 19/103 |
| | | | 310/168 |
| 7,466,053 B1 | 12/2008 | Radev | |
| 2003/0102764 A1* | 6/2003 | Kusase | H02K 1/27 |
| | | | 310/266 |
| 2008/0142284 A1* | 6/2008 | Qu | B60K 17/145 |
| | | | 180/65.6 |
| 2008/0238236 A1* | 10/2008 | El-Refaie | H02K 19/103 |
| | | | 310/166 |
| 2011/0316366 A1 | 12/2011 | Abbasian et al. | |
| 2013/0057091 A1* | 3/2013 | Kim | H02K 21/44 |
| | | | 310/46 |
| 2014/0031168 A1 | 1/2014 | Yang et al. | |
| 2014/0111038 A1 | 4/2014 | Yang et al. | |

* cited by examiner

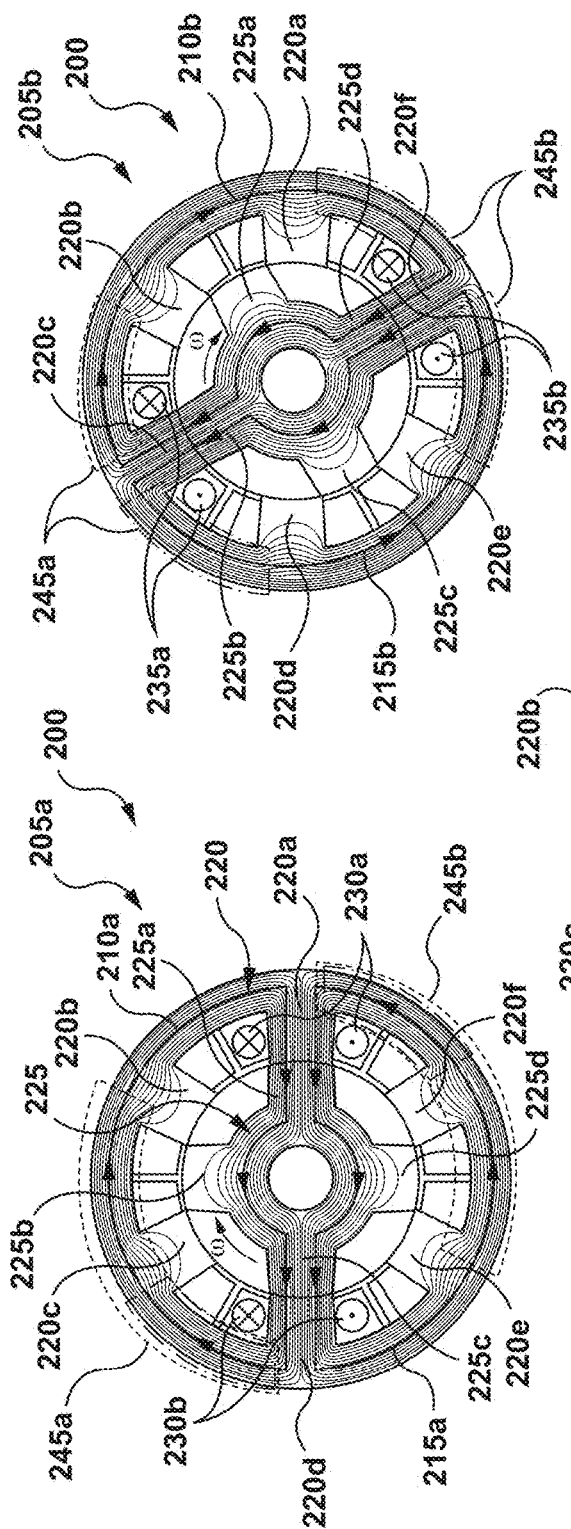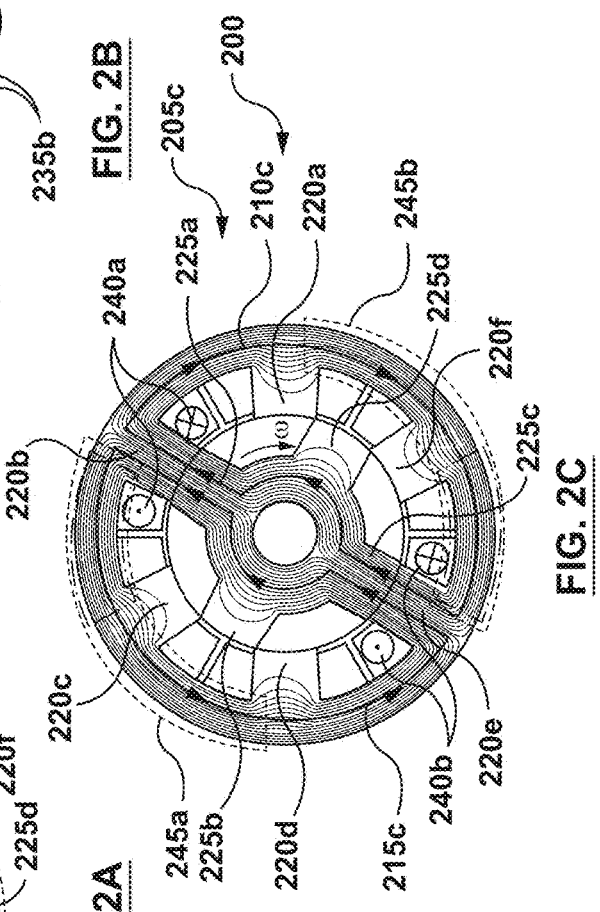
FIG. 2A
FIG. 2B
FIG. 2C

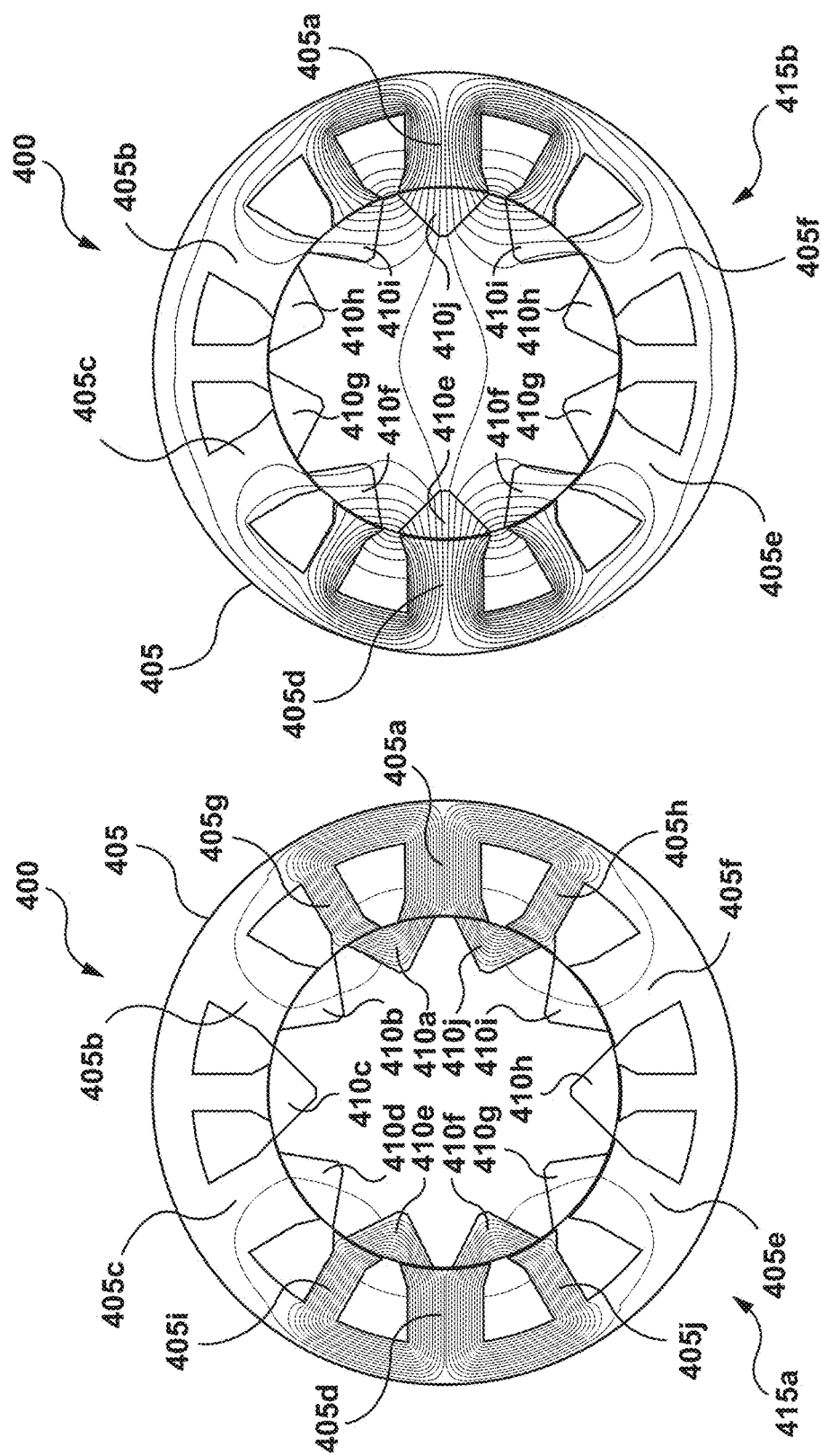

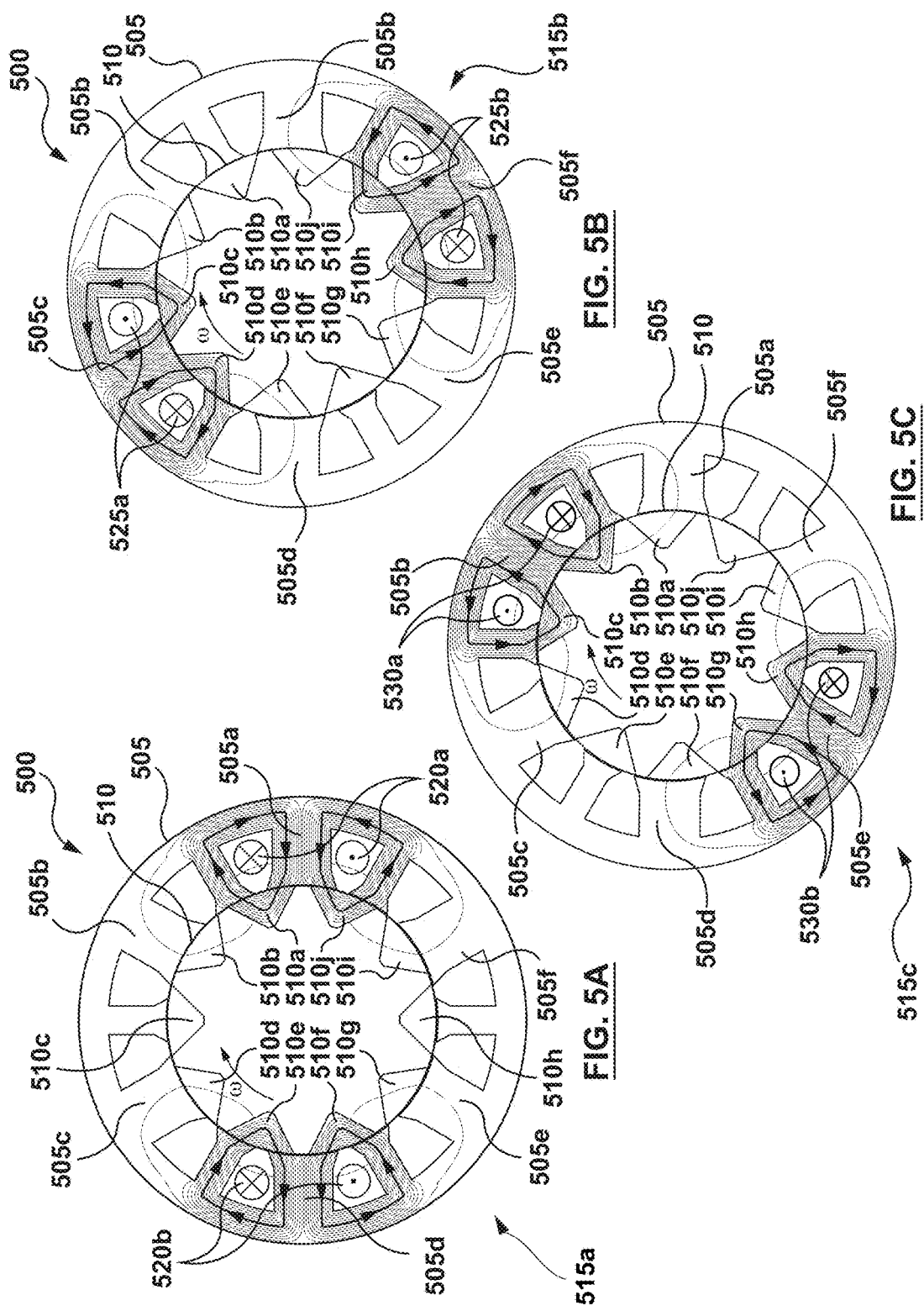

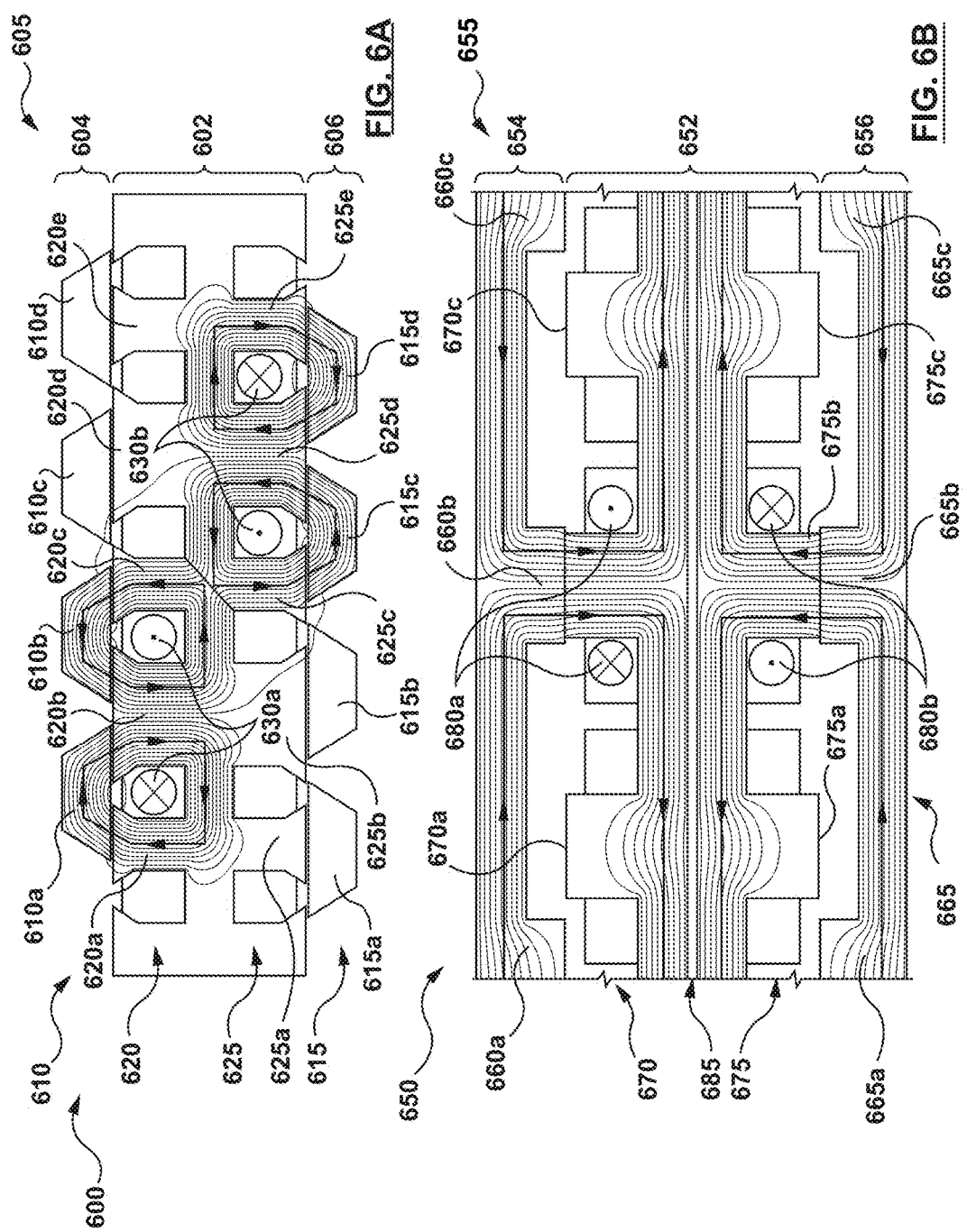

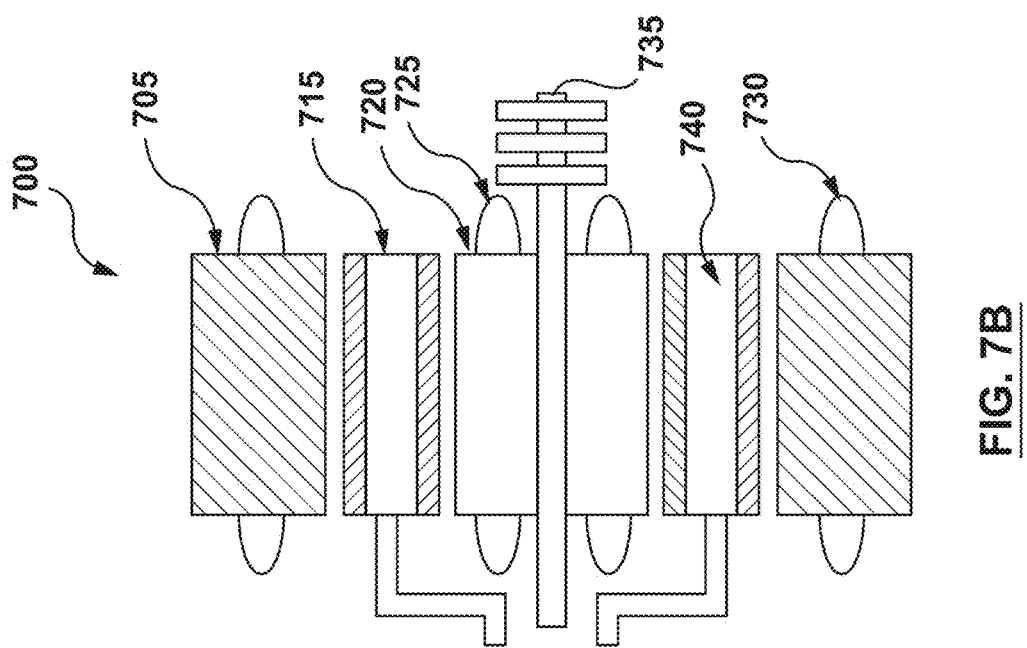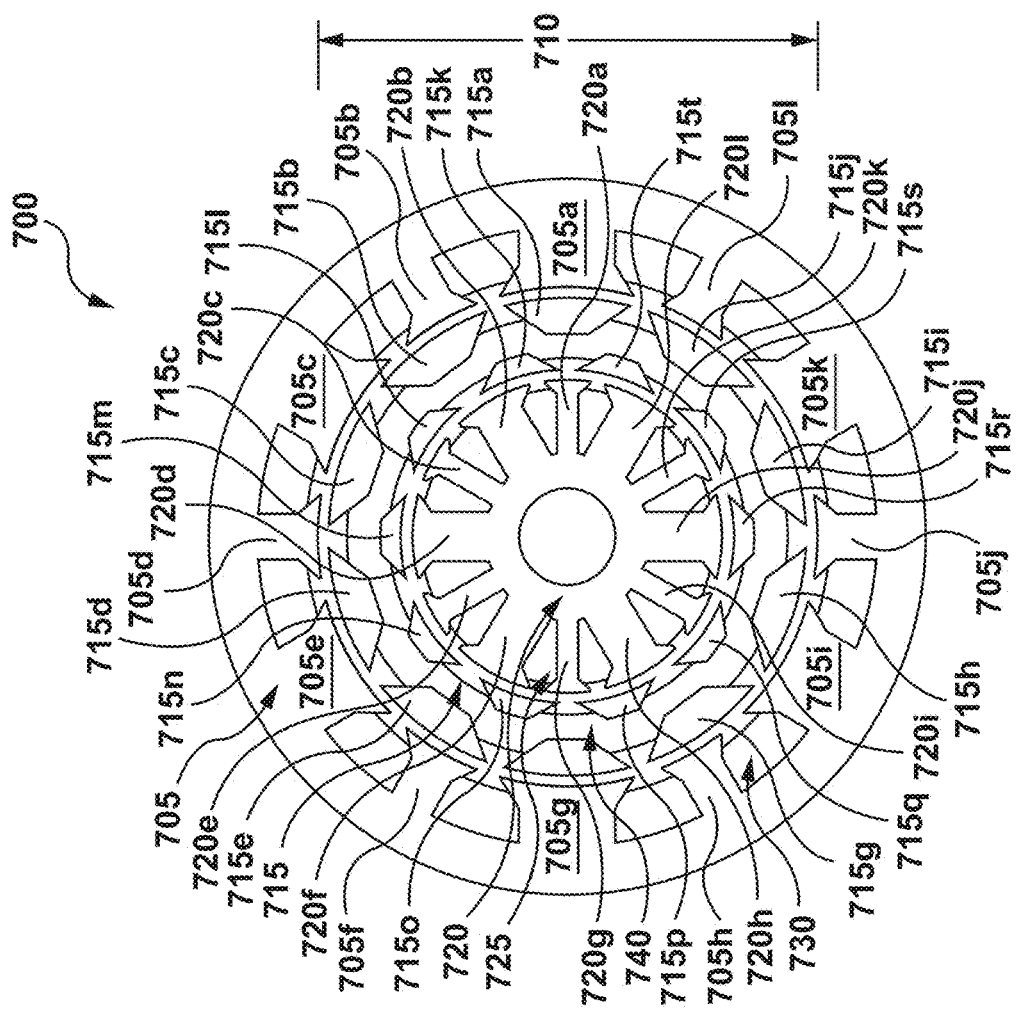

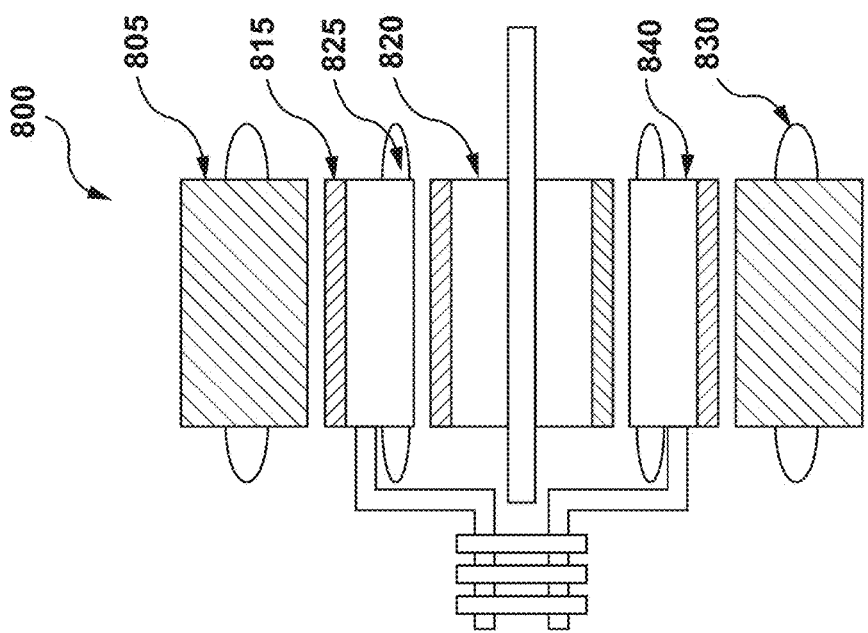
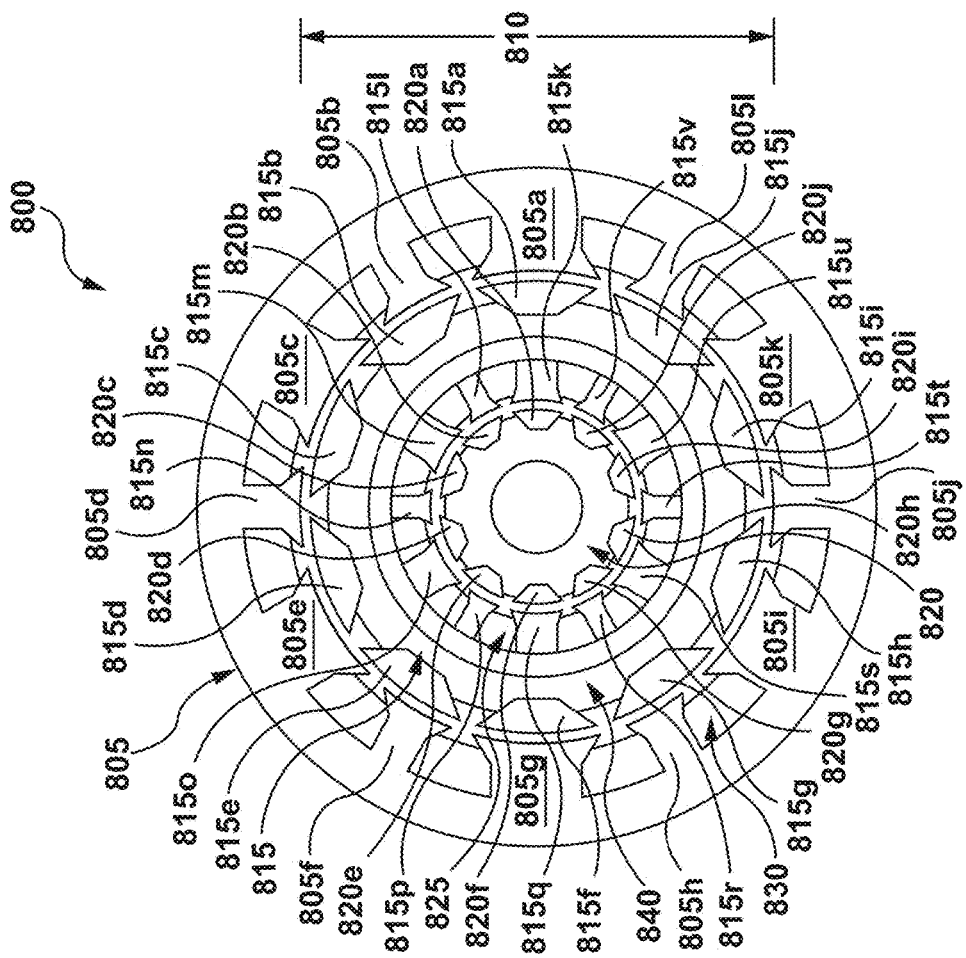

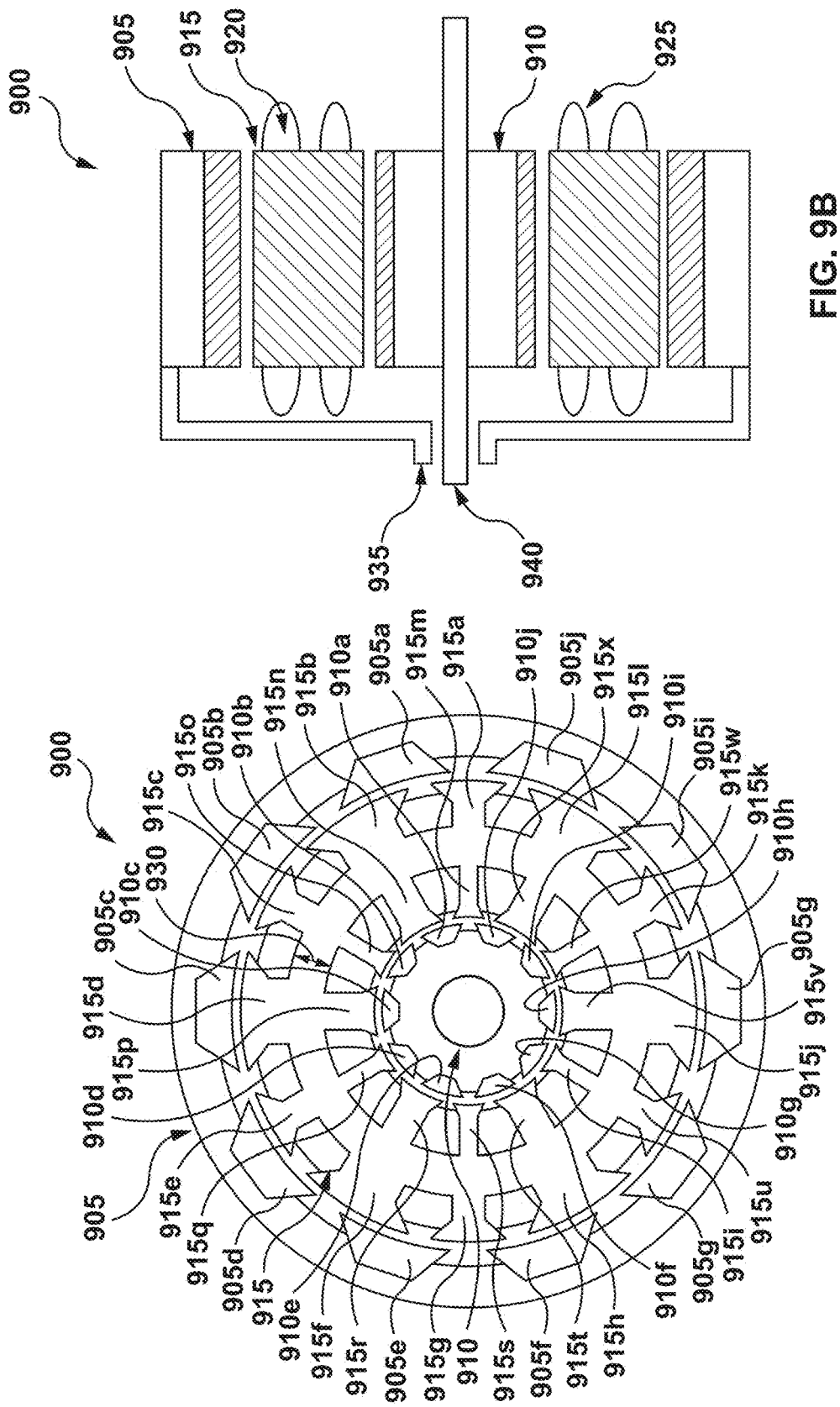

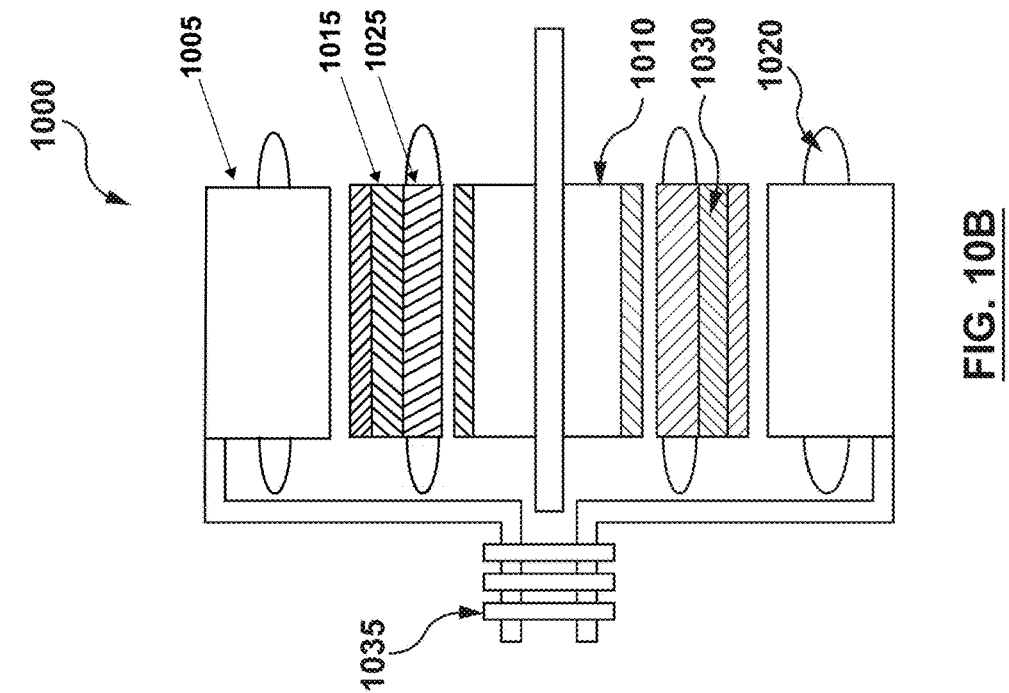
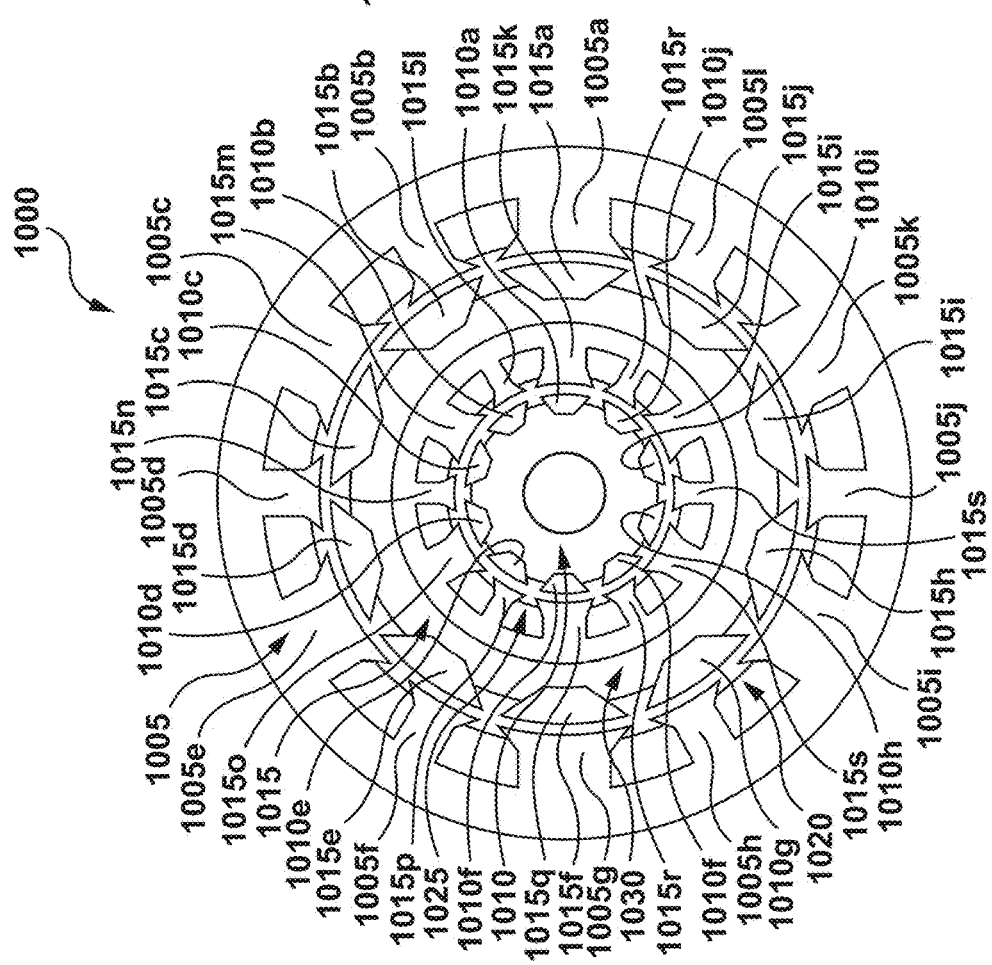

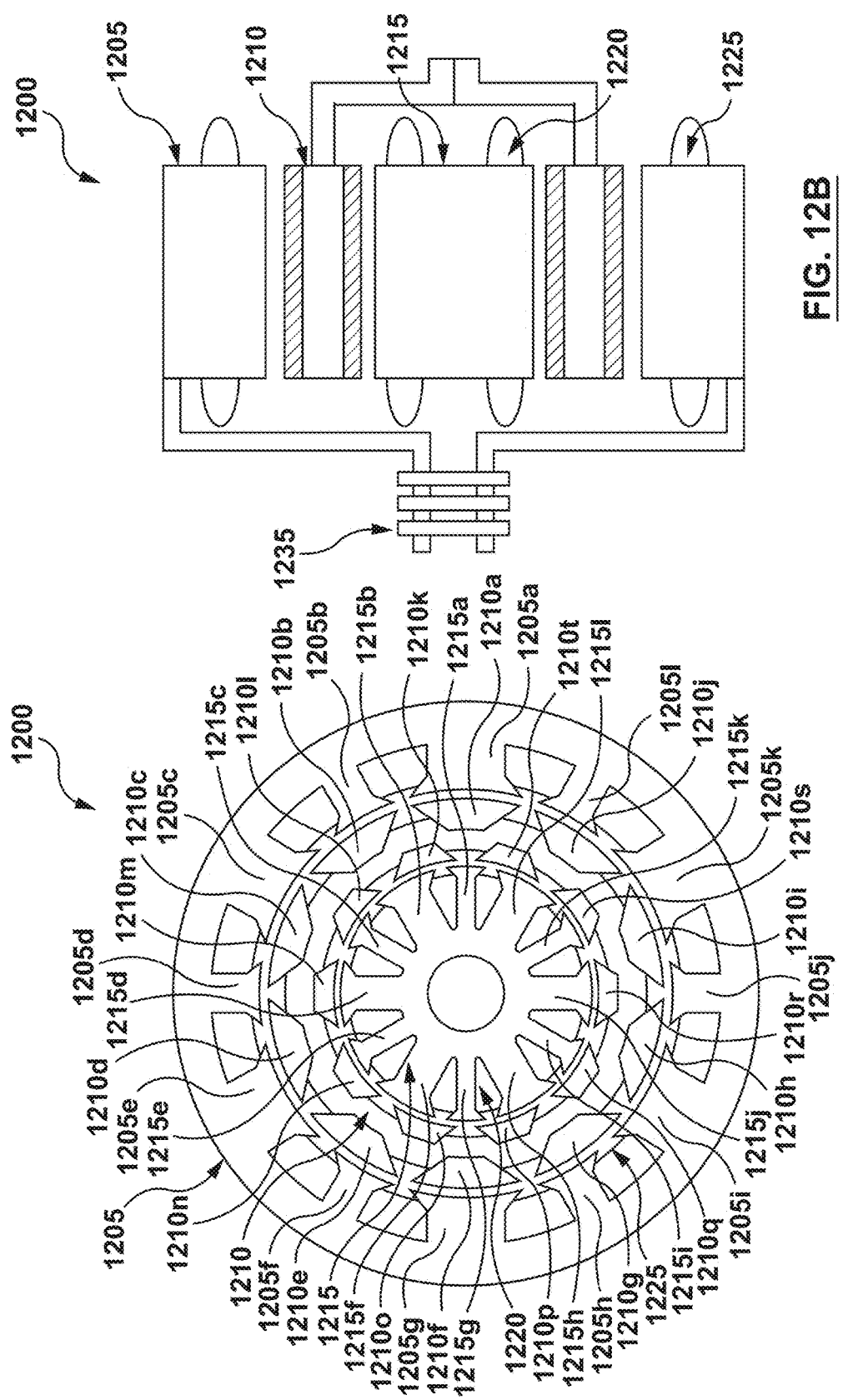

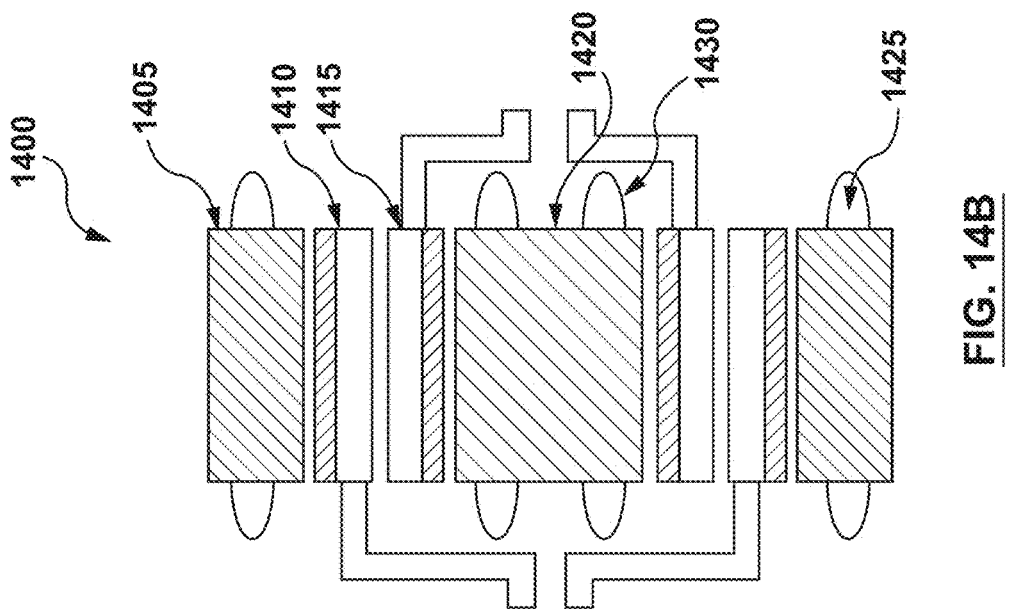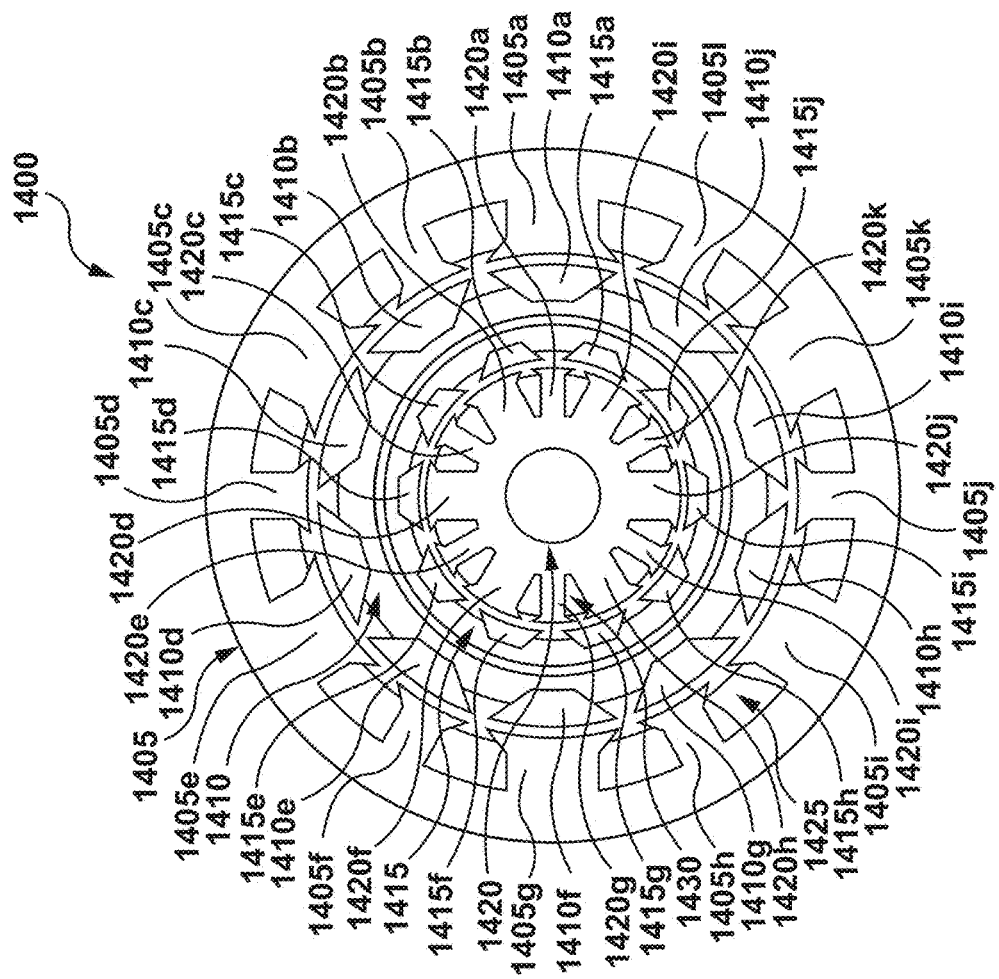

DOUBLE-ROTOR SWITCHED RELUCTANCE MACHINE WITH SEGMENTED ROTORS

TECHNICAL FIELD

The described embodiments relate to a double-rotor switched reluctance machine, and in particular, to a double-rotor switched reluctance machine with segmented rotors.

BACKGROUND

Electric machines have been applied as motors and generators in a wide range of industries for more than a century. A reluctance machine is an electric machine in which torque is produced by the tendency of the movable part of the machine to move into a position where the inductance of an excited winding is maximized. A switched reluctance machine is a type of a reluctance machine where the windings are energized as a function of the position of the movable part of the machine.

Conventional switched reluctance machines typically include one stator and one rotor, where the stator includes windings on the stator teeth to generate electromagnetic field and the rotor in the electromagnetic field has the tendency to align with the stator to achieve maximum inductance. The rotor rotates as long as the stator excitation switches successfully.

However, conventional switched reluctance machines often suffer from various disadvantages, such as, high torque ripple, low torque density, vibration, acoustic noise, bulkiness, increased manufacturing costs, poor reliability and and/or poor performance.

SUMMARY

In one aspect, at least one embodiment described herein provides a switched reluctance machine comprising: an interior rotor; an exterior rotor spaced from the interior rotor, the interior rotor and the exterior rotor being concentrically disposed; and at least one stator disposed concentrically with the interior rotor and the exterior rotor, wherein the interior rotor, the exterior rotor and the at least one stator are configured to provide an interior switched reluctance machine and an exterior switched reluctance machine, and wherein at least one of the interior rotor and the exterior rotor comprises an array of magnetically isolated segments and filler segments.

In various embodiments, the filler segments are manufactured using a magnetic non-conductive material.

In various embodiments, the magnetically isolated segments are manufactured using a magnetic conductive material.

In various embodiments, the magnetic conductive material comprises electrical steel.

In at least one embodiment, the at least one stator is located between the exterior rotor and the interior rotor and comprises a stator yoke and a plurality of exterior stator poles and a plurality of interior stator poles, and wherein the interior rotor and the exterior rotor comprise the array of magnetically isolated segments and filler segments.

In some embodiments, the at least one stator has an exterior side comprising the plurality of exterior stator poles and an interior side comprising the plurality of interior stator poles. In this embodiment, the exterior switched reluctance machine comprises the exterior rotor and the exterior side of the stator, and the interior switched reluctance machine comprises the interior side of the stator and the interior rotor.

In some embodiments, at least some of the exterior stator poles comprise coil windings for generating a magnetic field, and the exterior rotor rotates to align with the magnetic field providing a motor operation in the exterior switched reluctance machine.

In some embodiments, at least some of the interior stator poles comprise coil windings for generating a magnetic field, and the interior rotor rotates to align with the magnetic field providing a motor operation in the interior switched reluctance machine.

In various embodiments, the flux paths of the exterior switched reluctance machine and the interior switched reluctance machine share the stator yoke of the at least one stator.

In various embodiments, the interior switched reluctance machine and the exterior switched reluctance machine have a same number of phases.

In various embodiments, a number of exterior stator poles comprising coil windings to generate a magnetic field is same as a number of interior stator poles comprising coil windings to generate a magnetic field.

In various embodiments, each phase of the interior switched reluctance machine and a corresponding phase of the exterior switched reluctance machine have same winding polarity.

In various embodiments, the polarities of adjacent coil windings in each of the interior switched reluctance machine and the exterior switched reluctance machine are opposite.

In at least one embodiment, the at least one stator is located outside the exterior rotor and comprises a plurality of stator poles, wherein the interior rotor comprises a plurality of interior rotor poles, and wherein the exterior rotor comprises the array of magnetically isolated segments and filler segments. In some embodiments, the exterior rotor has an exterior side comprising a first set of magnetically isolated segments and an interior side comprising a second set of magnetically isolated segments.

In at least one embodiment, the at least one stator is located outside the exterior rotor and comprises a plurality of stator poles, wherein both the interior rotor and the exterior rotor comprise the array of magnetically isolated segments and filler segments, and wherein the exterior rotor further comprises a plurality of exterior rotor poles. In some embodiments, the exterior rotor has an exterior side comprising the array of magnetically isolated segments and an interior side comprising the plurality of exterior rotor poles.

In at least one embodiment, the at least one stator is located between the exterior rotor and the interior rotor and comprises a plurality of stator poles, wherein both the at least one stator and the interior rotor comprise the array of magnetically isolated segments and filler segments, and wherein the exterior rotor comprises a plurality of exterior rotor poles. In some embodiments, the at least one stator has an exterior side comprising the array of magnetically isolated segments and an interior side comprising the plurality of stator poles.

In at least one embodiment, the at least one stator is located between the exterior rotor and the interior rotor and comprises a plurality of stator poles, wherein both the exterior rotor and the at least one stator comprise the array of magnetically isolated segments and filler segments, and wherein the interior rotor comprises a plurality of interior rotor poles. In some embodiments, the at least one stator has an exterior side comprising the plurality of stator poles and an interior side comprising the array of magnetically isolated segments.

In at least one embodiment, the interior rotor is located between the exterior rotor and the at least one stator, wherein the exterior rotor comprises a plurality of exterior rotor poles, wherein the at least one stator comprises a plurality of stator poles, and wherein the interior rotor comprises the array of magnetically isolated segments and filler segments. In some embodiments, the interior rotor has an exterior side comprising a first set of magnetically isolated segments and an interior side comprising a second set of magnetically isolated segments.

In at least one embodiment, the interior rotor is located between the exterior rotor and the at least one stator, wherein the exterior rotor comprises the array of magnetically isolated segments and filler segments, wherein the at least one stator comprises a plurality of stator poles, and wherein the interior rotor comprises a plurality of interior rotor poles and the array of magnetically isolated segments and filler segments. In some embodiments, the interior rotor has an exterior side comprising the plurality of interior rotor poles and an interior side comprising the array of magnetically isolated segments.

In at least one embodiment, the at least one stator comprises an exterior stator and an interior stator, the exterior stator being spaced from the interior stator, the exterior stator and the interior stator being concentrically disposed with the interior rotor and the exterior rotor. In some embodiments, the exterior rotor is located between the exterior stator and the interior rotor and the interior rotor is located outside the interior stator, wherein the exterior stator comprises a plurality of exterior stator poles, wherein the interior stator comprises a plurality of interior stator poles, wherein the exterior rotor and the interior rotor comprise the array of magnetically isolated segments and filler segments. In some further embodiments, the switched reluctance machine comprises an air gap between the exterior rotor and the interior rotor.

In various embodiments, an unaligned magnetic flux pattern is formed when a magnetically isolated segment from the array aligns with a stator pole, the stator pole being wound by an energized coil winding.

In various embodiments, an aligned magnetic flux pattern is formed when a magnetically isolated segment from the array spans over two adjacent stator poles, wherein one of the two adjacent stator poles is wound by an energized coil winding. In some embodiments, the aligned magnetic flux pattern is formed in a segment of the at least one stator, wherein the segment is less than half of the circumference of the at least one stator.

In another aspect, in at least one embodiment described herein, there is provided a method of manufacturing a switched reluctance machine, the method comprising: providing an interior rotor; disposing an exterior rotor spaced from the interior rotor, the exterior rotor being concentrically disposed; and disposing at least one stator concentrically with the interior rotor and the exterior rotor, providing an array of magnetically isolated segments and filler segments in the at least one of the interior rotor and the exterior rotor, the interior rotor, the exterior rotor and the at least one stator being configured to provide an interior switched reluctance machine and an exterior switched reluctance machine.

In various embodiments, the filler segments are manufactured using a magnetic non-conductive material.

In various embodiments, the magnetically isolated segments are manufactured using a magnetic conductive material. In some embodiments, the magnetic conductive material comprises electrical steel.

In at least one embodiment, the method comprises disposing the at least one stator between the exterior rotor and the interior rotor, the at least one stator comprising a stator yoke and a plurality of exterior stator poles and a plurality of interior stator poles, and the method further comprising providing the array of magnetically isolated segments and filler segments in the interior rotor and the exterior rotor.

In some embodiments, the at least one stator has an exterior side comprising the plurality of exterior stator poles and an interior side comprising the plurality of interior stator poles, and wherein the exterior switched reluctance machine comprises the exterior rotor and the exterior side of the stator, and the interior switched reluctance machine comprises the interior side of the stator and the interior rotor.

In some embodiments, the method further comprises providing coil windings in the at least some of the exterior stator poles for generating a magnetic field, wherein the exterior rotor rotates to align with the magnetic field providing a motor operation in the exterior switched reluctance machine.

In some embodiments, the method further comprises providing coil windings in the at least some of the interior stator poles for generating a magnetic field, wherein the interior rotor rotates to align with the magnetic field providing a motor operation in the interior switched reluctance machine.

In various embodiments, the flux paths of the exterior switched reluctance machine and the interior switched reluctance machine share the stator yoke of the at least one stator.

In some embodiments, the method further comprises providing a same number of phases to the interior switched reluctance machine and the exterior switched reluctance machine.

In some embodiments, the method further comprises providing coil windings to generate a magnetic field to a same number of exterior stator poles and interior stator poles.

In some embodiments, the method further comprises providing a same winding polarity to all phases of the interior switched reluctance machine and corresponding phases of the exterior switched reluctance machine.

In some embodiments, the method further comprises providing opposite winding polarity to adjacent coil windings in each of the interior switched reluctance machine and the exterior switched reluctance machine.

In at least one embodiment, the method further comprises disposing the at least one stator outside the exterior rotor, wherein the at least one stator comprises a plurality of stator poles, and the interior rotor comprises a plurality of interior rotor poles, and the method further comprising providing the array of magnetically isolated segments and filler segments in the exterior rotor. In various embodiments, the exterior rotor has an exterior side comprising a first set of magnetically isolated segments and an interior side comprising a second set of magnetically isolated segments.

In at least one embodiment, the method further comprises disposing the at least one stator outside the exterior rotor, wherein the at least one stator comprises a plurality of stator poles, and the exterior rotor comprises a plurality of exterior rotor poles, and the method further comprising providing the array of magnetically isolated segments and filler segments in both the interior rotor and the exterior rotor. In various embodiments, the exterior rotor has an exterior side comprising the array of magnetically isolated segments and an interior side comprising the plurality of exterior rotor poles.

In at least one embodiment, the method further comprises disposing the at least one stator between the exterior rotor and the interior rotor, wherein the at least one stator comprises a plurality of stator poles and the exterior rotor comprises a plurality of exterior rotor poles, the method further comprising providing the array of magnetically isolated segments and filler segments in both the at least one stator and the interior rotor. In various embodiments, the at least one stator has an exterior side comprising the array of magnetically isolated segments and an interior side comprising the plurality of stator poles.

In at least one embodiment, the method further comprises disposing the at least one stator between the exterior rotor and the interior rotor, wherein the at least one stator comprises a plurality of stator poles and the interior rotor comprises a plurality of interior rotor poles, the method further comprising providing the array of magnetically isolated segments and filler segments in both the exterior rotor and the at least one stator. In various embodiments, the at least one stator has an exterior side comprising the plurality of stator poles and an interior side comprising the array of magnetically isolated segments.

In at least one embodiment, the method further comprises disposing the interior rotor between the exterior rotor and the at least one stator, wherein the exterior rotor comprises a plurality of exterior rotor poles and the at least one stator comprises a plurality of stator poles, the method further comprising providing the array of magnetically isolated segments and filler segments in the interior rotor. In various embodiments, the interior rotor has an exterior side comprising a first set of magnetically isolated segments and an interior side comprising a second set of magnetically isolated segments.

In at least one embodiment, the method further comprises disposing the interior rotor between the exterior rotor and the at least one stator, wherein the at least one stator comprises a plurality of stator poles and the interior rotor comprises a plurality of interior rotor poles, the method further comprising providing the array of magnetically isolated segments and filler segments in both the exterior rotor and the interior rotor. In various embodiments, the interior rotor has an exterior side comprising the plurality of interior rotor poles and an interior side comprising the array of magnetically isolated segments.

In at least one embodiment, the at least one stator comprises an exterior stator and an interior stator, the exterior stator being spaced from the interior stator, and the method comprises disposing the exterior stator and the interior stator concentrically with the interior rotor and the exterior rotor. In various embodiments, the method further comprises disposing the exterior rotor between the exterior stator and the interior rotor and disposing the interior rotor outside the interior stator, wherein the exterior stator comprises a plurality of exterior stator poles and the interior stator comprises a plurality of interior stator poles, and wherein the method further comprises providing the array of magnetically isolated segments and filler segments in the exterior rotor and the interior rotor. In some embodiments, the method further comprises providing an air gap between the exterior rotor and the interior rotor.

In some embodiments, an unaligned magnetic flux pattern is formed when a magnetically isolated segment from the array aligns with a stator pole, the stator pole being wound by an energized coil winding.

In some embodiments, an aligned magnetic flux pattern is formed when a magnetically isolated segment from the array spans over two adjacent stator poles, wherein one of the two adjacent stator poles is wound by an energized coil winding. In some further embodiments, the aligned magnetic flux pattern is formed in a segment of the at least one stator, wherein the segment is less than half of the circumference of the at least one stator.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

Several embodiments of the present invention will now be described in detail with reference to the drawings, in which:

FIG. 2A illustrates a magnetic flux pattern of a switched reluctance machine according to an example embodiment;

FIG. 2B illustrates a magnetic flux pattern of a switched reluctance machine according to another example embodiment;

FIG. 2C illustrates a magnetic flux pattern of a switched reluctance machine according to another example embodiment;

FIG. 4A illustrates a magnetic flux distribution in a segmented rotor switched reluctance machine according to an example embodiment;

FIG. 4B illustrates a magnetic flux distribution in a segmented rotor switched reluctance machine according to another example embodiment;

FIG. 5A illustrates a magnetic flux pattern of a segmented rotor switched reluctance machine according to an example embodiment;

FIG. 5B illustrates a magnetic flux pattern of a segmented rotor switched reluctance machine according to an example embodiment;

FIG. 5C illustrates a magnetic flux pattern of a segmented rotor switched reluctance machine according to an example embodiment;

FIG. 6A illustrates a magnetic flux pattern of a segmented double rotor switched reluctance machine according to an example embodiment;

FIG. 6B illustrates a magnetic flux pattern of a segmented double rotor switched reluctance machine according to an example embodiment;

segmented double rotor SRM

Figure 11B:
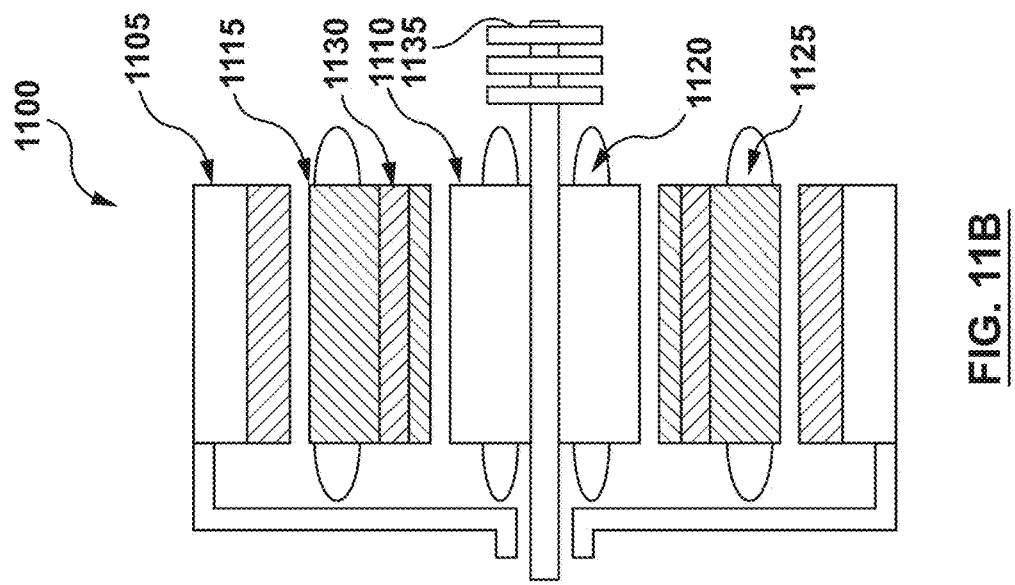
Figure 11A:
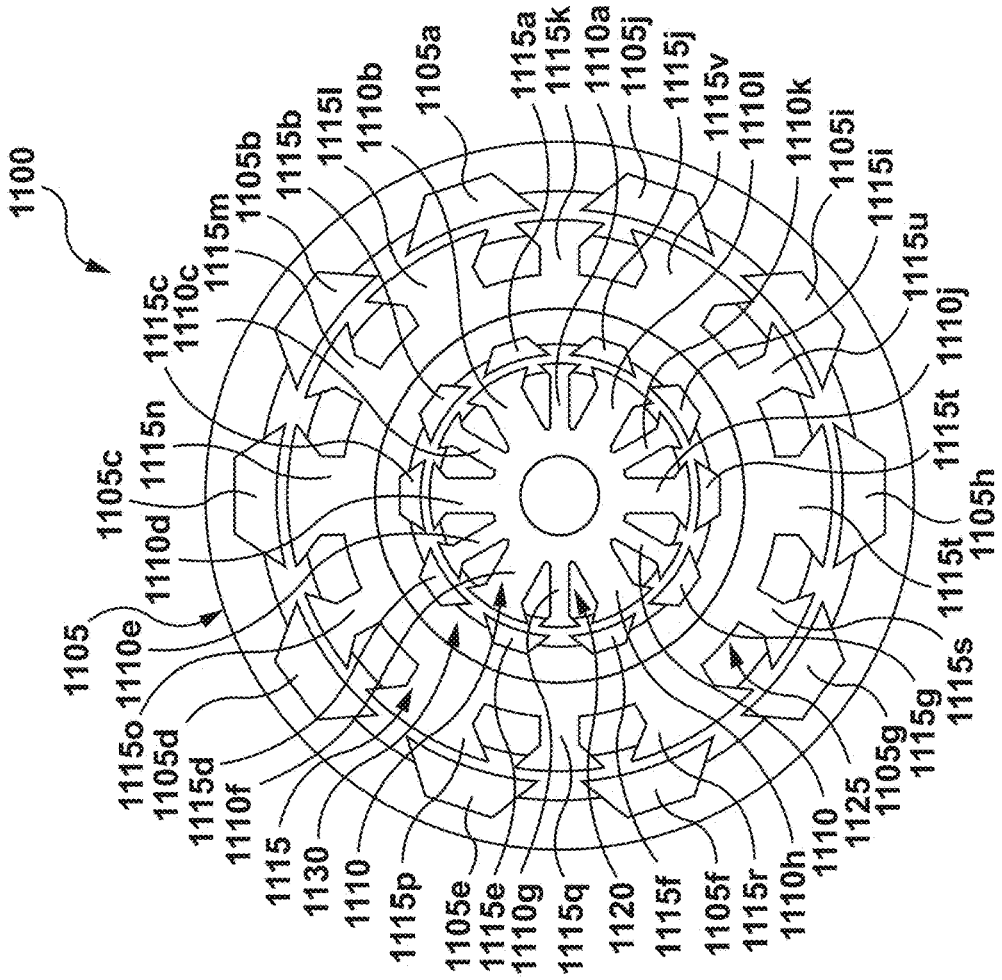
Figure 13B:
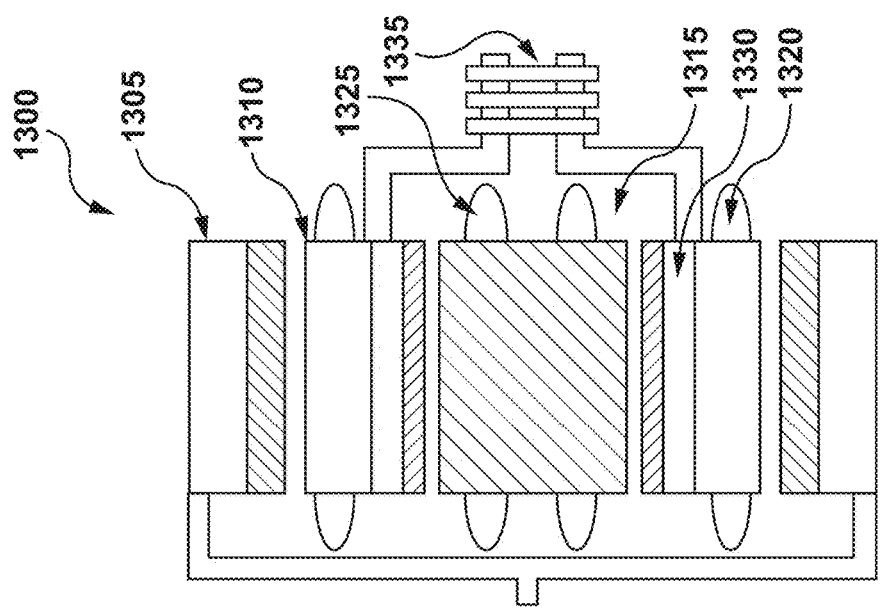
Figure 13A:
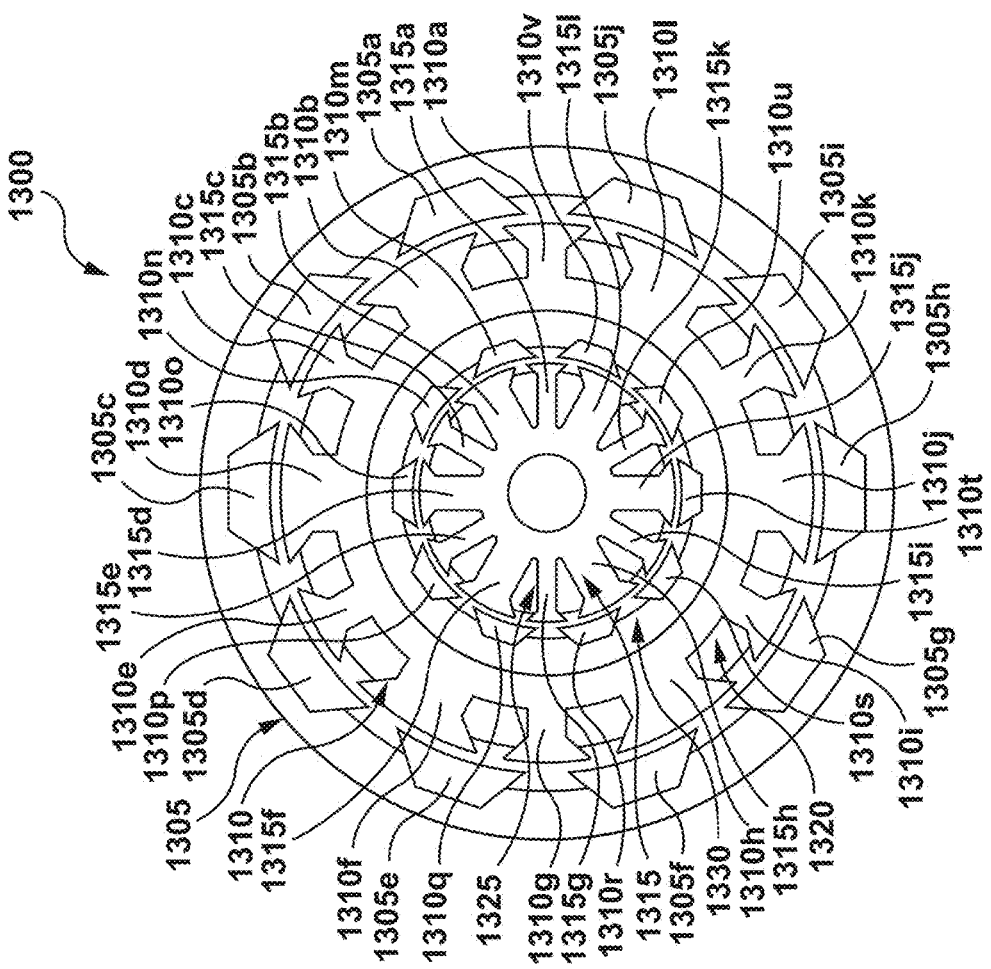
Figure 15:
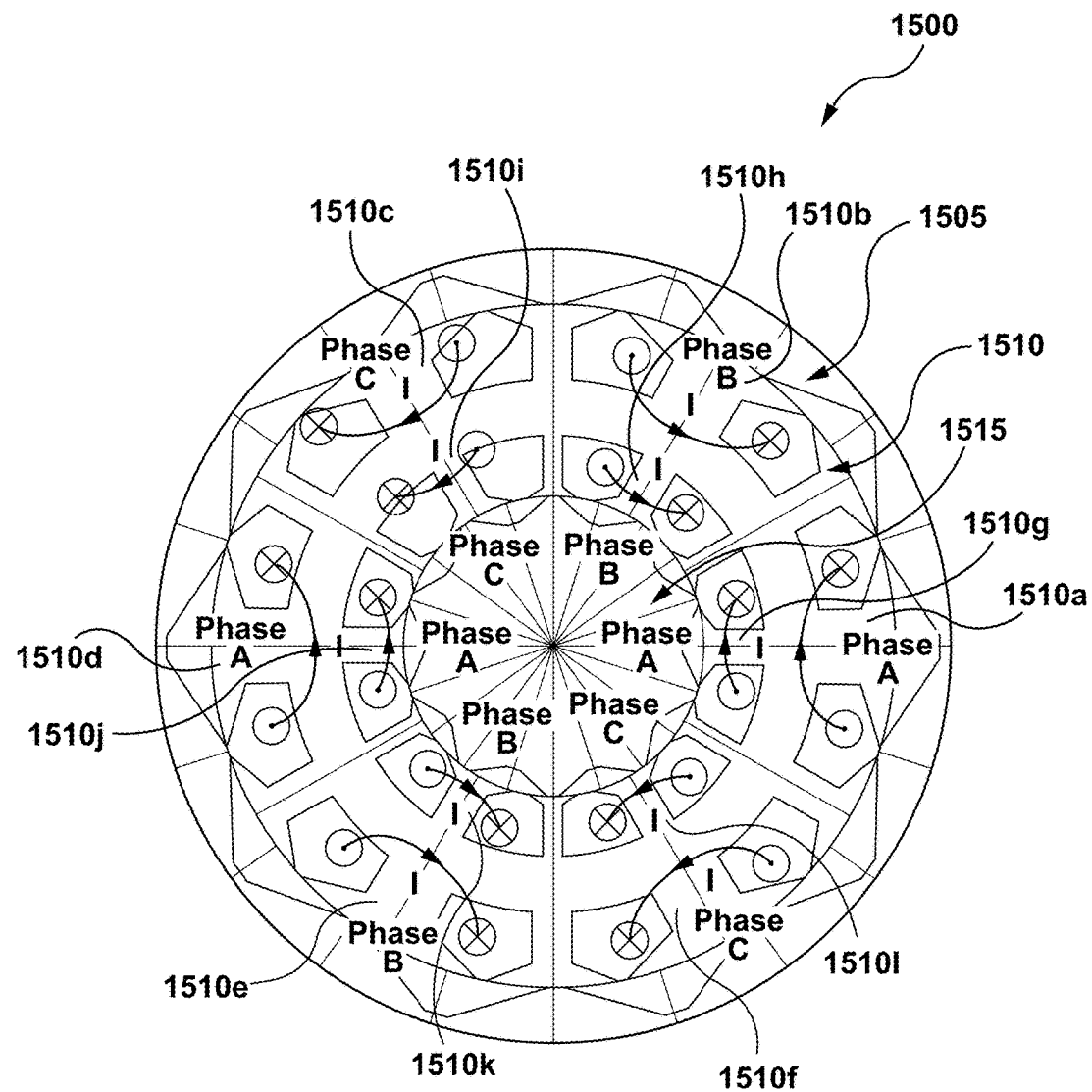
Figure 16A:
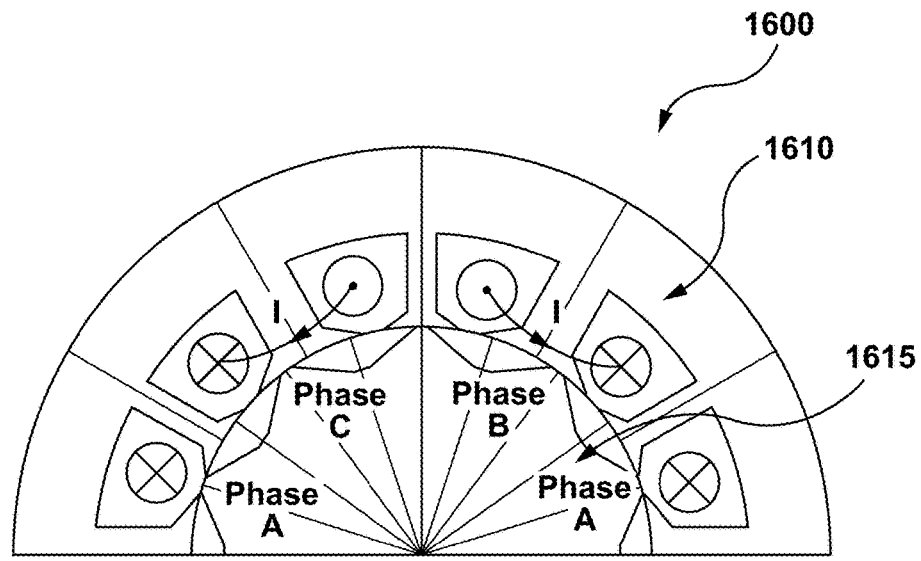
Figure 16B:
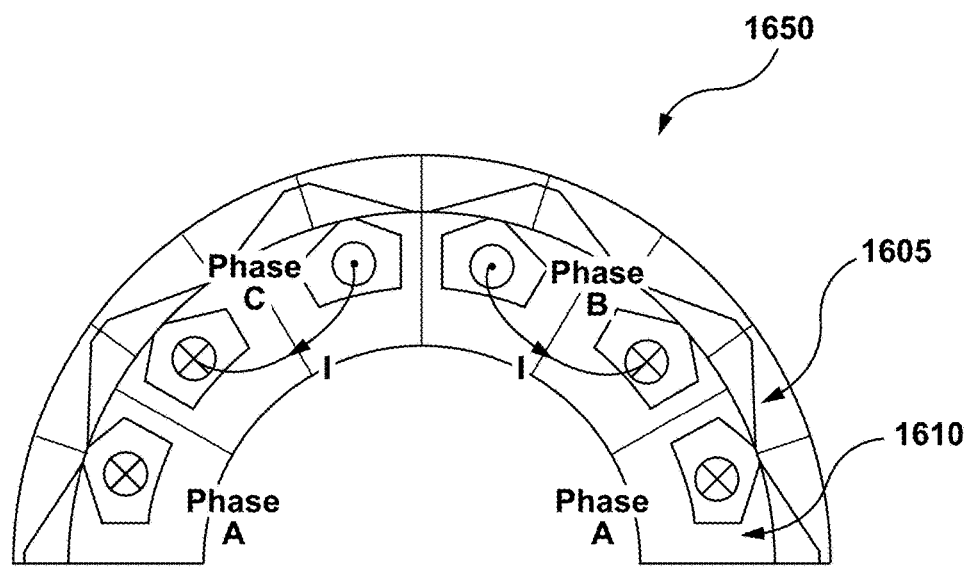
Figure 17A:
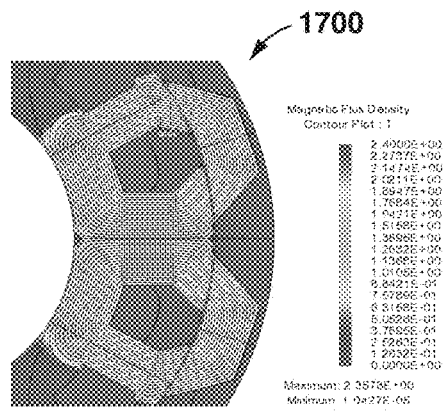
Figure 17B:
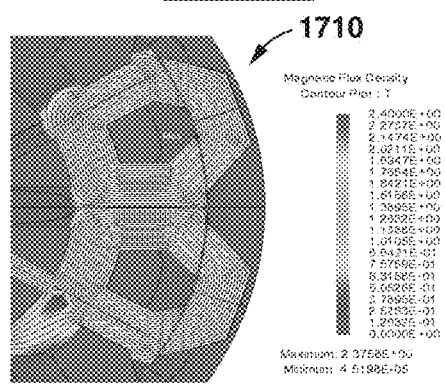
Figure 17C:
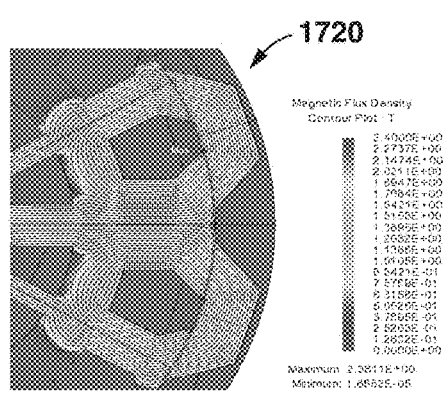
Figure 17D:
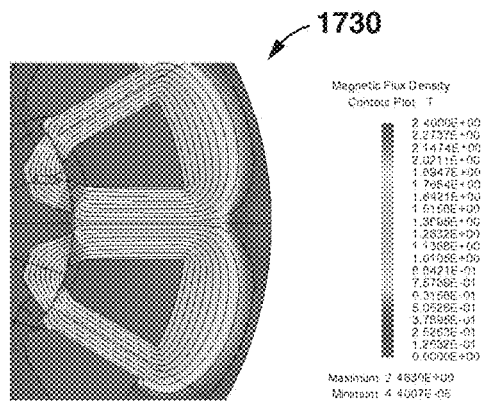
Figure 17E:
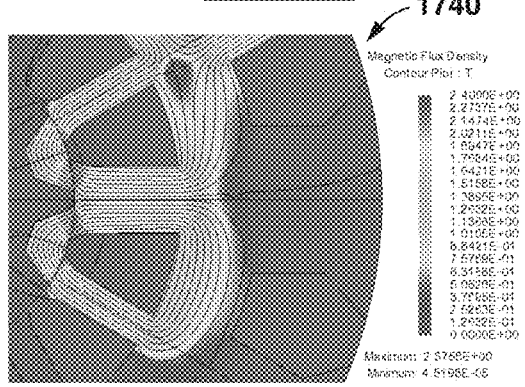
Figure 17F:
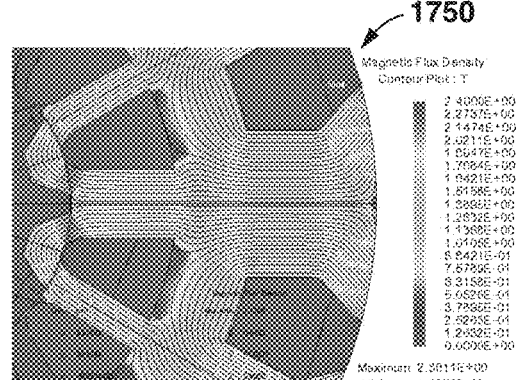
Figure 18A:
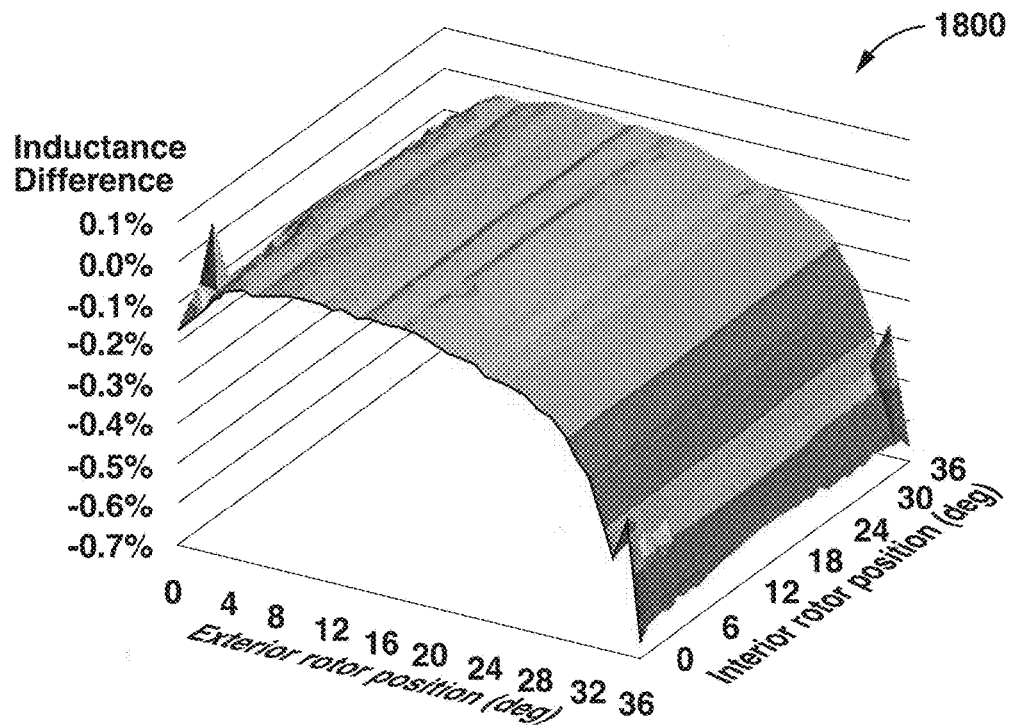
Figure 18B:
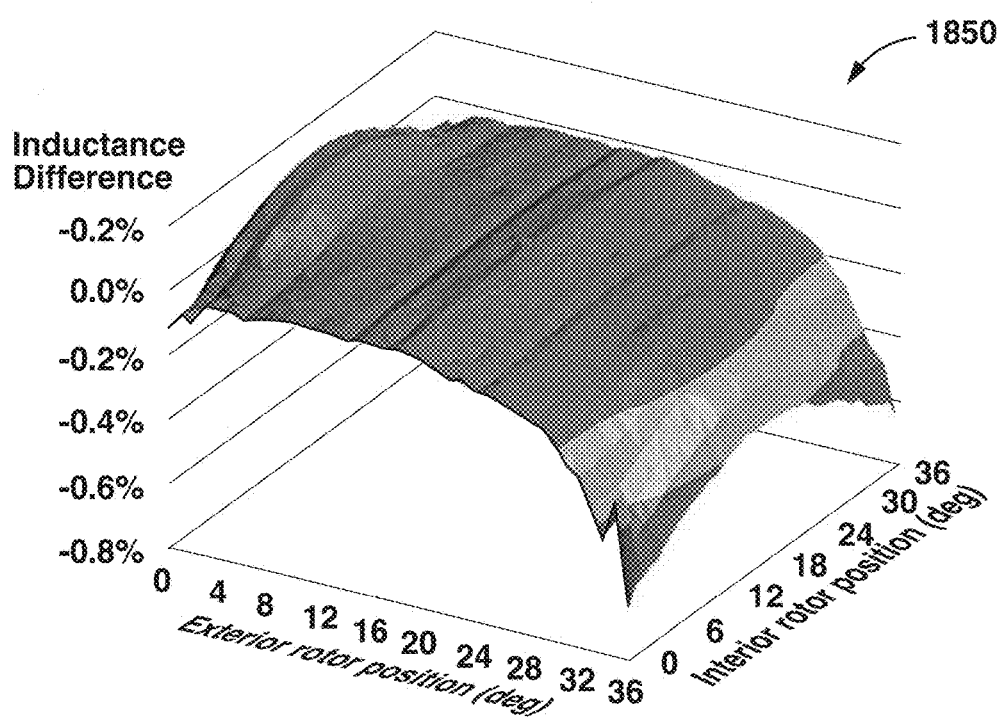
Figure 19A:
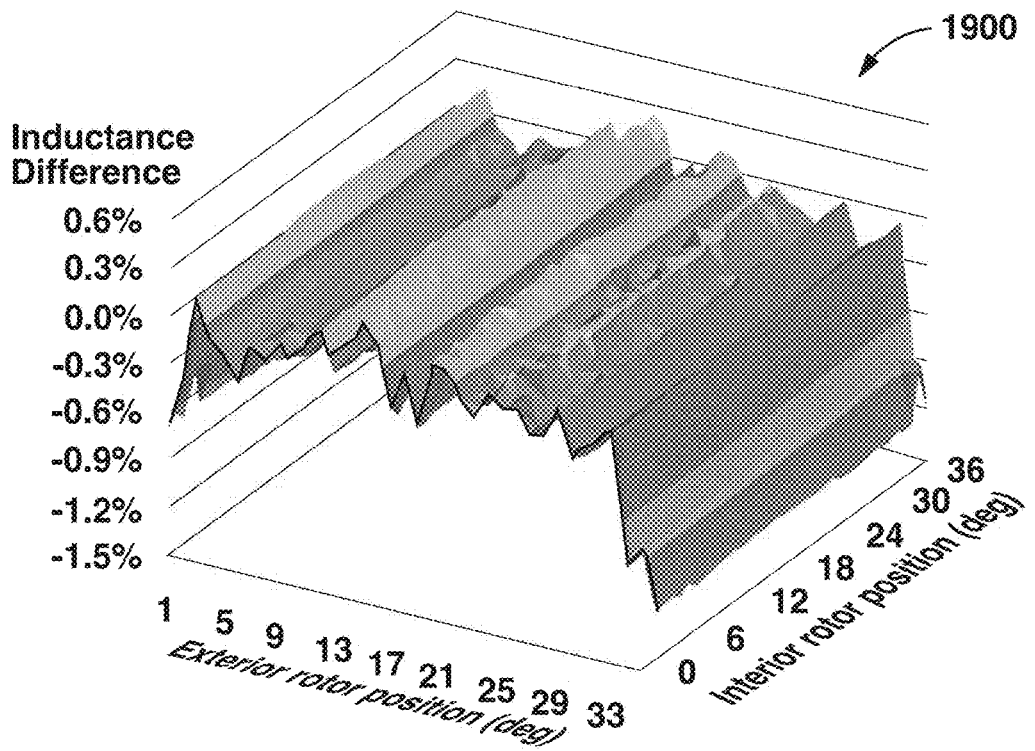
Figure 19B:
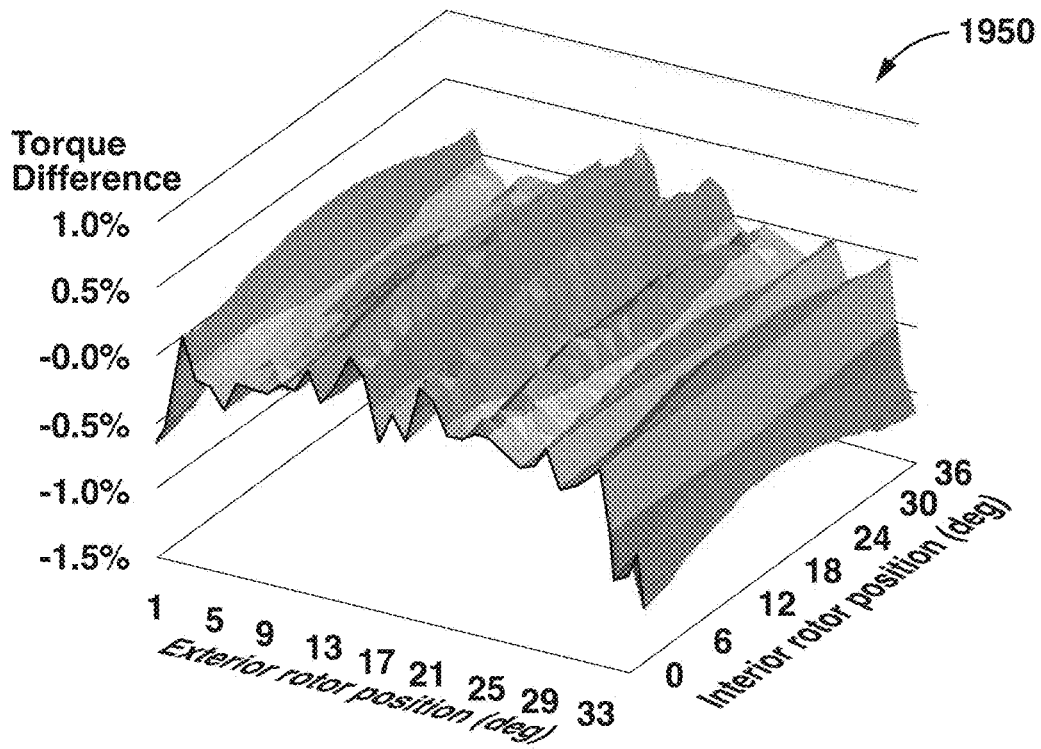
Figure 20A:
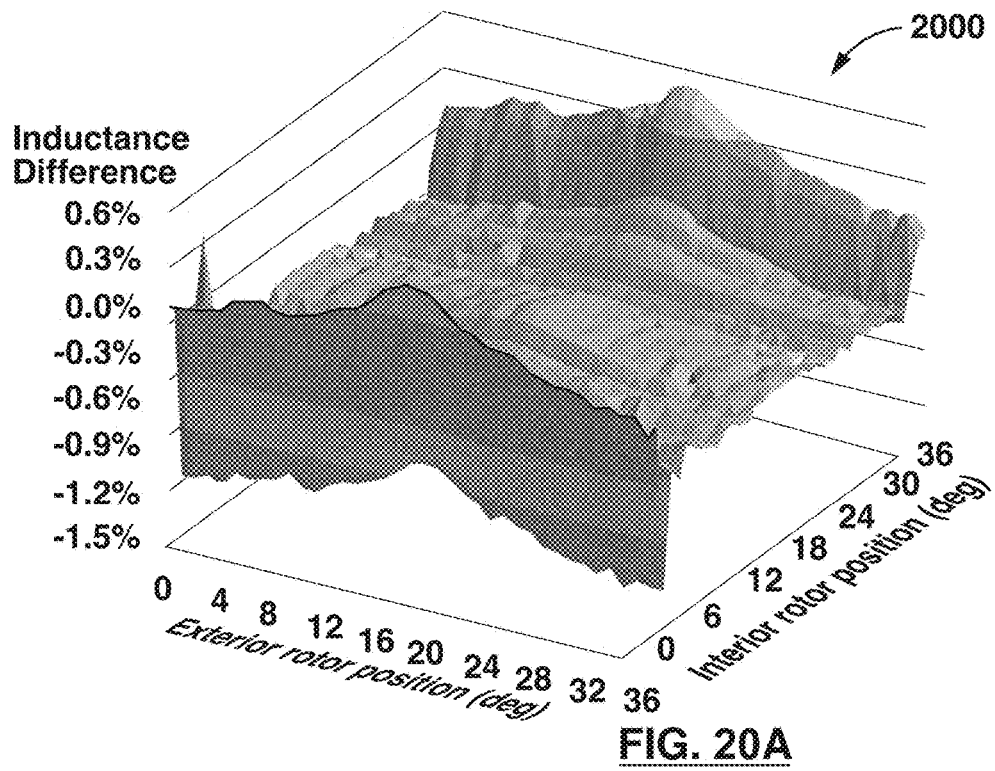
Figure 20B:
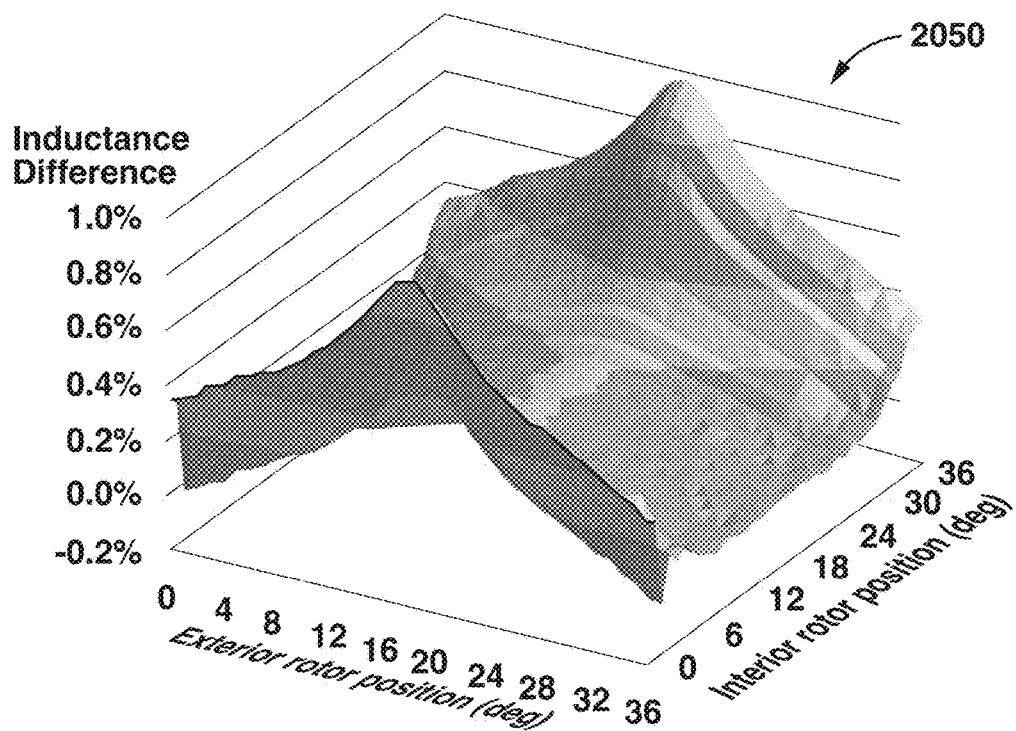
Figure 21A:
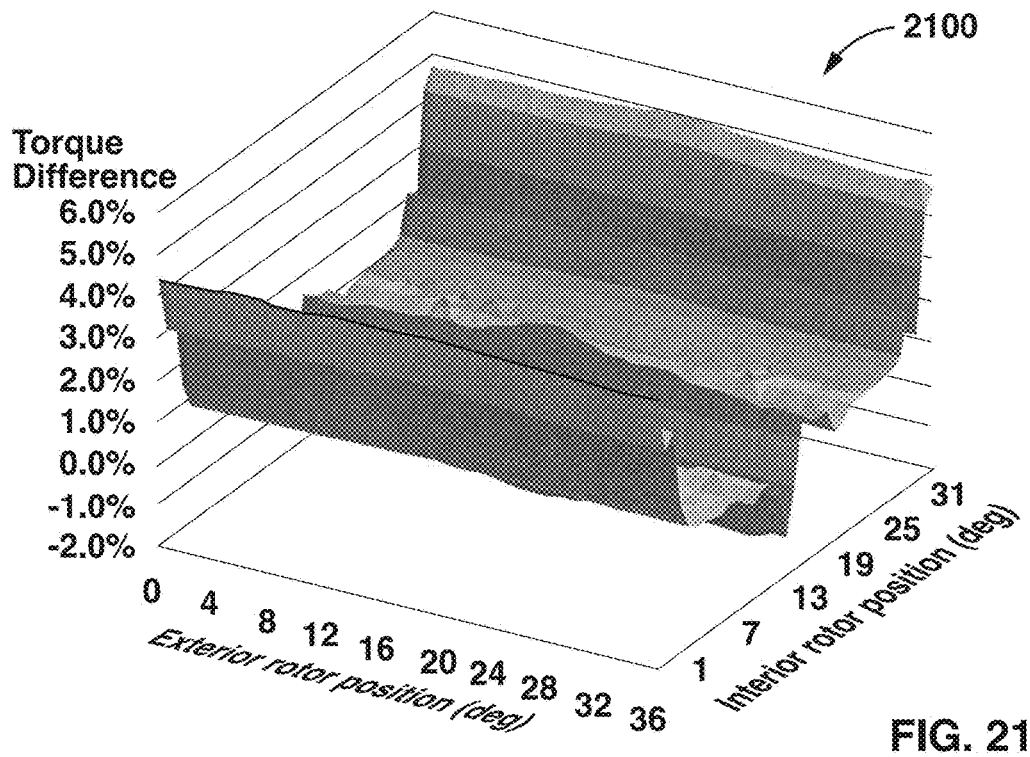
Figure 21B:
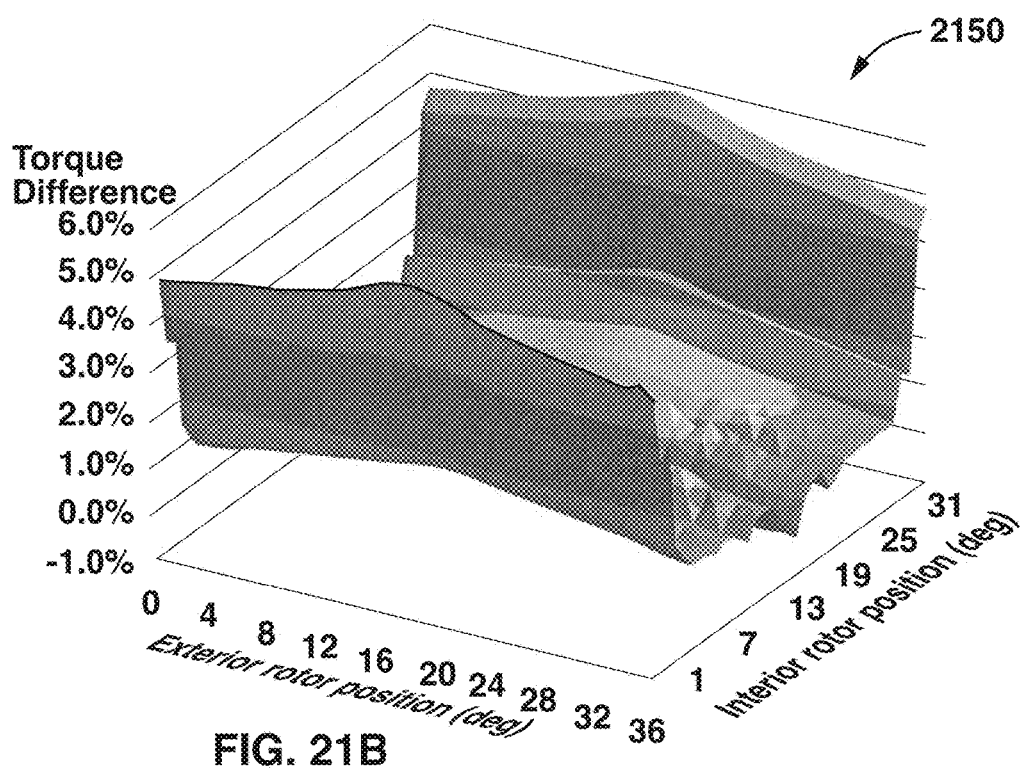
Figure 22:
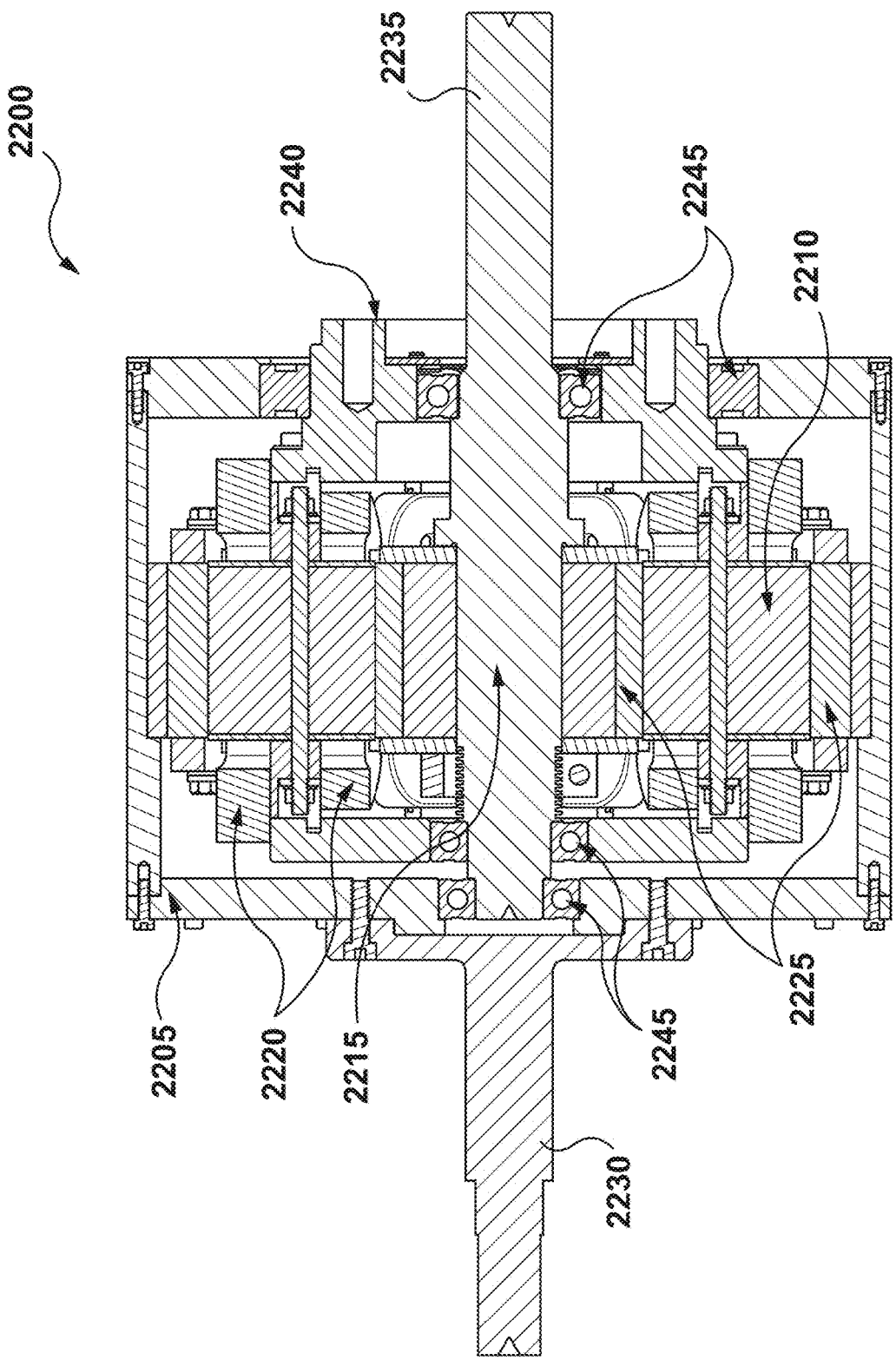
Figure 23A:
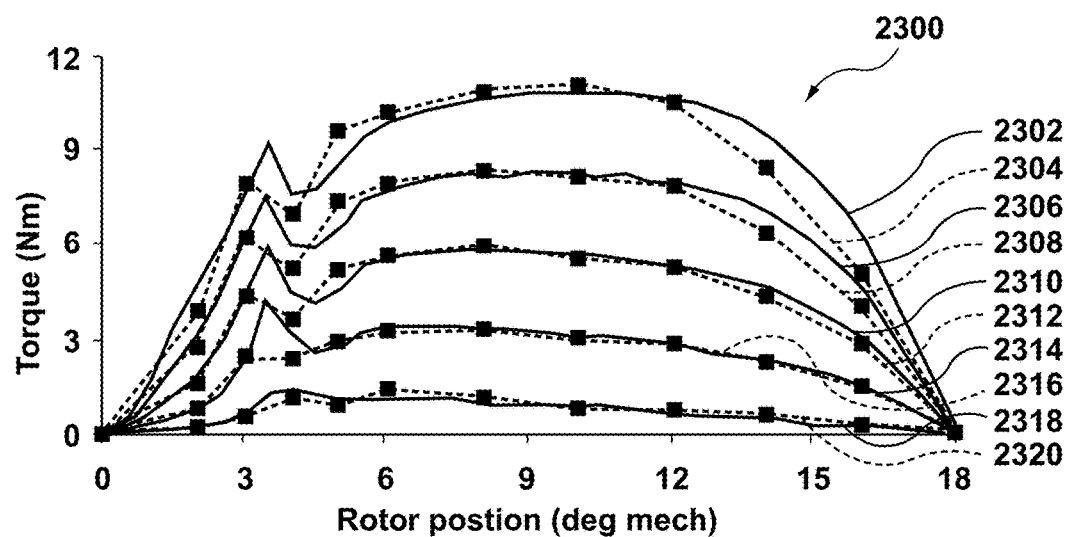
Figure 23B:
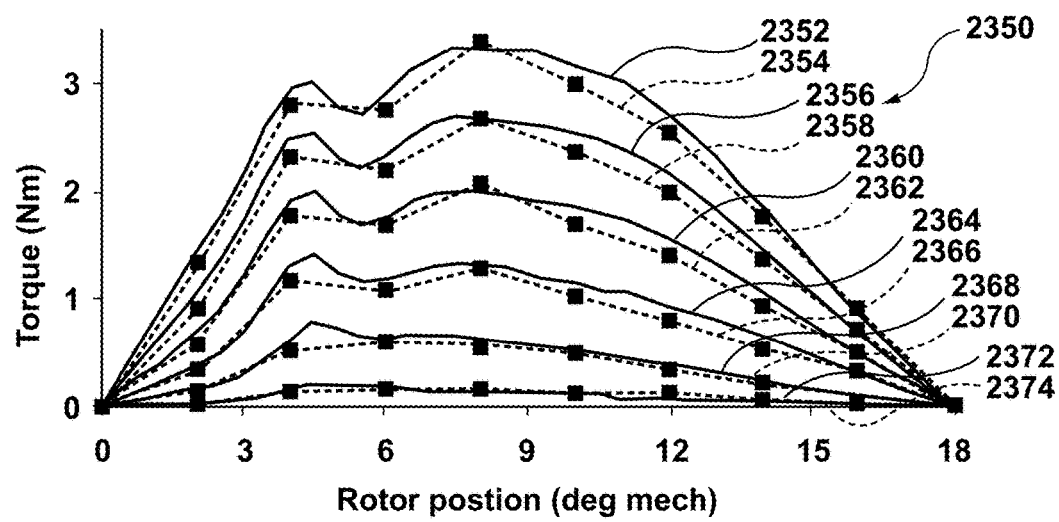
Figure 24A:
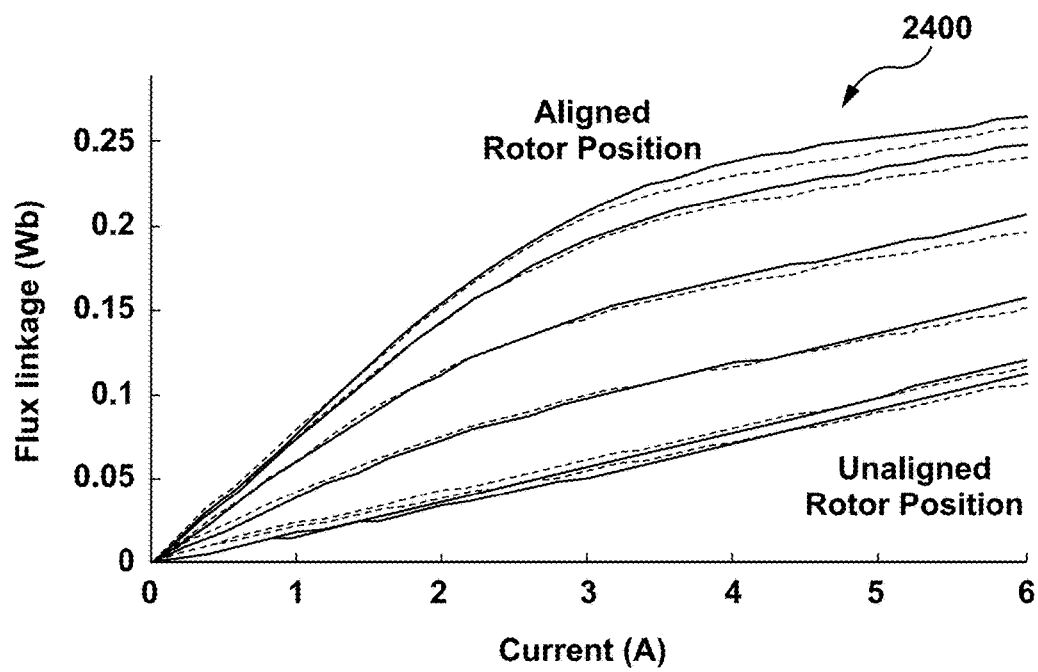
Figure 24B:
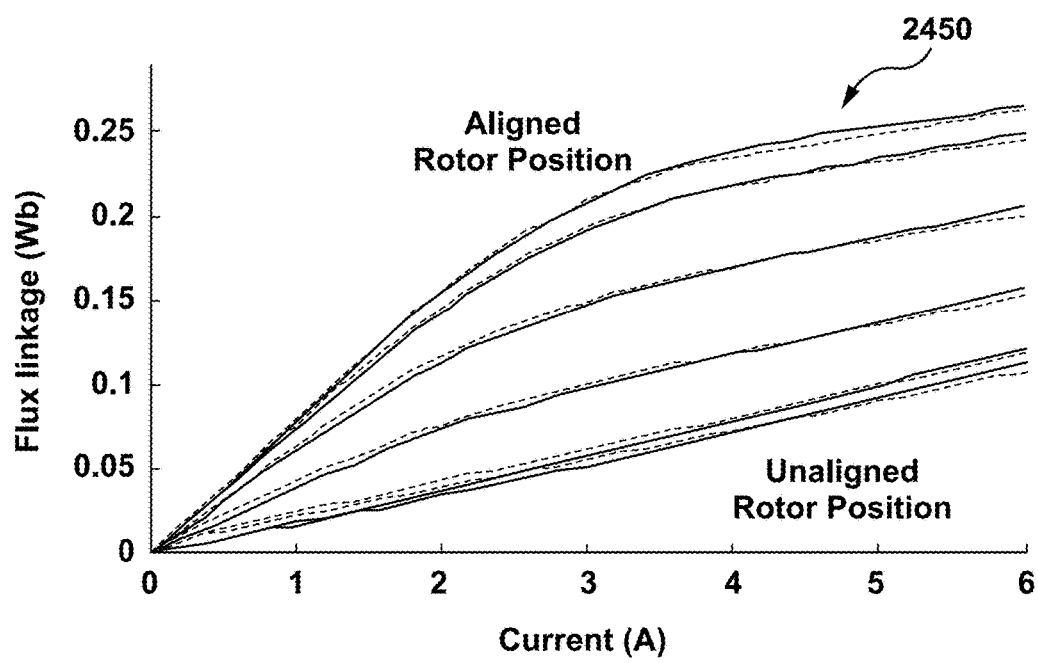
Figure 25A:
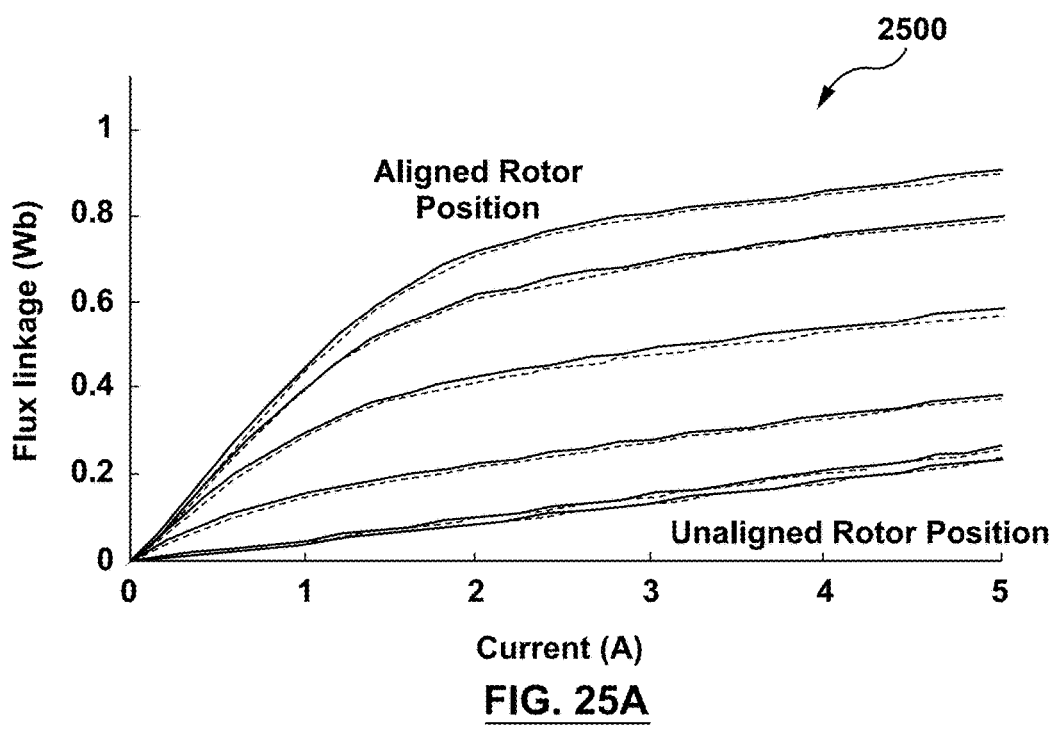
Figure 25B:
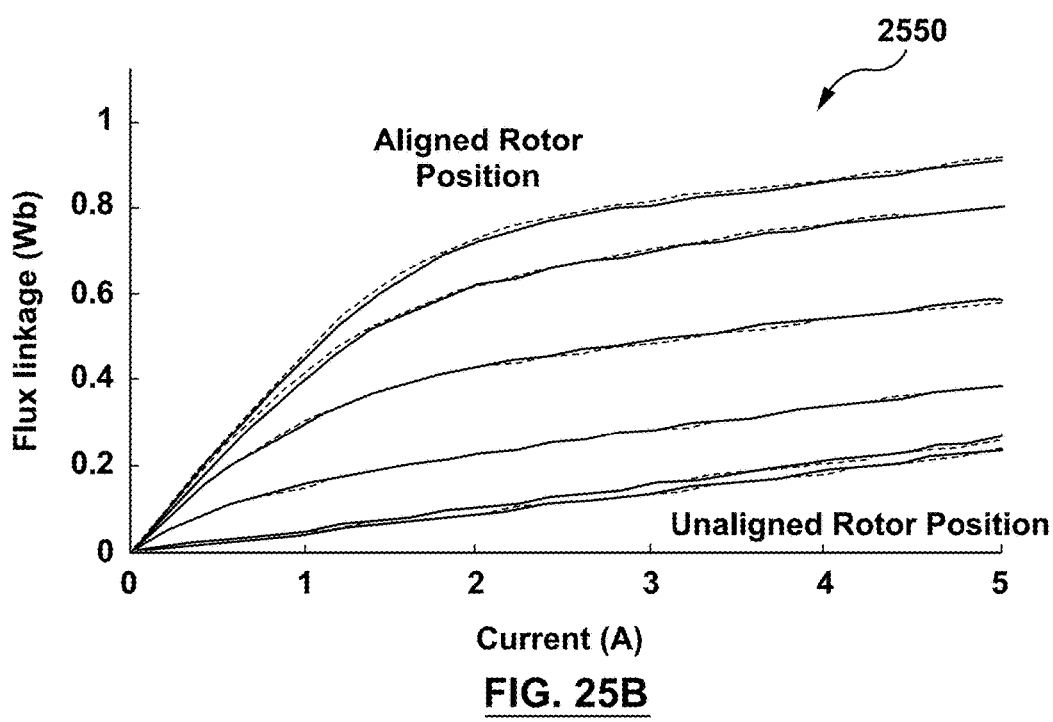
Figure 26A:
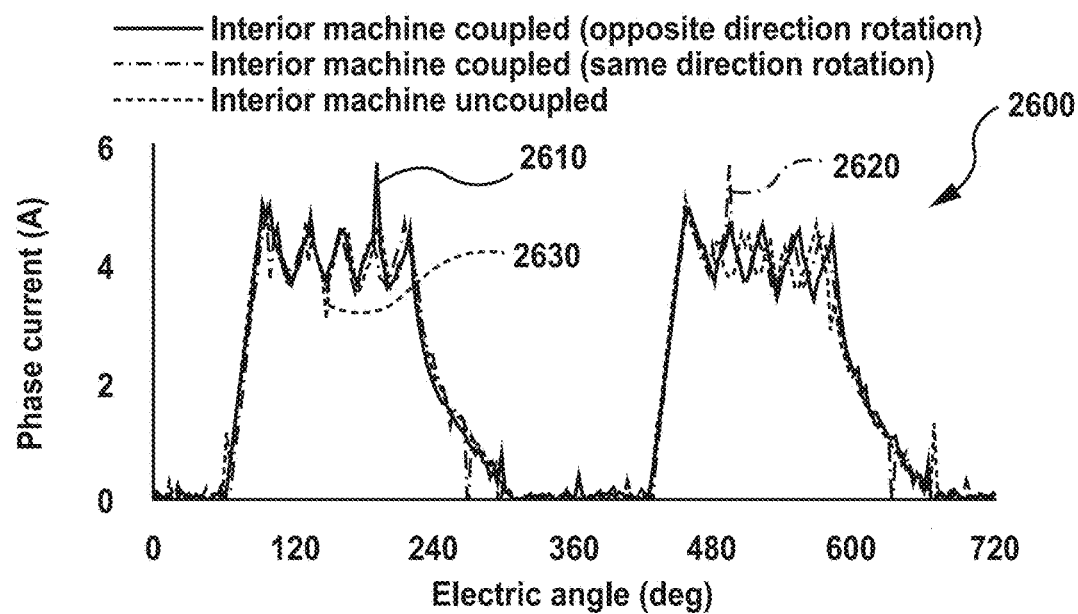
Figure 26B:
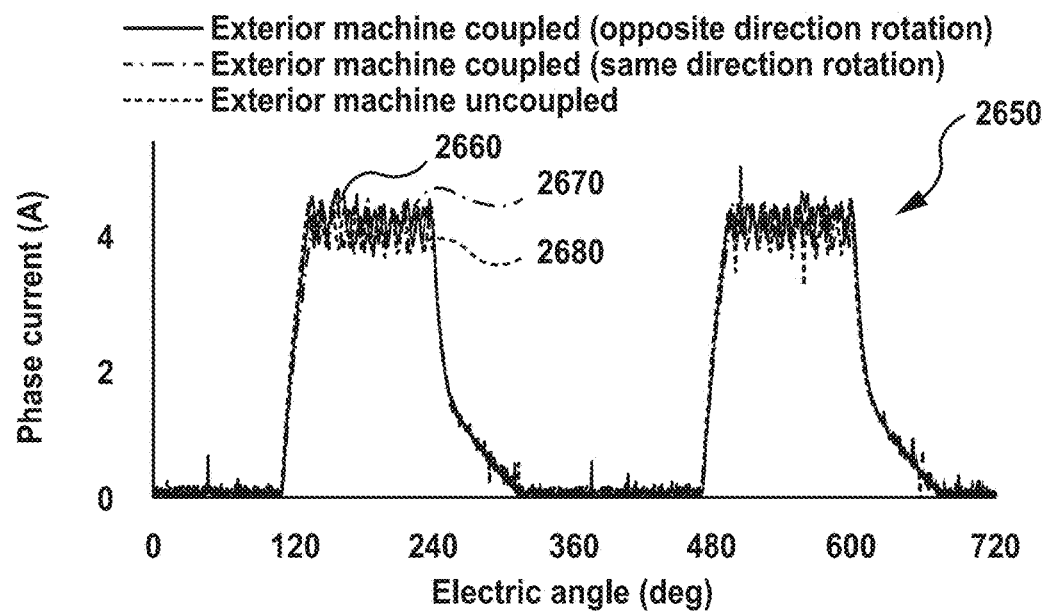

FIG. 7A illustrates a segmented double rotor switched reluctance machine according to an example embodiment;

FIG. 7B illustrates a longitudinal section view the switched reluctance machine of FIG. 7A according to an example embodiment;

FIG. 8A illustrates a segmented double rotor switched reluctance machine according to an example embodiment;

FIG. 8B illustrates a longitudinal section view the switched reluctance machine of FIG. 8A according to an example embodiment;

FIG. 9A illustrates a segmented double rotor switched reluctance machine according to an example embodiment;

FIG. 9B illustrates a longitudinal section view the switched reluctance machine of FIG. 9A according to an example embodiment;

FIG. 10A illustrates a segmented double rotor switched reluctance machine according to an example embodiment;

FIG. 10B illustrates a longitudinal section view the switched reluctance machine of FIG. 10A according to an example embodiment;

FIG. 11A illustrates a segmented double rotor switched reluctance machine according to an example embodiment;

FIG. 11B illustrates a longitudinal section view the switched reluctance machine of FIG. 11A according to an example embodiment;

FIG. 12A illustrates a segmented double rotor switched reluctance machine according to an example embodiment;

FIG. 12B illustrates a longitudinal section view the switched reluctance machine of FIG. 12A according to an example embodiment;

FIG. 13A illustrates a segmented double rotor switched reluctance machine according to an example embodiment;

FIG. 13B illustrates a longitudinal section view the switched reluctance machine of FIG. 13A according to an example embodiment;

FIG. 14A illustrates a segmented double rotor switched reluctance machine according to an example embodiment;

FIG. 14B illustrates a longitudinal section view the switched reluctance machine of FIG. 14A according to an example embodiment;

FIG. 15 illustrates a winding configuration of a segmented double rotor switched reluctance machine according to an example embodiment;

FIG. 16A illustrates a half cross-sectional view of an isolated exterior segmented rotor switched reluctance machine according to an example embodiment;

FIG. 16B illustrates a half cross-sectional view of an isolated interior segmented rotor switched reluctance machine according to an example embodiment;

FIG. 17A illustrates a magnetic flux density plot of an isolated exterior segmented rotor switched reluctance machine according to an example embodiment;

FIG. 17B illustrates a magnetic flux density plot of an exterior machine of a segmented double rotor switched reluctance machine according to an example embodiment;

FIG. 17C illustrates a magnetic flux density plot of an exterior machine of a segmented double rotor switched reluctance machine according to another example embodiment;

FIG. 17D illustrates a magnetic flux density plot of an isolated interior segmented rotor switched reluctance machine according to an example embodiment;

FIG. 17E illustrates a magnetic flux density plot of an interior machine of a segmented double rotor switched reluctance machine according to an example embodiment;

FIG. 17F illustrates a magnetic flux density plot of an interior machine of a segmented double rotor switched reluctance machine according to another example embodiment;

FIG. 18A illustrates a graphical representation of a coupling effect of an exterior machine inductance when adjacent phases are excited according to an example embodiment;

FIG. 18B illustrates a graphical representation of a coupling effect of an exterior machine inductance when same phases are excited according to an example embodiment;

FIG. 19A illustrates a graphical representation of a coupling effect of an exterior machine torque when adjacent phases are excited according to an example embodiment;

FIG. 19B illustrates a graphical representation of a coupling effect of an exterior machine torque when same phases are excited according to an example embodiment;

FIG. 20A illustrates a graphical representation of a coupling effect of an interior machine inductance when adjacent phases are excited according to an example embodiment;

FIG. 20B illustrates a graphical representation of a coupling effect of an interior machine inductance when same phases are excited according to an example embodiment;

FIG. 21A illustrates a graphical representation of a coupling effect of an interior machine torque when adjacent phases are excited according to an example embodiment;

FIG. 21B illustrates a graphical representation of a coupling effect of an interior machine torque when same phases are excited according to an example embodiment;

FIG. 22 illustrates a longitudinal section of a segmented double rotor segmented reluctance machine according to an example embodiment;

FIG. 23A illustrates a graphical representation of a static torque measurement of an interior machine according to an example embodiment;

FIG. 23B illustrates a graphical representation of a static torque measurement of an exterior machine according to an example embodiment;

FIG. 24A illustrates a graphical representation of flux linkage loci measurement of an interior machine under same phase coupling effect according to an example embodiment;

FIG. 24B illustrates a graphical representation of flux linkage loci measurement of an interior machine under adjacent phase coupling effect according to an example embodiment;

FIG. 25A illustrates a graphical representation of flux linkage loci measurement of an exterior machine under same phase coupling effect according to an example embodiment;

FIG. 25B illustrates a graphical representation of flux linkage loci measurement of an exterior machine under adjacent phase coupling effect according to an example embodiment;

FIG. 26A illustrates a graphical representation of phase current waveforms of an interior machine according to an example embodiment; and FIG. 26B illustrates a graphical representation of phase current waveforms of an exterior machine according to an example embodiment.

The drawings are provided for the purposes of illustrating various aspects and features of the example embodiments described herein. For simplicity and clarity of illustration, elements shown in the FIGS. have not necessarily been drawn to scale. Further, where considered appropriate, reference numerals may be repeated among the FIGS. to indicate corresponding or analogous elements.

DETAILED DESCRIPTION

Various apparatuses or processes will be described below to provide an example of at least one embodiment of the claimed subject matter. No embodiment described below limits any claimed subject matter and any claimed subject matter may cover processes, apparatuses, devices or systems that differ from those described below. The claimed subject matter is not limited to apparatuses, devices, systems or processes having all of the features of any one apparatus, device, system or process described below or to features common to multiple or all of the apparatuses, devices, systems or processes described below. It is possible that an apparatus, device, system or process described below is not an embodiment of any claimed subject matter. Any subject matter that is disclosed in an apparatus, device, system or process described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It should also be noted that the terms "coupled" or "coupling" as used herein can have several different meanings depending in the context in which the term is used. For example, the term coupling can have a mechanical, electrical or magnetic connotation. For example, as used herein, the terms "coupled" or "coupling" can indicate that two elements or devices can be directly connected to one another or connected to one another through one or more intermediate elements or devices via an electrical element, electrical signal, a mechanical element or magnetic flux such as but not limited to, a wire, a cable, or magnetic field, for example, depending on the particular context.

It should be noted that terms of degree such as "substantially", "about" and "approximately" as used herein mean a reasonable amount of deviation of the modified term such that the end result is not significantly changed. These terms of degree should be construed as including a deviation of the modified term if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made if the end result is not significantly changed.

The various embodiments described herein relate to a compound switched reluctance machine ("SRM") that comprises at least two rotors and one stator integrated into one machine set. In this configuration, the SRM (referred to below also as "double rotor SRM") may realize the functions of two individual electric machines, which may be operated as two generators, two motors, or a generator and a motor. The SRM of the various embodiments described in this document may provide advantages of high power density, compact volume and size, and lower manufacturing costs.

In some cases, the switched reluctance machine of the various embodiments described herein may operate as two individual SRMs. This is accomplished by utilizing the double rotors separately. However, in some other cases, the SRM described here may operate as one device. This is accomplished by synchronizing the operation of the two rotors of the SRM. Operation of the compound SRM as one device may have the advantage of enhanced power density.

The SRM of the various embodiments described here may have application in the field of hybrid electric vehicle (HEV) powertrains. An HEV typically consumes less fuel and has lower emissions than a conventional vehicle by combining the combustion engine with electric propulsion and therefore achieving more modes of operation.

The SRM of the various embodiments described here may also have applications in the fields of hybrid electric aircraft powertrain, hybrid ship powertrain, or some other electromechanical integrated transmission to serve as the electric prime mover and receiver. The various embodiments described here may further have applications in hybrid electric and plug-in hybrid electric vehicles, such as, for example, cars, SUVs, trucks, motorbikes, etc., to replace the existing or conventional motor and generators in transmissions power train.

In some cases, the SRM of the various embodiments described herein may operate as a torque coupler device, such as, for example, mechanical clutches in hybrid powertrain systems. In this configuration, the SRM may operate by holding and releasing either of the two rotors with the stator through electromagnetic field force or through mechanical clutches, or by synchronizing the two rotors with the same rotating speed, so that the output speed or relative speed of the two rotors can be controlled as clutch engaged or released, respectively.

The systems and the methods of various embodiments disclosed herein include an SRM comprising double rotors rotating concentrically with the same stator. The two rotors and the stator may be configured in a variety of ways. This configuration may have the advantage of enhancing the output power performance of the SRM and realizing higher flexibility. The integration of two rotors and a stator has the advantage of reducing the need for another set of stator, machine housing, cooling system, etc., thereby reducing the overall assembly volume at the same power level.

The SRMs of the various embodiments described herein may exist in a variety of configurations. In one configuration, the stator may be sandwiched in between the two rotors so that each of the rotors forms a conventional switched reluctance machine with the stator, i.e., the outer rotor and the stator form an outer switched reluctance machine while the interior rotor and the stator form an inner switched reluctance machine.

In another configuration, one of the rotors may be provided in the middle of the stator and the other rotor so that the middle rotor and stator form a conventional switched reluctance machine while the middle rotor and the other rotor together form a "floating-stator" switched reluctance machine. A "floating-stator" means that the "stator" is actually rotatable and the relative motion between the two rotors defines the magnetic field of the second switched reluctance machine.

In some cases, the machine members are installed concentrically in a radial direction. In some other cases, the double rotors and the one stator may be installed in a split pattern so that smaller radial diameter can be realized.

Both stator-in-the-middle configuration and rotor-in-the-middle configuration may be provided to suit different types of applications. Both coaxial sandwiched configuration and axially split configuration may be provided to meet different space requirements. Misaligned double-rotor configuration and stacked double-rotor switched reluctance machine module may be provided to suit different power density requirements.

The systems and the methods of various embodiments disclosed herein further include SRMs with segmented rotor configurations. In segmented rotor configurations, the rotor structure has no rotor yoke, but has a plurality of magnetically isolated segments or poles that are disconnected from each other.

The various embodiments of double rotor SRMs with segmented rotor configurations may provide the advantage of increased compactness compared to conventionally structured double rotor machines. This may be accomplished by flux path sharing in the stator back-iron in a double rotor SRM. By introducing flux path sharing in the stator yoke, yoke thickness can be significantly reduced leading to increased machine compactness and reduced weight. This may also have the advantage of improved torque and power density of the switched reluctance machine as a whole.

Figure 1A:
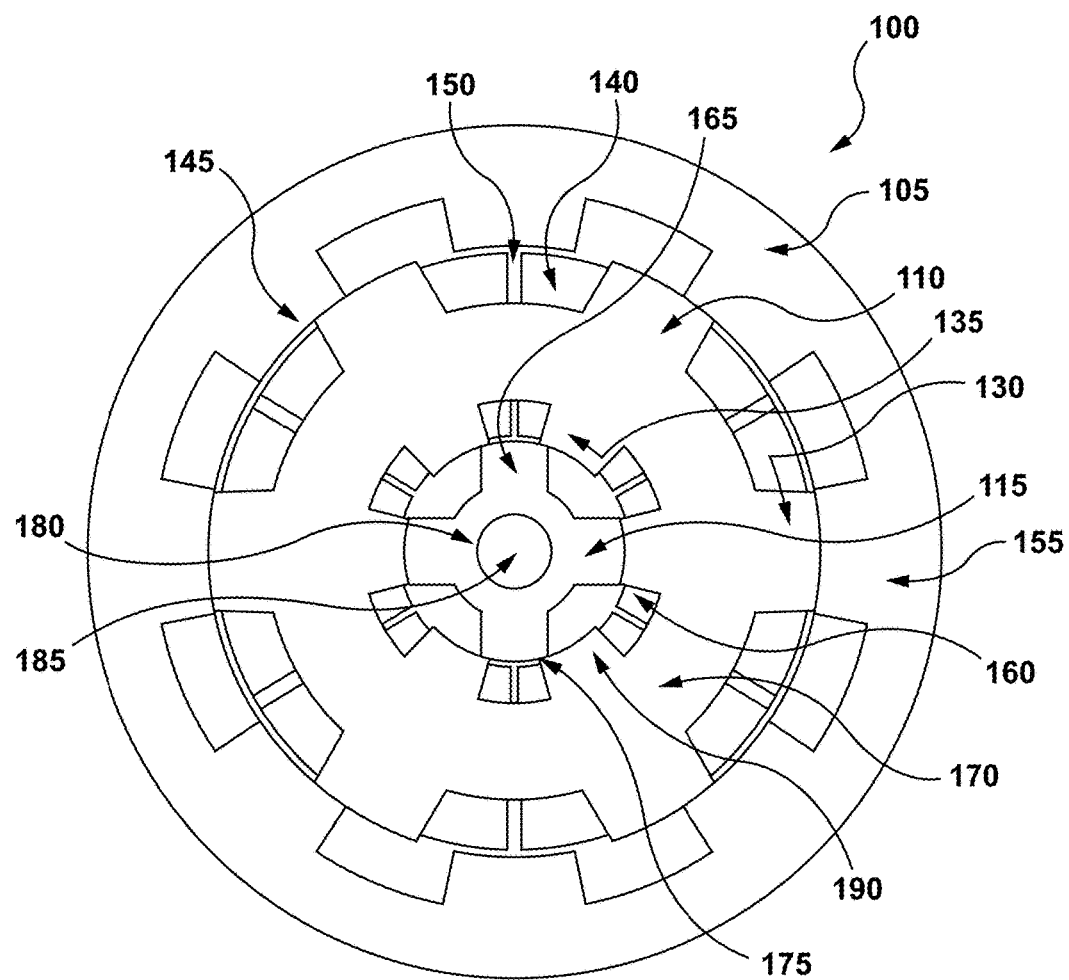
FIG. 1A is a cross-sectional view of a switched reluctance machine in accordance with an example embodiment.

Reference is made to FIG. 1A illustrating a cross-sectional view of a double rotor switched reluctance machine 100 according to an example embodiment. The double rotor switched reluctance machine 100 of FIG. 1A consists of an exterior rotor 105, an interior rotor 115, and a stator 110 located in between the exterior rotor 105 and the interior rotor 115.

The stator 110 is shared by both the exterior rotor 105 and the interior rotor 115, forming an exterior switched reluctance machine 120 and an interior switched reluctance machine 125, respectively. The exterior side of the stator 110 is salient with exterior stator poles 130 and the interior side of the stator 110 is salient with interior stator poles 135.

The exterior switched reluctance machine 120 contains an exterior rotor 105, an exterior side of the stator 110, and exterior coils 140. The exterior rotor 105 is also salient with rotor pole 145. An air gap 150 is formed between the rotor poles 145 and the exterior stator poles 130.

In various embodiments, the exterior stator poles 130 have coil windings 140 for generating a magnetic field. In such embodiments, there are no coil windings on the rotor poles 145. The exterior coil windings 140 generate magnetic flux through the exterior stator poles 130. The flux penetrates the air gap 150 between the exterior stator poles 130 and the rotor poles 145 and then enters the exterior rotor 105. The flux between the exciting or energized exterior stator poles 130 and the corresponding rotor poles 145 tends to align the rotor poles 145 with the energized exterior stator poles 130 resulting in the rotation of the exterior rotor 105. This provides the motoring operation.

The energized stator coil windings 140 change phase from one pole to another in sequence according to the rotor position so that the motor keeps rotating. The flux then splits by half into the back iron 155 of the exterior rotor 105 and merges again at the other end of the rotor pole 145. The flux then again goes through the rotor pole 145, the air gap 150, and the exterior stator pole 130 on the other side of the exterior rotor 105. Eventually, the flux splits again in the exterior stator back iron 170 and merges at the base of the exterior stator pole 145 where the flux is generated.

The interior switched reluctance machine 125 contains an interior rotor 115, the interior side of the stator 110, and interior coils 160. The interior rotor 115 is also salient with rotor poles 165. An air gap 175 is formed between the rotor poles 165 and the interior stator poles 135.

In various embodiments, the interior stator poles 135 have interior coil windings 160 to generate magnetic field. In such embodiments, there are no coil windings around the interior rotor poles 165. The interior coil windings 160 generate magnetic flux through the interior stator poles 135. The flux penetrates the air gap 175 between the interior stator poles 135 and the interior rotor poles 165 and then goes into the interior rotor 115. The flux between the exciting stator poles 135 and the corresponding rotor poles 165 tends to align the interior rotor poles 165 with the exciting interior stator poles 135 so that the rotor rotates, thus providing the motoring operation.

The energized stator coils 160 change phase from one pole to another in sequence according to the rotor position so that the motor keeps rotating. The flux then splits by half into the back iron 180 of the interior rotor 115 around the interior shaft 185 and merges again at the other end of the interior rotor pole 165 of the interior rotor 115. The flux then again goes through the interior rotor pole 165, the interior air gap 175, and the interior stator pole 135 on the other side of the interior rotor 115. Eventually, the flux splits in the interior stator back iron 190 and merges at the base of the interior stator pole 135 where the flux is generated.

The flux paths described above for the exterior switched reluctance machine 120 and the interior switched reluctance machine 125, and in the application overall, are for illustration purposes only. In fact, there is neither a starting point nor an ending point of the flux path. The whole flux path is an entire loop formed by the entire exterior switched reluctance machine 120 and the entire interior switched reluctance machine 125. By having the coil windings 140 and 160 wound only around the exterior stator poles 130 and interior stator poles 135, respectively, the switched reluctance machine 100 may provide an advantage of construction simplicity.

The switched reluctance machine 100 may function as a motor as described above. In some other cases, the exterior switched reluctance machine 120 and the interior switched reluctance machine 125 may both operate as generators. In some further cases, one of the exterior switched reluctance machine 120 and the interior switched reluctance machine 125 operates as a motor, and the other of the exterior switched reluctance machine 120 and the interior switched reluctance machine 125 operates as a generator.

The exterior rotor 105 and the interior rotor 115 of switched reluctance machine 100 are concentrically aligned so that they share the same rotating axis. The stator 110 is designed so that the flux paths described above are independently functioning without major flux coupling and the exterior switched reluctance machine 105 and the interior switched reluctance machine 115 work independently.

Figure 1B:
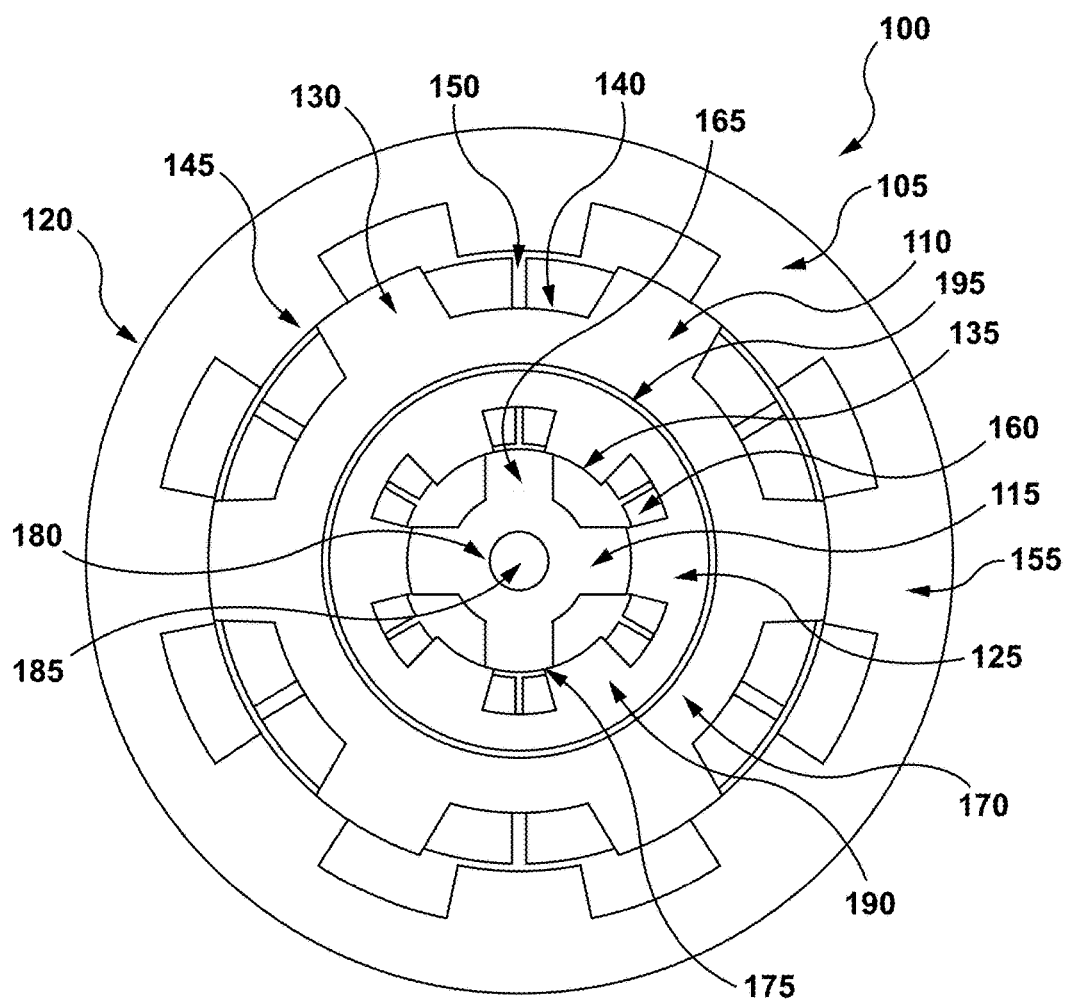
FIG. 1B is a switched reluctance machine of FIG. 1A with insulation in the stator.

Reference is next made to FIG. 1B, which illustrates a switched reluctance machine 100' according to an example embodiment. Switched reluctance machine 100' is analogous to the switched reluctance machine 100 of FIG. 1A with the addition of an insulation layer 195 in the stator 110.

In this embodiment, an insulation layer 195 is inserted between the exterior switched reluctance machine 120 and the interior switched reluctance machine 125 to separate the flux paths of the two switched reluctance machines. Furthermore, in this embodiment, since only stator 110 has coil windings 140 and 160 wound on the interior and exterior stator poles 130 and 135, it is only necessary to route cooling systems through the stator 110.

Figure 1C:
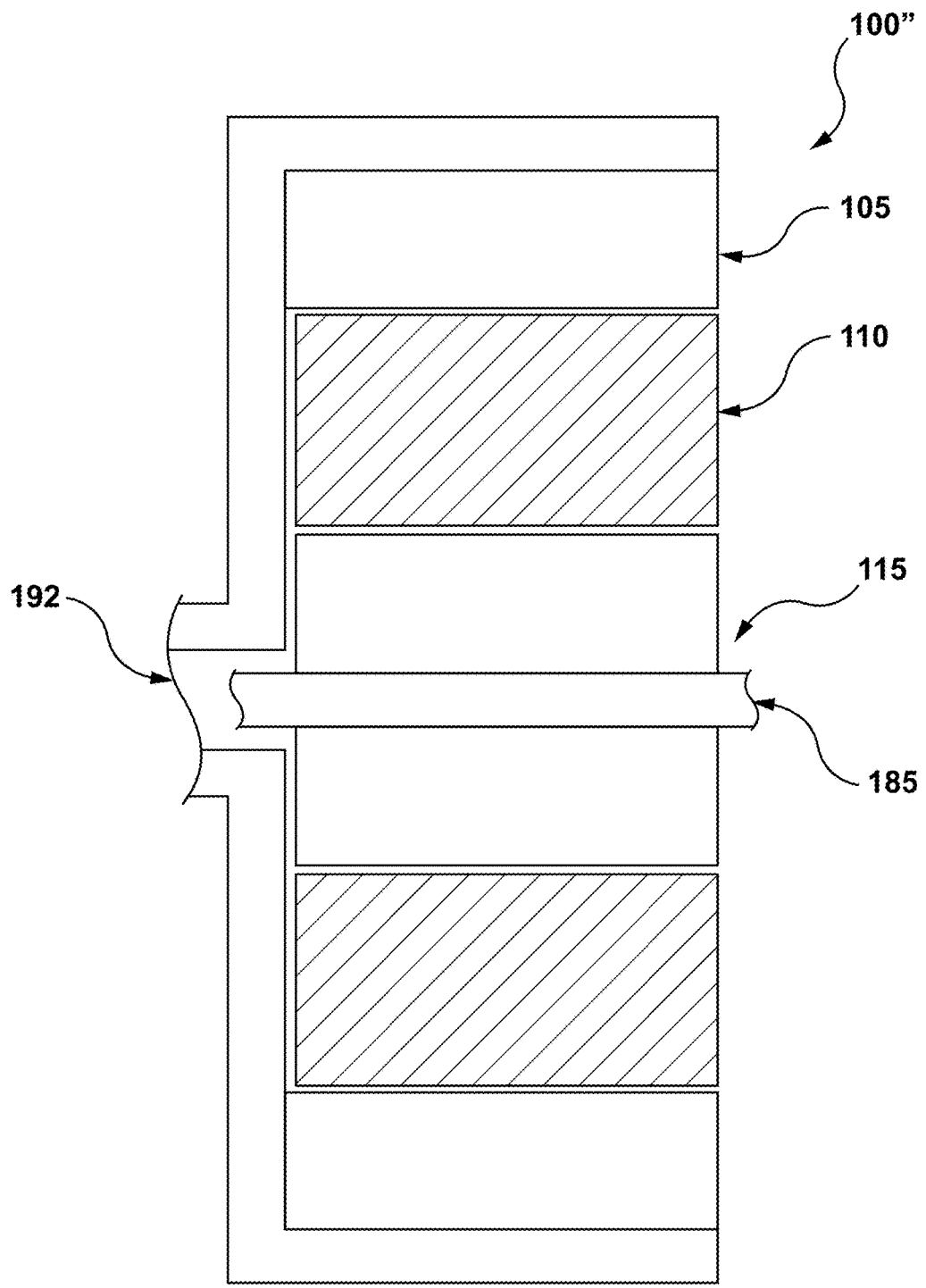
FIG. 1C is a cross-sectional side view of the switched reluctance machine of FIG. 1A.

Reference is next made to FIG. 1C, which illustrates a switched reluctance machine 100" according to an example embodiment. Switched reluctance machine 100" illustrates a cross-sectional side view of the switched reluctance machine 100 of FIG. 1A.

The switched reluctance machine 100" provides two output paths: one from the exterior rotor 105, and the other from the interior rotor 115. The exterior rotor 105 connects directly with the exterior shaft 192 and the interior rotor 115 connects directly with the interior shaft 185. In this configuration, both the exterior and the interior rotors 105 and 115, and accordingly both the exterior 192 and the interior 185 shafts, can be controlled independently by the exterior switched reluctance machine 120 and the interior switched reluctance machine 125, respectively.

As illustrated in FIG. 1C, the exterior output shaft 192 is placed at one direction while the interior output shaft 185 has terminal ends at both directions. This is for illustration purposes only. In some other embodiments, the exterior shaft 192 and the interior shaft 185 may be placed toward the opposite direction or have different number of terminal ends without affecting the functionality of the switched reluctance machine 100". The switched reluctance machine 100, 100' or 100" of FIG. 1A, 1B or 1C respectively may have any number of exterior stator poles 130, exterior rotor poles 145, exterior coils 140, interior stator poles 135, interior rotor poles 165, and interior coil windings 160.

Reference is next made to FIGS. 2A-2C, which illustrate the magnetic flux patterns of a 6/4 switched reluctance machine 200 according to various examples. The 6/4 SRM 200 comprises a stator 220 and a rotor 225 located inside the stator 220. The stator 220 comprises six stator poles, including a first stator pole 200a, a second stator pole 220b, a third stator pole 220c, a fourth stator pole 220d, a fifth stator pole 220e and a sixth stator pole 220f. Rotor 225 comprises four rotor poles, including a first rotor pole 225a, a second rotor pole 225b, a third rotor pole 225c and a fourth rotor pole 225d.

Reference is made to FIG. 2A, which illustrates a magnetic flux pattern 205a of a 6/4 SRM 200 in a first aligned rotor position according to an example embodiment. In the illustrated first aligned rotor position, the first rotor pole 225a and the third rotor pole 225c align with one set of opposing stator poles, such as the first stator pole 220a and the fourth stator pole 220d, respectively. In the configuration of FIG. 2A, the first stator pole 220a and the fourth stator pole 220d, which is opposite from the first stator pole 220a, are energized by windings 230a and 230b respectively forming a first phase. Windings 230a and 230b carry electric current in the direction represented using the cross (into the page) and dot (out of the page) symbols, which is a conventional technique of representing direction of current flow in the field.

As illustrated, in the 6/4 SRM 200, the whole stator yoke conducts magnetic flux. In FIG. 2A, a first major magnetic flux loop 210a and a second major magnetic flux loop 215a, both in clockwise direction, occupy the complete stator when the corresponding phase is excited.

Reference is next made to FIG. 2B, which illustrates a magnetic flux pattern 205b of a 6/4 SRM 200 in a second aligned rotor position according to an example embodiment. In the illustrated second aligned rotor position, the second rotor pole 225b and the fourth rotor pole 225d align with a different set of opposing stator poles, such as the sixth stator pole 220f and the third stator pole 220c respectively. As illustrated, the third stator pole 220c and the sixth stator pole 220f are energized by windings 235a and 235b respectively forming a second phase. Similar to FIG. 2A, when the second phase is excited, a first major magnetic flux loop 210b and a second major magnetic flux loop 215b occupy the complete stator.

Reference is next made to FIG. 2C, which illustrates a magnetic flux pattern 205c of a 6/4 SRM 200 in a third aligned rotor position according to an example embodiment. In the illustrated third aligned rotor position, the first rotor pole 225a and the third rotor pole 225c align with another set of opposing stator poles, such as the second stator pole 220b and the fifth stator pole 220e respectively. As illustrated, the second stator pole 220b and the fifth stator pole 220e are energized by windings 240a and 240b respectively forming a third phase. In FIG. 2C, a first major magnetic flux loop 210c and a second major magnetic flux loop 215c occupy the complete stator when the third phase is excited.

As illustrated in FIGS. 2A-2C, when the excitation changes from phase to phase, magnetic flux direction reverses at locations 245a and 245b on the stator yoke. In other words, when the phase excitation changes from FIGS. 2A to 2B and 2B to 2C, the magnetic flux direction changes at location 245a from clockwise in FIG. 2A to split clockwise and counter-clockwise in FIG. 2B, and to counter-clockwise in FIG. 2C. Similarly, the magnetic flux direction changes at location 245b from counter-clockwise in FIG. 2A to split clockwise and counter-clockwise in FIG. 2B, and to clockwise in FIG. 2C.

Even though the magnetic flux patterns illustrated in FIGS. 2A-2C are shown for a single rotor SRM, the same magnetic flux patterns result for each of the interior and exterior machines of the double rotor SRM. Consequently, a conventional double rotor SRM is required to have separate stator yoke regions to accommodate magnetic flux of both exterior and interior machines of the double rotor SRM. However, a double rotor SRM with a wider stator yoke tends to be bulky.

Figure 3:
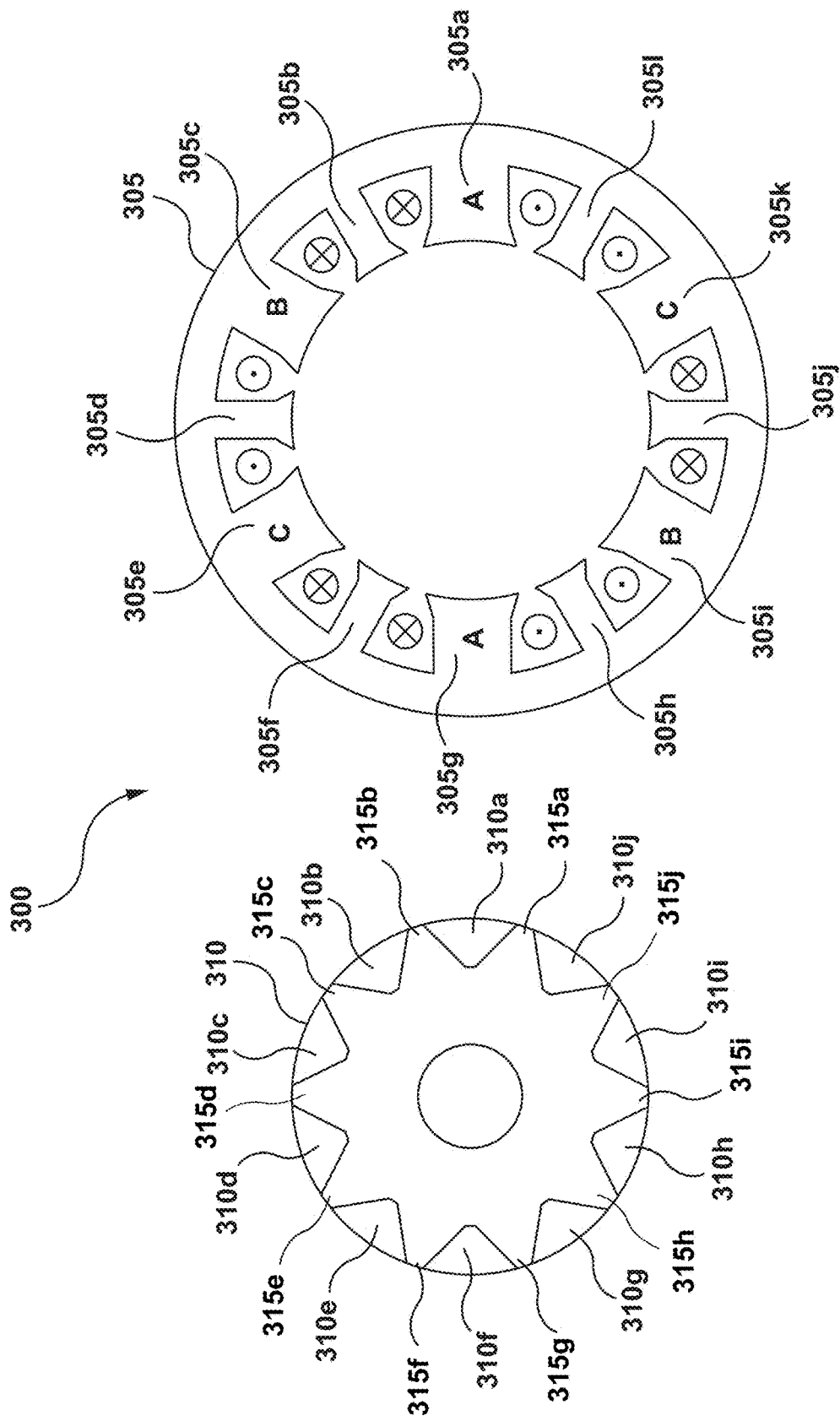
FIG. 3 illustrates a cross-sectional view of a double rotor switched reluctance motor with segmented rotor according to an example embodiment.

Reference is next made to FIG. 3, which illustrates a cross-sectional view of a switched reluctance machine 300 according to an example embodiment. Switched reluctance machine 300 is a single rotor switched reluctance machine with segmented rotor (referred to in this document also as "segmented single rotor SRM" or a "segmented rotor SRM").

Segmented single rotor SRM 300 is a 12/10 SRM comprising a stator 305 and a segmented rotor 310. Stator 305 comprises twelve stator poles including a first stator pole 305a, a second stator pole 305b, a third stator pole 305c, a fourth stator pole 305d, a fifth stator pole 305e, a sixth stator pole 305f, a seventh stator pole 305g, an eighth stator pole 305h, a ninth stator pole 305i, a tenth stator pole 305j, an eleventh stator pole 305k and a twelfth stator pole 305l. Segmented rotor 310 comprises ten rotor poles or segments including a first rotor pole 310a, a second rotor pole 310b, a third rotor pole 310c, a fourth rotor pole 310d, a fifth rotor pole 310e, a sixth rotor pole 310f, a seventh rotor pole 310g, an eighth rotor pole 310h, a ninth rotor pole 310i and a tenth rotor pole 310j.

As illustrated in FIG. 3, the segmented rotor 310 is made up of an array of segments forming the rotor poles 310a to 310j. In various embodiments, the rotor poles 310a to 310j are made of soft magnetic materials. Segmented rotor 310 further comprises filler pieces 315a to 315j between each rotor segment 310a to 310j. In various embodiments, the filler pieces 315a to 315j are made of non-magnetic materials.

As illustrated, a first filler piece 315a is provided between the tenth rotor pole 310j and the first rotor pole 310a, a second filler piece 315b is provided between the first rotor pole 310a and the second rotor pole 310b, a third filler piece 315c is provided between the second rotor pole 310b and the third rotor pole 310c, a fourth filler piece 315d is provided between the third rotor pole 310c and the fourth rotor pole 310d, a fifth filler piece 315e is provided between the fourth rotor pole 310d and the fifth rotor pole 310e, a sixth filler piece 315f is provided between the fifth rotor pole 310e and the sixth rotor pole 310f, a seventh filler piece 315g is provided between the sixth rotor pole 310f and the seventh rotor pole 310g, an eighth filler piece 315h is provided between the seventh rotor pole 310g and the eighth rotor pole 310h, a ninth filler piece 315i is provided between the eighth rotor pole 310h and the ninth rotor pole 310i, and a tenth filler piece 315j is provided between the ninth rotor pole 310i and the tenth rotor pole 310j.

In the segmented rotor configuration of a switched reluctance machine, the rotor poles 310a to 310j are disconnected from each other and consequently, the segmented rotor 310 does not have a rotor yoke. In the illustrated embodiment of a 12/10 segmented rotor SRM configuration, the machine effectively operates as a conventional six stator pole machine even though the stator 305 has twelve stator poles 305a to 305l. This is because only six of the twelve stator poles, such as the first stator pole 305a, the third stator pole 305c, the fifth stator pole 305e, the seventh stator pole 305g, the ninth stator pole 305i and the eleventh stator pole 305k, are wounded with coils and form phase poles. The other stator poles, such as the second stator pole 305b, the fourth stator pole 305d, the sixth stator pole 305f, the eighth stator pole 305h, the tenth stator pole 305j and the twelfth stator pole 305l, are not wounded with coils. These other stator poles have half the width of the phase poles and provide the advantage of flux bypass.

A conventional SRM, i.e. a non-segmented SRM, typically comprises a rotor made up of a single continuous soft magnetic material. The magnetic flux loop of a conventional SRM, as disclosed in FIGS. 2A-2C, is created by aligning two pairs of rotor and stator poles with each other. To allow pathways for magnetic flux between conducting stators and aligned rotor poles, there are both a stator yoke and a rotor yoke in the conventional machines. In a segmented rotor SRM, such as the 12/10 segmented rotor SRM 300, the rotor is formed by an array of magnetically isolated segments. A magnetic loop in this configuration is formed when a rotor segment spans over two adjacent stator poles and bridges an excited slot as discussed below.

Reference is next made to FIGS. 4A and 4B, which illustrate magnetic flux distribution in a segmented rotor SRM 400. Segmented rotor SRM 400 is a 12/10 segmented rotor SRM that comprises a stator 405 and a segmented rotor 410 located inside the stator 405. The 12/10 segmented rotor SRM 400 comprises twelve stator poles and ten rotor poles. While the stator 405 comprises twelve stator poles, only six stator poles form the phase poles, which are poles that are wounded with coils and form phases of the SRM when the coils are excited with electric current. As illustrated, stator 405 comprises a first phase pole 405a, a second phase pole 405b, a third phase pole 405c, a fourth phase pole 405d, a fifth phase pole 405e and a sixth phase pole 405f. Similarly, segmented rotor 410 comprises a first rotor pole 410a, a second rotor pole 410b, a third rotor pole 410c, a fourth rotor pole 410d, a fifth rotor pole 410e, a sixth rotor pole 410f, a seventh rotor pole 410g, an eighth rotor pole 410h, a ninth rotor pole 410i and a tenth rotor pole 410j.

FIG. 4A illustrates a magnetic flux distribution 405a of a segmented rotor SRM 400 according to an example embodiment. Magnetic flux distribution 405a of a segmented rotor SRM 400 results when the segmented rotor SRM 400 is in an aligned configuration. An aligned configuration is one where a rotor segment spans over two adjacent stator poles and bridges an excited slot. In the illustrated embodiment, the first rotor pole 410a and the tenth rotor pole 410j are magnetically aligned with the first stator phase pole 405a. In particular, the first rotor pole 410a spans over the first stator phase pole 405a and adjacent stator pole 405g, where the stator pole 405g is positioned between the first stator phase pole 405a and the second stator phase pole 405b, and the tenth rotor pole 410j spans over the first stator phase pole 405a and stator pole 405h positioned between the first stator phase pole 405a and the sixth phase pole 405f.

Similarly, in the illustrated embodiment, the fifth rotor pole 410e and the sixth rotor pole 410f are magnetically aligned with the fourth stator phase pole 405d. In particular, the fifth rotor pole 410e spans over the fourth stator phase pole 405d and stator pole 405i positioned between the fourth stator phase pole 405d and the third stator phase pole 405c, and the sixth rotor pole 410f spans over fourth stator phase pole 405d and stator pole 405j positioned between the fourth stator phase pole 405d and the fifth stator phase pole 405e.

As illustrated, in the aligned configuration 405a of the segmented rotor SRM 400, the magnetic flux loops are short and within one rotor segment. Since the magnetic conducting loop is within one rotor segment, no pathways are required between segments and therefore no rotor yoke is required in segmented rotor SRM.

FIG. 4B illustrates a magnetic flux distribution 405b of a segmented rotor SRM 400 in an unaligned configuration. In the unaligned configuration 405b, the tenth rotor pole 410j and the fifth rotor poles 410e are geometrically aligned with the first stator phase pole 405a and the fourth stator phase pole 405d respectively. However, in this configuration, the rotor 410 and the stator 405 are magnetically unaligned.

Reference is next made to FIGS. 5A-5C, which illustrate the magnetic flux patterns of a 12/10 segmented rotor SRM 500 according to various examples. The 12/10 segmented rotor SRM 500 comprises a stator 505 and a segmented rotor 510 located inside the stator 505. The stator 505 comprises six stator phase poles, including a first stator phase pole 505a, a second stator phase pole 505b, a third stator phase pole 505c, a fourth stator phase pole 505d, a fifth stator phase pole 505e and a sixth stator phase pole 505f. Segmented rotor 510 comprises ten rotor poles or segments, including a first rotor pole 510a, a second rotor pole 510b, a third rotor pole 510c, a fourth rotor pole 510d, a fifth rotor pole 510e, a sixth rotor pole 510f, a seventh rotor pole 510g, an eighth rotor pole 510h, a ninth rotor pole 510i and a tenth rotor pole 510j.

Reference is made to FIG. 5A, which illustrates a magnetic flux pattern 515a of a 12/10 SRM 500 according to an example embodiment. In this embodiment, SRM 500 is in a first aligned rotor position where the first rotor pole 510a and the tenth rotor pole 510j align with the first stator phase pole 505a, and the fifth rotor pole 510e and the sixth rotor pole 510f align with the fourth stator phase pole 505d. In this configuration, the first stator phase pole 505a and the fourth stator phase pole 505d are energized by windings 520a and 520b respectively forming a first phase. Windings 520a and 520b carry electric current in the direction represented using the cross (into the page) and dot (out of the page) symbols, which is a conventional technique of representing direction of current flow in the field. As illustrated, in the 12/10 segmented SRM 500, only about one third of the stator yoke conducts magnetic flux 515a when the first phase is energized.

Reference is made to FIG. 5B, which illustrates a magnetic flux pattern 515b of a 12/10 SRM 500 according to an example embodiment. In this embodiment, SRM 500 is in a second aligned rotor position where the third rotor pole 510*c* and the fourth rotor pole 510*d* align with the third stator phase pole 505*c*, and the eighth rotor pole 510*h* and the ninth rotor pole 510*i* align with the sixth stator phase pole 505*f*. In this configuration, the third stator phase pole 505*c* and the sixth stator phase pole 505*f* are energized by windings 525*a* and 525*b* respectively forming a second phase. Similar to the first aligned rotor position, only about one third of the stator yoke conducts magnetic flux 515*b* when the second phase is energized.

Reference is made to FIG. 5C, which illustrates a magnetic flux pattern 515*c* of a 12/10 SRM 500 according to an example embodiment. In this embodiment, SRM 500 is in a third aligned rotor position where the second rotor pole 510*b* and the third rotor pole 510*c* align with the second stator phase pole 505*b*, and the seventh rotor pole 510*g* and the eighth rotor pole 510*h* align with the fifth stator phase pole 505*e*. In this configuration, the second stator phase pole 505*b* and the fifth stator phase pole 505*e* are energized by windings 530*a* and 530*b* respectively forming a third phase. Similar to the first aligned rotor position and the second aligned rotor position, only about one third of the stator yoke conducts magnetic flux 515*c* when the third phase is energized.

Reference is next made to FIG. 6A, which illustrates a magnetic flux pattern 600 of a segmented double rotor SRM 605 according to an example embodiment. As illustrated, segmented double rotor SRM 605 includes a stator or a stator yoke 602 provided between an exterior rotor 604 and an interior rotor 606. In the illustrated embodiment, the segmented double rotor SRM 605 has both exterior and interior phases excited and sharing a stator yoke.

Segmented double rotor SRM 605 includes a plurality of exterior rotor segments 610, such as a first exterior rotor segment 610*a*, a second exterior rotor segment 610*b*, a third exterior rotor segment 610*c* and a fourth exterior rotor segment 610*d*. Segmented double rotor SRM 605 also includes a plurality of interior rotor segments 615, such as a first interior rotor segment 615*a*, a second interior rotor segment 615*b*, a third interior rotor segment 615*c* and a fourth interior rotor segment 615*d*.

The stator 602 of the segmented double rotor SRM 605 also includes exterior stator poles 620, such as a first exterior stator pole 620*a*, a second exterior stator pole 620*b*, a third exterior stator pole 620*c*, a fourth exterior stator pole 620*d* and a fifth exterior stator pole 620*e*. The stator 602 also includes interior stator poles 625, such as a first interior stator pole 625*a*, a second interior stator pole 625*b*, a third interior stator pole 625*c*, a fourth interior stator pole 625*d* and a fifth interior stator pole 625*e*.

As illustrated, the segmented double rotor SRM 605 is in an aligned position where the first exterior rotor segment 610*a* and the second exterior rotor segment 610*b* are aligned with the second exterior stator pole 620*b*, and the third interior rotor segment 615*c* and the fourth interior rotor segment 615*d* are aligned with the fourth interior stator pole 625*d*. In this configuration, the second exterior stator pole 620*b* and the fourth interior stator pole 625*d* are energized by windings 630*a* and 630*b* respectively.

As illustrated, when the second exterior stator pole 620*b* and the fourth interior stator pole 625*d* are energized, magnetic flux 600 results in both the exterior and interior machines and occupies different portions of the stator yoke 602. Since only one-third of the stator yoke conducts flux when a phase is excited in a segmented rotor SRM, phase excitation can be manipulated such that in a segmented double rotor SRM, such as the segmented double rotor SRM 605, both the exterior and interior machines use different portions of the stator yoke resulting in sharing of the stator. An advantage of stator sharing is the reduction of stator yoke thickness due to stator flux path sharing and elimination of flux barrier. In some cases, the stator yoke thickness of a segmented double rotor SRM can be reduced to more than half of a conventional double rotor SRM.

Reference is next made to FIG. 6B, which illustrates a magnetic flux pattern 650 of a conventional double rotor SRM 655 according to an example embodiment. As illustrated, double rotor SRM 655 includes a stator or a stator yoke 652 provided between an exterior rotor 654 and an interior rotor 656.

As illustrated, double rotor SRM 655 includes a plurality of exterior rotor poles 660, such as a first exterior rotor pole 660*a*, a second exterior rotor pole 660*b* and a third exterior rotor pole 660. Double rotor SRM 655 also includes a plurality of interior rotor poles 665, such as a first interior rotor pole 665*a*, a second interior rotor pole 665*b* and a third interior rotor pole 665*c*. Similarly, stator 652 includes a plurality of exterior stator poles 670, such as a first exterior stator pole 670*a*, a second exterior stator pole 670*b* and a third exterior stator pole 670*c*, and a plurality of interior stator poles 675, such as a first interior stator pole 675*a*, a second interior stator pole 675*b* and a third interior stator pole 675*c*.

In the illustrated embodiment, the double rotor SRM 655 is in an aligned position where the second exterior rotor pole 660*b* is aligned with the second exterior stator pole 670*b* and the second interior rotor pole 665*b* is aligned with the second interior stator pole 675*b*. In this configuration, the second exterior stator pole 670*b* and the second interior stator pole 675*b* are energized by windings 680*a* and 680*b* respectively.

As illustrated, when the second exterior stator pole 670*b* and the second interior stator pole 675*b* are energized, magnetic flux 650 results in both the exterior and interior machines and occupies the complete stator yoke 652. In addition, the double rotor SRM 655 has a flux barrier 685 to separate the magnetic flux paths of the exterior and interior machines. As a result, the thickness of the stator 652 is more than the stator of the segmented double rotor SRM 605 of FIG. 6A, and accordingly, a double rotor SRM 655 fails to provide the advantage of compact machine size.

Reference is next made to FIGS. 7A-14B, illustrating different configurations of a segmented double rotor SRM according to various embodiments. Some of the configurations of the segmented double rotor SRM include an exterior stator and wound inner rotor configuration, an exterior stator and wound exterior rotor configuration, a wound central stator configuration, a central stator and wound external rotor configuration, a central stator and wound inner rotor configuration, an inner stator and wound external rotor configuration, an inner stator and wound central rotor configuration, and a double layer wound stator configuration. These various configurations are discussed in detail below.

Segmented Double Rotor SRM with External Stator and Wound Interior Rotor

FIG. 7A illustrates a segmented double rotor SRM 700 according to an example embodiment. In the embodiment of FIG. 7A, which illustrates an exterior stator and wound inner rotor configuration, the segmented double rotor SRM 700 comprises an exterior stator 705, and an inner rotor 710 disposed inside the exterior stator 705. Inner rotor 710 includes an exterior rotor 715 and an interior rotor 720. FIG. 7B illustrates a longitudinal view of SRM 700 of FIG. 7A.

In the illustrated embodiment, exterior stator 705 comprises a first stator pole 705*a*, a second stator pole 705*b*, a third stator pole 705c, a fourth stator pole 705d, a fifth stator pole 705e, a sixth stator pole 705f, a seventh stator pole 705g, an eighth stator pole 705h, a ninth stator pole 705i, a tenth stator pole 705j, an eleventh stator pole 705k and a twelfth stator pole 705l.

As illustrated, the exterior rotor 715 comprises a plurality of segments, including outer segments and inner segments. Outer segments of the exterior rotor 715 are provided towards the outer side of the exterior rotor 715, and include a first exterior rotor pole 715a, a second exterior rotor pole 715b, a third exterior rotor pole 715c, a fourth exterior rotor pole 715d, a fifth exterior rotor pole 715e, a sixth exterior rotor pole 715f, a seventh exterior rotor pole 715g, an eighth exterior rotor pole 715h, a ninth exterior rotor pole 715i and a tenth exterior rotor pole 715j.

Inner segments of the exterior rotor 715 are provided towards the inner side of the exterior rotor 715, and include an eleventh exterior rotor pole 715k, a twelfth exterior rotor pole 715l, a thirteenth exterior rotor pole 715m, a fourteenth exterior rotor pole 715n, a fifteenth exterior rotor pole 715o, a sixteenth exterior rotor pole 715p, a seventeenth exterior rotor pole 715q, an eighteenth exterior rotor pole 715r, a nineteenth exterior rotor pole 715s and a twentieth exterior rotor pole 715t.

Similarly, interior rotor 720 comprises a first interior rotor pole 720a, a second interior rotor pole 720b, a third interior rotor pole 720c, a fourth interior rotor pole 720d, a fifth interior rotor pole 720e, a sixth interior rotor pole 720f, a seventh interior rotor pole 720g, an eighth interior rotor pole 720h, a ninth interior rotor pole 720i, a tenth interior rotor pole 720j, an eleventh interior rotor pole 720k and a twelfth interior rotor pole 720l.

In the illustrated embodiment, the interior rotor 720 is wound with windings 725. To maintain electrical connection of the interior rotor 720 with the power supply, the interior rotor 720 is provided with slip-rings 735. The exterior rotor 715 of the illustrated embodiment is unwound, and the interior rotor 720 rotates relative to exterior rotor 715. The stator 705 is wounded by coils 730.

In various embodiments, the outer segments and the inner segments of the exterior rotor 715 are made of magnetic conducting electric steel laminations, and the outer and inner segments are located on a bridge 740 made of magnetic non-conductive material, which also serves as a flux separator.

The segmented double rotor SRM 700 may have application in an electrical variable transmission (EVT) of a hybrid vehicle without mechanical gears. For example, the segmented double rotor SRM 700 may be used in a four quadrant energy transducer ("4QT"), which is an electric machine usable to keep the operation of the internal combustion engine (ICE) in a hybrid vehicle at maximum efficiency during all driving conditions.

In some cases, interior rotor 720 can be cooled through a fluid channel in shaft center. Cooling of exterior rotor 715 may not be necessary since the exterior rotor 715 is magnet free and thus can be subjected to much higher temperature. Stator 705 may rely on natural cooling only due to the big surface area of the stator 705.

In a conventional double rotor SRM, the exterior rotor 715 may be wider and thicker due to the need to maintain saliency and flux path accommodation. This may result in smaller available winding area of the phase coils in the external stator 705 and the interior rotor 720. However, the segmented double rotor SRM 700 may not require a thicker and wider exterior rotor 715 due to flux path sharing. This may have the advantage of a compact sized SRM 700.

Segmented Double Rotor SRM with External Stator and Wound Exterior Rotor

Reference is next made to FIGS. 8A and 8B, which illustrate a segmented double rotor SRM 800 according to an example embodiment. FIG. 8A illustrates a cross-sectional view of a segmented double rotor SRM 800 and FIG. 8B illustrates a longitudinal view of the segmented double rotor SRM 800 of FIG. 8A.

The segmented double rotor SRM 800 includes an exterior stator 805, and an inner rotor 810 disposed inside the exterior stator 805. Inner rotor 810 includes an exterior rotor 815 and an interior rotor 820. The embodiment of FIG. 8A differs from that of FIG. 7A in that in FIG. 8A, it is the exterior rotor that is provided with coil windings and in FIG. 7A, it is the interior rotor that is provided with coil windings.

In the illustrated embodiment, exterior stator 805 comprises a first stator pole 805a, a second stator pole 805b, a third stator pole 805c, a fourth stator pole 805d, a fifth stator pole 805e, a sixth stator pole 805f, a seventh stator pole 805g, an eighth stator pole 805h, a ninth stator pole 805i, a tenth stator pole 805j, an eleventh stator pole 805k and a twelfth stator pole 805l. The exterior stator poles 805a-805l are wound by exterior coils 830.

In the segmented double rotor SRM 800, the exterior rotor 815 comprises a plurality of segments on the outside of the rotor 815 and poles with wound coils on the inside of the rotor 815. The segments are held together by a bridge 840. The bridge 840 may consist of any material that minimizes flux coupling, such as, for example, a non-magnetic conductive material.

Outer segments of the exterior rotor 815 include a first exterior rotor pole 815a, a second exterior rotor pole 815b, a third exterior rotor pole 815c, a fourth exterior rotor pole 815d, a fifth exterior rotor pole 815e, a sixth exterior rotor pole 815f, a seventh exterior rotor pole 815g, an eighth exterior rotor pole 815h, a ninth exterior rotor pole 815i and a tenth exterior rotor pole 815j.

The inside of the exterior rotor 815, which is not segmented, includes coil wounded poles, such as an eleventh exterior rotor pole 815k, a twelfth exterior rotor pole 815l, a thirteenth exterior rotor pole 815m, a fourteenth exterior rotor pole 815n, a fifteenth exterior rotor pole 815o, a sixteenth exterior rotor pole 815p, a seventeenth exterior rotor pole 815q, an eighteenth exterior rotor pole 815r, a nineteenth exterior rotor pole 815s, a twentieth exterior rotor pole 815t, a twenty-first exterior rotor pole 815u and a twenty-second exterior rotor pole 815v. The interior coils 825 wound around the rotor poles 815k-815v are connected to a power supply via slip rings 835.

In the illustrated embodiment, the interior rotor 820 comprises a plurality of segments including a first interior rotor pole 820a, a second interior rotor pole 820b, a third interior rotor pole 820c, a fourth interior rotor pole 820d, a fifth interior rotor pole 820e, a sixth interior rotor pole 820f, a seventh interior rotor pole 820g, an eighth interior rotor pole 820h, a ninth interior rotor pole 820i and a tenth interior rotor pole 820j. In this embodiment, the interior rotor 820 is connected to a load.

In this embodiment, cooling of the interior coils 825 may be challenging since heat transfer may be least efficient for the exterior rotor 815 due to the double air gaps. However, by transferring coils to the exterior rotor 815, the internal rotor 820 of SRM 800 may have the advantages of increased rigidity and reliability. In some cases, the placement of interior windings/coils 825 may have an effect on the inertia of the exterior 815 and interior 820 rotors.

The segmented double rotor SRM 800 may be beneficial for high speed input load applications. In some cases, the segmented double rotor SRM 800 may be used in an electrical variable transmission (EVT) of a hybrid vehicle without mechanical gears.

Segmented Double Rotor SRM with Wound Central Stator

Reference is next made to FIGS. 9A and 9B, which illustrate a segmented double rotor SRM 900 according to an example embodiment. FIG. 9A illustrates a cross-sectional view of a segmented double rotor SRM 900 and FIG. 9B illustrates a longitudinal view of the segmented double rotor SRM 900 of FIG. 9A.

The segmented double rotor SRM 900 includes an exterior rotor 905, an interior rotor 910 and a stator 915, where the stator 915 is located in the center, sandwiched between an exterior rotor 905 located on the outside of stator 915 and an interior rotor 910 located on the inside of stator 915. SRM 900 also includes an exterior output shaft 935 coupled to the exterior rotor 905, and an interior output shaft 940 coupled to the interior rotor 910. In this configuration, the two rotor outputs are independent and either of them forms a switched reluctance machine with one side of the stator 915.

The exterior rotor 905 has a plurality of segments, such as a first exterior rotor pole 905a, a second exterior rotor pole 905b, a third exterior rotor pole 905c, a fourth exterior rotor pole 905d, a fifth exterior rotor pole 905e, a sixth exterior rotor pole 905f, a seventh exterior rotor pole 905g, an eighth exterior rotor pole 905h, a ninth exterior rotor pole 905i and a tenth exterior rotor pole 905j, where all the segments are held together by a bridge.

The interior rotor 910 also comprises a plurality of segments, such as first interior rotor pole 910a, a second interior rotor pole 910b, a third interior rotor pole 910c, a fourth interior rotor pole 910d, a fifth interior rotor pole 910e, a sixth interior rotor pole 910f, a seventh interior rotor pole 910g, an eighth interior rotor pole 910h, a ninth interior rotor pole 910i and a tenth interior rotor pole 910j. The plurality of segments 910a-910j are also held together by a bridge.

The stator 915 comprises a plurality of poles 915a-915x on the outer and inner sides of the stator 915. In particular, stator 915 includes a first stator pole 915a, a second stator pole 915b, a third stator pole 915c, a fourth stator pole 915d, a fifth stator pole 915e, a sixth stator pole 915f, a seventh stator pole 915g, an eighth stator pole 915h, a ninth stator pole 915i, a tenth stator pole 915j, an eleventh stator pole 915k, a twelfth stator pole 915l, a thirteenth stator pole 915m, a fourteenth stator pole 915n, a fifteenth stator pole 915o, a sixteenth stator pole 915p, a seventeenth stator pole 915q, an eighteenth stator pole 915r, a nineteenth stator pole 915s, a twentieth stator pole 915t, a twenty-first stator pole 915u, a twenty-second stator pole 915v, a twenty-third stator pole 915w and a twenty-fourth stator pole 915x.

As illustrated, stator poles 915a-915l are located on the outer side of the stator 915 and stator poles 915m-915x are located on the inner side of the stator 915. Both outer stator poles 915a-915l and inner stator poles 915m-915x share the same stator yoke 930.

In the illustrated embodiment, no coils are wound around the exterior rotor 905 and the interior rotor 910. Accordingly, no slip-rings are required in this machine configuration. This may have the advantage of reducing machine complexity. In the embodiment of FIGS. 9A and 9B, exterior coils 920 are wound around stator poles 915a-915l and interior coils 925 are wound around stator poles 915m-915x.

Since all the coils are in the center of the SRM 900, cooling may not be as efficient as in a conventional external wound stator machine where large surface area can be utilized and the machine can be air cooled. In some embodiments, stator 915 may be cooled using liquid cooling. Liquid cooling may provide the advantage of high power operations.

In this configuration, there are no magnetic force interactions between the exterior rotor 905 and the interior rotor 910, and therefore SRM 900 with a central stator 915 arrangement cannot be used as a 4QT. However, the configuration of SRM 900 may be applied to most power split type HEV powertrains where two independent output shafts are required. Furthermore, in the configuration of SRM 900, segmented rotor design allows flux path sharing of the stator yoke 915 between the exterior and the interior machines, which may reduce the size of the stator and hence the overall size of the machine 900.

Central Wound Stator with Wound External Rotor in a Segmented Double Rotor SRM

Reference is next made to FIGS. 10A and 10B, which illustrate a segmented double rotor SRM 1000 according to an example embodiment. FIG. 10A illustrates a cross-sectional view of a segmented double rotor SRM 1000 and FIG. 10B illustrates a longitudinal view of the segmented double rotor SRM 1000 of FIG. 10A.

The segmented double rotor SRM 1000 includes an exterior rotor 1005, an interior rotor 1010 and a stator 1015, where the stator 1015 is located in the center, sandwiched between an exterior rotor 1005 located on the outside of stator 1015 and an interior rotor 1010 located on the inside of stator 1015.

The exterior rotor 1005 has a plurality of poles 1005a-1005l, such as a first exterior rotor pole 1005a, a second exterior rotor pole 1005b, a third exterior rotor pole 1005c, a fourth exterior rotor pole 1005d, a fifth exterior rotor pole 1005e, a sixth exterior rotor pole 1005f, a seventh exterior rotor pole 1005g, an eighth exterior rotor pole 1005h, a ninth exterior rotor pole 1005i, a tenth exterior rotor pole 1005j, an eleventh exterior rotor pole 1005k and a twelfth exterior rotor pole 1005l. The exterior rotor poles 1005a-1005l are wound by exterior coils 1020. SRM 1000 includes slip rings 1035 to couple exterior rotor 1005 with an electric supply. This may increase the complexity of SRM 1000.

The interior rotor 1010 comprises a plurality of segments 1010a-1010j which are held together by a bridge 1030. As illustrated, the interior rotor 1010 includes a first interior rotor pole 1010a, a second interior rotor pole 1010b, a third interior rotor pole 1010c, a fourth interior rotor pole 1010d, a fifth interior rotor pole 1010e, a sixth interior rotor pole 1010f, a seventh interior rotor pole 1010g, an eighth interior rotor pole 1010h, a ninth interior rotor pole 1010i and a tenth interior rotor pole 1010j.

The stator 1015 comprises a combination of plurality of segments 1015a-1015j and a plurality of coils wound poles 1015k-1015v. As illustrated, the plurality of segments 1015a-1015j are located on the outside of the stator 1015 and include a first stator pole 1015a, a second stator pole 1015b, a third stator pole 1015c, a fourth stator pole 1015d, a fifth stator pole 1015e, a sixth stator pole 1015f, a seventh stator pole 1015g, an eighth stator pole 1015h, a ninth stator pole 1015i, and a tenth stator pole 1015j.

The coils wound poles 1015k-1015v are located on the inside of the stator 1015 and are wound by interior coils 1025. The inner poles of the stator 1015 include an eleventh stator pole 1015k, a twelfth stator pole 1015l, a thirteenth stator pole 1015m, a fourteenth stator pole 1015n, a fifteenth stator pole 1015o, a sixteenth stator pole 1015p, a seventeenth stator pole 1015q, an eighteenth stator pole 1015r, a nineteenth stator pole 1015s, a twentieth stator pole 1015t, a twenty-first stator pole 1015u and a twenty-second stator pole 1015v.

In this configuration, the exterior coils 1020 dissipate heat through the outer surface area of the SRM 1000. This has the advantage of increasing the cooling capacity of the exterior coils 1020 and making the exterior machine suitable for high power operations. The exterior coils 1020 may also make inertia of the external rotor significantly larger.

Central Wound Stator with Wound Internal Rotor in a Segmented Double Rotor SRM

Reference is next made to FIGS. 11A and 11B, which illustrate a segmented double rotor SRM 1100 according to an example embodiment. FIG. 11A illustrates a cross-sectional view of a segmented double rotor SRM 1100 and FIG. 11B illustrates a longitudinal view of the segmented double rotor SRM 1100 of FIG. 11A.

The segmented double rotor SRM 1100 includes an exterior rotor 1105, an interior rotor 1110 and a stator 1115, where the stator 1115 is located in the center, sandwiched between an exterior rotor 1105 located on the outside of stator 1115 and an interior rotor 1110 located on the inside of stator 1115.

The exterior rotor 1105 comprises a plurality of segments 1105a-1105j. As illustrated, the exterior rotor 1105 includes a first exterior rotor pole 1105a, a second exterior rotor pole 1105b, a third exterior rotor pole 1105c, a fourth exterior rotor pole 1105d, a fifth exterior rotor pole 1105e, a sixth exterior rotor pole 1105f, a seventh exterior rotor pole 1105g, an eighth exterior rotor pole 1105h, a ninth exterior rotor pole 1105i and a tenth exterior rotor pole 1105j.

The interior rotor 1110 has a plurality of poles 1110a-1110l, such as a first interior rotor pole 1110a, a second interior rotor pole 1110b, a third interior rotor pole 1110c, a fourth interior rotor pole 1110d, a fifth interior rotor pole 1110e, a sixth interior rotor pole 1110f, a seventh interior rotor pole 1110g, an eighth interior rotor pole 1110h, a ninth interior rotor pole 1110i, a tenth interior rotor pole 1110j, an eleventh interior rotor pole 1110k and a twelfth interior rotor pole 1110l. The interior rotor poles 1110a-1110l are wound by interior coils 1120. SRM 1100 includes slip rings 1135 to couple interior rotor 1110 with an electric supply. This may increase the complexity of SRM 1100.

The stator 1115 comprises a combination of plurality of segments 1115a-1115j and a plurality of coil wound poles 1115k-1115v. As illustrated, the plurality of segments 1115a-1115j are located on the inside of the stator 1115 and include a first stator pole 1115a, a second stator pole 1115b, a third stator pole 1115c, a fourth stator pole 1115d, a fifth stator pole 1115e, a sixth stator pole 1115f, a seventh stator pole 1115g, an eighth stator pole 1115h, a ninth stator pole 1115i, and a tenth stator pole 1115j.

The coils wound poles 1115k-1115v are located on the outside of the stator 1115 and are wound by exterior coils 1025. The outside poles of the stator 1115 include an eleventh stator pole 1115k, a twelfth stator pole 1115l, a thirteenth stator pole 1115m, a fourteenth stator pole 1115n, a fifteenth stator pole 1115o, a sixteenth stator pole 1115p, a seventeenth stator pole 1115q, an eighteenth stator pole 1115r, a nineteenth stator pole 1115s, a twentieth stator pole 1115t, a twenty-first stator pole 1115u and a twenty-second stator pole 1115v.

In the illustrated embodiment, segments 1115a-1115j of stator 1115 are made of electrical steel laminations. Coil wound stator poles 1115k-1115v and segments 1115a-1115j are separated by a bridge 1130. The bridge 1130 may be a non-magnetic conductive bridge. In this configuration, the exterior coils 1125 and interior coils 1120 may be cooled using fluid cooling since neither coils are close to the machine surface.

Inner Wound Stator with Wound External Rotor in a Segmented Double Rotor SRM

Reference is next made to FIGS. 12A and 12B, which illustrate a segmented double rotor SRM 1200 according to an example embodiment. FIG. 12A illustrates a cross-sectional view of a segmented double rotor SRM 1200 and FIG. 12B illustrates a longitudinal view of the segmented double rotor SRM 1200 of FIG. 12A.

The segmented double rotor SRM 1200 includes an exterior rotor 1205, an interior rotor 1210 and a stator 1215, where the interior rotor 1210 is disposed in the center, the exterior rotor 1205 is disposed on the outside of the interior rotor 1210 and the stator 1215 is disposed on the inside of the interior rotor 1210.

The exterior rotor 1205 has a plurality of coil wound poles 1205a-1205l, including a first exterior rotor pole 1205a, a second exterior rotor pole 1205b, a third exterior rotor pole 1205c, a fourth exterior rotor pole 1205d, a fifth exterior rotor pole 1205e, a sixth exterior rotor pole 1205f, a seventh exterior rotor pole 1205g, an eighth exterior rotor pole 1205h, a ninth exterior rotor pole 1205i, a tenth exterior rotor pole 1205j, an eleventh exterior rotor pole 1205k and a twelfth exterior rotor pole 1205l. In this embodiment, exterior coils 1225 are wound around the exterior rotor poles 1205a-1205l.

The interior rotor 1210 comprises a plurality of segments on the outside and inside of the interior rotor 1210. As illustrated, interior rotor 1210 comprises a first interior rotor pole 1210a, a second interior rotor pole 1210b, a third interior rotor pole 1210c, a fourth interior rotor pole 1210d, a fifth interior rotor pole 1210e, a sixth interior rotor pole 1210f, a seventh interior rotor pole 1210g, an eighth interior rotor pole 1210h, a ninth interior rotor pole 1210i, a tenth interior rotor pole 1210j, an eleventh interior rotor pole 1210k, a twelfth interior rotor pole 1210l, a thirteenth interior rotor pole 1210m, a fourteenth interior rotor pole 1210n, a fifteenth interior rotor pole 1210o, a sixteenth interior rotor pole 1210p, a seventeenth interior rotor pole 1210q, an eighteenth interior rotor pole 1210r, a nineteenth interior rotor pole 1210s and a twentieth interior rotor pole 1210t. Segments 1210a-1210j are provided on the outside of the interior rotor 1210, and segments 1210k-1210t are provided on the inside of the interior rotor 1210.

Stator 1215 comprises a plurality of coil wound poles 1215a-1215l, including a first stator pole 1215a, a second stator pole 1215b, a third stator pole 1215c, a fourth stator pole 1215d, a fifth stator pole 1215e, a sixth stator pole 1215f, a seventh stator pole 1215g, an eighth stator pole 1215h, a ninth stator pole 1215i, a tenth stator pole 1215j, an eleventh stator pole 1215k and a twelfth stator pole 1215l. In this embodiment, interior coils 1220 are wound around the stator poles 1215a-1215l.

In this embodiment, exterior coils 1225 wound around the exterior rotor poles 1205a-1205l are rotary and accordingly slip-rings are coupled to the exterior rotor 1205. Due to the exterior coils 1225 on exterior rotor 1205, rotor mass may be significantly larger.

In this embodiment, interior coils 1220 wound around the stator poles 1215a-1215l are stationary. Furthermore, in this embodiment, the segmented double rotor SRM 1200 forms an inner stator double rotor machine, which may have application in a four quadrant energy transducer ("4QT").

Inner Wound Stator with Wound Central Rotor in a Segmented Double Rotor SRM

Reference is next made to FIGS. 13A and 13B, which illustrate a segmented double rotor SRM 1300 according to an example embodiment. FIG. 13A illustrates a cross-sectional view of a segmented double rotor SRM 1300 and FIG. 13B illustrates a longitudinal view of the segmented double rotor SRM 1300 of FIG. 13A.

The segmented double rotor SRM 1300 includes an exterior rotor 1305, an interior rotor 1310 and a stator 1315, where the interior rotor 1310 is disposed in the center, the exterior rotor 1305 is disposed on the outside of the interior rotor 1310 and the stator 1315 is disposed on the inside of the interior rotor 1310.

The exterior rotor 1305 includes a plurality of segments 1305a-1305j, including a first exterior rotor pole 1305a, a second exterior rotor pole 1305b, a third exterior rotor pole 1305c, a fourth exterior rotor pole 1305d, a fifth exterior rotor pole 1305e, a sixth exterior rotor pole 1305f, a seventh exterior rotor pole 1305g, an eighth exterior rotor pole 1305h, a ninth exterior rotor pole 1305i and a tenth exterior rotor pole 1305j.

The interior rotor 1310 comprises a plurality of coil wound interior rotor poles 1310a-1310l on the outside of the interior rotor 1310 and a plurality of segments 1310m-1310v on the inside of the interior rotor 1310. Coil wound interior rotor poles 1310a-1310l include a first interior rotor pole 1310a, a second interior rotor pole 1310b, a third interior rotor pole 1310c, a fourth interior rotor pole 1310d, a fifth interior rotor pole 1310e, a sixth interior rotor pole 1310f, a seventh interior rotor pole 1310g, an eighth interior rotor pole 1310h, a ninth interior rotor pole 1310i, a tenth interior rotor pole 1310j, an eleventh interior rotor pole 1310k and a twelfth interior rotor pole 1310l. Exterior coils 1320 are wound around interior rotor poles 1310a-1310l and are coupled to an electric supply via slip-rings 1335.

The segments 1310m-1310v of the interior rotor 1310 include a thirteenth interior rotor pole 1310m, a fourteenth interior rotor pole 1310n, a fifteenth interior rotor pole 1310o, a sixteenth interior rotor pole 1310p, a seventeenth interior rotor pole 1310q, an eighteenth interior rotor pole 1310r, a nineteenth interior rotor pole 1310s, a twentieth interior rotor pole 1310t, a twenty-first interior rotor pole 1310u and a twenty-second interior rotor pole 1310v. The segments 1310m-1310v are held together by a bridge 1330. In the illustrated embodiment of FIG. 13A, the exterior rotor 1305 and the interior rotor 1310 are coupled through magnetic forces across the outer air gap. Furthermore, the internal rotor inertia may be large considering the mass of the SRM 1300.

As illustrated, the stator 1315 of SRM 1300 includes a plurality of coil wound poles 1315a-1315l, including a first stator pole 1315a, a second stator pole 1315b, a third stator pole 1315c, a fourth stator pole 1315d, a fifth stator pole 1315e, a sixth stator pole 1315f, a seventh stator pole 1315g, an eighth stator pole 1315h, a ninth stator pole 1315i, a tenth stator pole 1315j, an eleventh stator pole 1315k and a twelfth stator pole 1315l. In this embodiment, interior coils 1325 are wound around the stator poles 1315a-1315l. The illustrated segmented double rotor SRM 1300 may be suitable for 4QT application.

Double Layer Wound Stator in a Segmented Double Rotor SRM

Reference is next made to FIGS. 14A and 14B, which illustrate a segmented double rotor SRM 1400 according to an example embodiment. FIG. 14A illustrates a cross-sectional view of a segmented double rotor SRM 1400 and FIG. 14B illustrates a longitudinal view of the segmented double rotor SRM 1400 of FIG. 14A.

The segmented double rotor SRM 1400 includes an exterior stator 1405, an exterior rotor 1410, an interior rotor 1415 and an interior stator 1420, where the interior rotor 1415 is disposed around the interior stator 1420, exterior rotor 1410 is disposed around the interior rotor 1415 and exterior stator 1405 is disposed around the exterior rotor 1410.

In this embodiment, both the exterior stator 1405 and the interior stator 1420 have coil wound stator poles. Exterior stator 1405 includes a first exterior stator pole 1405a, a second exterior stator pole 1405b, a third exterior stator pole 1405c, a fourth exterior stator pole 1405d, a fifth exterior stator pole 1405e, a sixth exterior stator pole 1405f, a seventh exterior stator pole 1405g, an eighth exterior stator pole 1405h, a ninth exterior stator pole 1405i, a tenth exterior stator pole 1405j, an eleventh exterior stator pole 1405k and a twelfth exterior stator pole 1405l. Exterior rotor poles 1405a-1405l are wound around by exterior coils 1425.

Interior stator 1420 includes a first interior stator pole 1420a, a second interior stator pole 1420b, a third interior stator pole 1420c, a fourth interior stator pole 1420d, a fifth interior stator pole 1420e, a sixth interior stator pole 1420f, a seventh interior stator pole 1420g, an eighth interior stator pole 1420h, a ninth interior stator pole 1420i, a tenth interior stator pole 1420j, an eleventh interior stator pole 1420k and a twelfth interior stator pole 1420l. Interior rotor poles 1420a-1420l are wound around by interior coils 1420. In the illustrated embodiment, the exterior coils 1425 and the interior coils 1420 are stationary. Accordingly, no slip-rings are required in this embodiment.

In this embodiment, the exterior rotor 1410 and the interior rotor 1415 are segmented and the two sets of rotor segments are located on the outside and inside of the rotor sleeve are made of non-magnetic conducting material. Exterior rotor 1410 comprises a plurality of segments, including a first exterior rotor pole 1410a, a second exterior rotor pole 1410b, a third exterior rotor pole 1410c, a fourth exterior rotor pole 1410d, a fifth exterior rotor pole 1410e, a sixth exterior rotor pole 1410f, a seventh exterior rotor pole 1410g, an eighth exterior rotor pole 1410h, a ninth exterior rotor pole 1410i and a tenth exterior rotor pole 1410j.

Similarly, interior rotor 1415 comprises a plurality of segments, including a first interior rotor pole 1415a, a second interior rotor pole 1415b, a third interior rotor pole 1415c, a fourth interior rotor pole 1415d, a fifth interior rotor pole 1415e, a sixth interior rotor pole 1415f, a seventh interior rotor pole 1415g, an eighth interior rotor pole 1415h, a ninth interior rotor pole 1415i and a tenth interior rotor pole 1415j.

In some embodiments, the exterior rotor 1410 and the interior rotor 1415 are uncoupled, and the configuration of SRM 1400 delivers two independent outputs. In some other embodiments, the exterior rotor 1410 and the interior rotor 1415 may be mechanically coupled, and the configuration of SRM 1400 may deliver a single output. In the single output configuration, the exterior and interior coils excitations are synchronized to give a steady torque output.

In the configuration of SRM 1400, the stator 1405 on the outside makes cooling of the SRM 1400 more efficient. However, since this configuration has an additional air gap and the stator is not as compact, SRM 1400 is likely to be mechanically complex.

Reference is next made to FIG. 15, which illustrates a winding configuration of a segmented double rotor SRM 1500 according to an example embodiment. The configuration of SRM 1500 is analogous to the configuration of SRM 900 as illustrated in FIGS. 9A and 9B having an exterior rotor 1505, an interior rotor 1515 and a stator 1510 sandwiched between the exterior rotor 1505 on the outside and interior rotor 1515 on the inside. Accordingly, the segmented double rotor SRM 1500 forms an exterior machine and an interior machine, as discussed below. In the embodiment of FIG. 15, the exterior rotor 1505 and the interior rotor 1515 are segmented, and the stator 1510 has coil wound poles on the outer and inner sides of the stator 1510.

As illustrated, the interior and exterior machines of SRM 1500 have the same number of phases and the same polarity of the coil windings. Stator 1510 has a plurality of stator poles on the outside and inside of the stator 1510 where the stator poles are wound by coils. In the illustrated embodiment, the coil windings on the stator poles 1510*a*-1510*f* on the outside of the stator 1510 result in three phases. Phase A is formed by stator poles 1510*a* and 1510*d*, phase B is formed by stator poles 1510*b* and 1510*e* and phase C is formed by stator poles 1510*c* and 1510*g*. Similarly, the coil windings on the stator poles 1510*g*-1510*l* on the inside of the stator 1510 result in three phases, where phase A is formed by stator poles 1510*g* and 1510*j*, phase B is formed by stator poles 1510*h* and 1510*k* and phase C is formed by stator poles 1510*i* and 1510*l*.

In the illustrated embodiment, the windings around each of the stator poles 1510*a*-1510*f* have the same polarity as the windings around each of the stator poles 1510*g*-1510*l* respectively. In other words, the polarity of coil windings around stator pole 1510*a* is the same as the polarity of coil windings around stator pole 1510*g*, the polarity of coil windings around stator pole 1510*b* is the same as the polarity of coil windings around stator pole 1510*h*, the polarity of coil windings around stator pole 1510*c* is the same as the polarity of coil windings around stator pole 1510*i*, the polarity of coil windings around stator pole 1510*d* is the same as the polarity of coil windings around stator pole 1510*j*, the polarity of coil windings around stator poles 1510*e* is the same as the polarity of coil windings around stator pole 1510*k* and the polarity of coil windings around stator pole 1510*f* is the same as the polarity of coil windings around stator pole 1510*l*.

As well, in SRM 1500, adjacent phases formed by coil windings around stator poles have opposite winding polarity. For example, phase A windings around stator poles 1510*a* and 1510*g* have a polarity opposite to phase B windings around stator poles 1510*b* and 1510*h* respectively. Likewise, phase B windings around stator poles 1510*b* and 1510*h* have a polarity opposite to phase C windings around stator poles 1510*c* and 1510*i* respectively, phase C windings around stator poles 1510*c* and 1510*i* have a polarity opposite to phase A windings around stator poles 1510*d* and 1510*j* respectively, phase A windings around stator poles 1510*d* and 1510*j* have a polarity opposite to phase B windings around stator poles 1510*e* and 1510*k* respectively, phase B windings around stator poles 1510*e* and 1510*k* have a polarity opposite to phase C windings around stator poles 1510*f* and 1510*l* respectively, and phase C windings around stator poles 1510*f* and 1510*l* have a polarity opposite to phase A windings around stator poles 1510*a* and 1510*g* respectively.

In the embodiment illustrated in FIG. 15, since both interior and exterior machines have three phases, two excitation conditions arise that require sharing of stator back-iron. The first excitation condition occurs when the adjacent phases of interior and exterior machines, such as, for example, exterior phase A and interior phase B, are tuned on simultaneously. At the junctions of adjacent exterior and interior phases, the same winding polarities result in opposite fluxes.

The second excitation condition occurs when the same phases of interior and exterior machines, such as, for example, exterior phase A and interior phase A, are tuned on simultaneously. By having the interior machine winding polarity identical to the exterior machine winding polarity, when the same phase of the exterior and interior machines is excited, fluxes with opposite directions result in the stator yoke.

Reference is next made to FIGS. 16A and 16B, which illustrate isolated exterior and interior machines according to example embodiments. FIG. 16A illustrates the symmetrical half of a cross-sectional view of an isolated exterior SRM 1600 according to an example embodiment. FIG. 16B illustrates the symmetrical half of a cross-sectional view of an isolated interior SRM 1650 according to an example embodiment.

Isolated exterior SRM 1600 comprises an exterior rotor 1605 and a stator 1610 disposed inside the exterior rotor 1605. Isolated interior SRM 1650 comprises the stator 1610 and an interior rotor 1615 disposed inside the stator 1610. Exterior rotor 1605 and interior rotor 1615 are segmented, and stator 1610 comprises coil wound stator poles on the outer and inner edges of the stator 1610.

Reference is next made to FIGS. 17A-17F, which illustrate magnetic flux density plots of different configurations of SRMs according to different embodiments. FIG. 17A illustrates a magnetic flux density plot 1700 of an isolated exterior SRM, such as an isolated exterior SRM 1600 of FIG. 16A, according to an example embodiment. FIG. 17B illustrates a magnetic flux density plot 1710 of an exterior machine of a segmented double rotor SRM, such as a central stator wound SRM 1500 of FIG. 15A, according to an example embodiment. The magnetic flux density plot 1710 of FIG. 17B results when adjacent phases (for example, exterior phase A and interior phase B or C, but not interior phase A) are excited. FIG. 17C illustrates a magnetic flux density plot 1720 of an exterior machine of a segmented double rotor SRM, such as a central stator wound SRM 1500 of FIG. 15A, according to an example embodiment. The magnetic flux density plot 1720 of FIG. 17C results when same phases (for example, exterior phase A and interior phase A) are excited.

FIG. 17D illustrates a magnetic flux density plot 1730 of an isolated interior SRM, such as an isolated interior SRM 1650 of FIG. 16B, according to an example embodiment. FIG. 17E illustrates a magnetic flux density plot 1740 of an interior machine of a segmented double rotor SRM, such as a central stator wound SRM 1500 of FIG. 15A, according to an example embodiment. The magnetic flux density plot 1740 of FIG. 17E results when adjacent phases (for example, exterior phase A and interior phase B or C, but not interior phase A) are excited. FIG. 17F illustrates a magnetic flux density plot 1750 of an interior machine of a segmented double rotor SRM, such as a central stator wound SRM 1500 of FIG. 15A, according to an example embodiment. The magnetic flux density plot 1750 of FIG. 17F results when same phases (for example, exterior phase A and interior phase A) are excited.

As illustrated, away from the stator back-iron, the magnetic flux density plots 1700, 1710 and 1720 of FIGS. 17A, 17B and 17C are almost identical to each other and magnetic flux density plots 1730, 1740 and 1750 of FIGS. 17D, 17E and 17F are almost identical to each other. Since the magnetic flux density plots are almost identical between isolated and shared conditions, the stator back-iron flux path sharing has a negligible impact on machine operation when adjacent phases or same phases are excited. Furthermore, on the stator back-iron section where magnetic flux coupling does occur, flux density does not increase at any location. In fact, some positions even see a reduction in flux density. This is achieved by winding polarity design, as illustrated in SRM 1500 of FIG. 15, and is critical in ensuring that stator back-iron sharing does not lead to iron loss increase.

Due to the winding polarity design, as illustrated in SRM 1500 of FIG. 15, when adjacent phases are excited, as illustrated in FIGS. 17B and 17E, the flux directions of the exterior and interior machines are opposite at the shared junction, creating a small region with nearly zero flux density. Similarly, when same phases are excited, as illustrated in FIGS. 17C and 17F, the exterior and interior machines use same back-iron section, and flux directions within the same back-iron are maintained opposite, resulting in reduced back-iron flux density than a single rotor machine.

Reference is next made to FIGS. 18A-21B, which illustrate a quantitative measure of the impact of magnetic coupling between exterior and interior machines of a segmented double rotor SRM on machine magnetic characteristics, such as static torque and phase inductance, according to various example embodiments. In the illustrated embodiments, the static torques of FIGS. 19A, 19B, 21A and 21B and phase inductances of FIGS. 18A, 18B, 20A and 20B are determined using finite element analysis (FEA). In the illustrated embodiments, the FEA calculations are conducted under constant excitation current at rated machine operation level.

FIG. 18A illustrates a graphical representation 1800 of coupling effect on exterior machine inductance when adjacent phases are turned on. FIG. 18B illustrates a graphical representation 1850 of coupling effect on exterior machine inductance when same phases are turned on. Similarly, FIG. 20A illustrates a graphical representation 2000 of coupling effect on interior machine inductance when adjacent phases are turned on. FIG. 20B illustrates a graphical representation 2050 of coupling effect on interior machine inductance when same phases are turned on.

FIG. 19A illustrates a graphical representation 1900 of coupling effect on exterior machine torque when adjacent phases are turned on. FIG. 19B illustrates a graphical representation 1950 of coupling effect on exterior machine torque when same phases are turned on. FIG. 21A illustrates a graphical representation 2100 of coupling effect on interior machine torque when adjacent phases are turned on. FIG. 21B illustrates a graphical representation 2150 of coupling effect on interior machine torque when same phases are turned on.

As illustrated, in the embodiments of FIGS. 18A-21B, to cover the full range of rotor position combinations, both the exterior and interior rotor positions are varied from 0 to 36 mechanical degrees with 1 degree interval in the analysis. Rotor position at 0 mechanical degree corresponds to the start of an unaligned position (the minimum inductance position) and 36 mechanical degree corresponds to the next unaligned position. At 18 mechanical degree, the rotor is at aligned position.

In the embodiments of FIGS. 18A-21B, the differences in static torque and phase inductance are fairly small for both exterior and interior machines regardless of the excitation condition. For both machines, the difference in phase inductance is within 1%, as evidenced from FIGS. 18A, 18B, 20A and 20B, and the torque difference within 5%, as evidenced from FIGS. 19A, 19B, 21A and 21B. In fact, torque difference is within 1% for most rotor positions. Bigger difference is only observed near unaligned positions where torque is low and more strongly affected by calculation error.

It is observed that the machine magnetic characteristic is almost invariant to changes of rotor position of the other machine. This indicates that coupling between the two machines is negligible in the segmented double rotor SRM. Because the differences between isolated models and the segmented double rotor SRM are very small, the isolated models can be relied on for reasonably accurate estimation of machine performance. In various cases, the isolated models are used frequently to simplify machine design optimization.

Reference is next made to FIG. 22 which illustrates a longitudinal section of a segmented double rotor SRM 2200 according to an example embodiment. In particular, FIG. 22 illustrates a mechanically constructed prototype of a segmented double rotor SRM 2200.

As illustrated, the SRM 2200 includes an exterior rotor 2205, a central stator 2210 and an interior rotor 2210. The interior rotor 2210 is located in the center of the stator assembly through a pair of bearings 2245 on the ends of exterior rotor output shaft 2230 and interior rotor output shaft 2235. The stator 2210, which is enclosed by the exterior rotor 2205, has its rear end extruded out as a mount surface.

SRM 2200 has rotor segment 2225 in the exterior rotor 2205 and interior rotor 2215. In some embodiments, rotor segments are laser machined from 0.35 mm thick silicon steel. In various cases, the rotor segments 2225 are joined together by aluminum holders with correspondingly shaped dovetail slots. The dovetail slots may be machined using wired electrical discharge machining (EDM) with a plus tolerance to ensure clearance fit of the segments.

In the illustrated embodiment, the steadiness of the segments are maintained by clamping force of the rotor end clamping plates/rings as well as epoxy bonding created during the vacuum pressure impregnation (VPI) process. The rotor diameters are finally cylindrically ground to achieve the required size and concentricity accuracy.

Reference is next made to Table 1, illustrating key dimensions of a mechanically constructed segmented double rotor SRM, such as the segmented double rotor SRM 2200, according to various embodiments. Table 1 illustrates a set of key dimensions for various components of a segmented double rotor SRM according to an example embodiment.

TABLE 1

Set of Key Dimensions for Segmented Double Rotor SRM Components

| | Key Dimensions | |
|---|---|---|
| | Exterior | Interior |
| Number of stator poles | 12 | 12 |
| Number of rotor poles | 10 | 10 |
| Air gap length | 0.3 mm | 0.3 mm |
| Stack length | 50 mm | 50 mm |
| Air gap diameter | 180.3 mm | 80.0 mm |
| Stator back-iron thickness | 15 mm (shared) | |
| Stator tooth width | 21/10.5 mm | 10/5 mm |
| Stator tooth height | 18 mm | 17 mm |
| Slot fill factor | 38% | 35% |
| Overall length | 160 mm | |
| Overall diameter | 230 mm | |

Reference is next made to FIGS. 23A and 23B which illustrate static torque measurements of interior and exterior machines of a segmented double rotor SRM according to example embodiments. FIG. 23A illustrates a graphical representation of torque measurements 2300 of interior machine of a segmented double rotor SRM. FIG. 23B illustrates a graphical representation of torque measurements 2350 of exterior machine of a segmented double rotor SRM.

In FIG. 23A, simulated/calculated torque profiles of the exterior machine of a segmented double rotor SRM are illustrated using dotted lines and real torque profiles of the exterior machine of a segmented double rotor SRM are illustrated using solid lines. Plots 2302 and 2304 illustrate the real and calculated torque profiles at current level of 5 A respectively, plots 2306 and 2308 illustrate the real and calculated torque profiles at current level of 4 A respectively, plots 2310 and 2312 illustrate the real and calculated torque profiles at current level of 3 A respectively, plots 2314 and 2316 illustrate the real and calculated torque profiles at current level of 2 A respectively, plots 2318 and 2320 illustrate the real and calculated torque profiles at current level of 1 A respectively.

In FIG. 23B, simulated/calculated torque profiles of the interior machine of a segmented double rotor SRM are illustrated using dotted lines and real torque profiles of the interior machine of a segmented double rotor SRM are illustrated using solid lines. Plots 2352 and 2354 illustrate the real and calculated torque profiles at current level of 6 A respectively, plots 2356 and 2358 illustrate the real and calculated torque profiles at current level of 5 A respectively, plots 2360 and 2362 illustrate the real and calculated torque profiles at current level of 4 A respectively, plots 2364 and 2366 illustrate the real and calculated torque profiles at current level of 3 A respectively, plots 2368 and 2370 illustrate the real and calculated torque profiles at current level of 2 A respectively, and plots 2372 and 2374 illustrate the real and calculated torque profiles at current level of 1 A respectively.

In the embodiments of FIGS. 23A and 23B, the static torque of each machine is measured individually at varying rotor positions. For example, at rated current of 4 A, exterior machine delivers a static torque averaging close to 8 Nm at around rotor positions of 6 mechanical degrees to 12 mechanical degrees. Similarly, at rated current of 4 A, interior machine delivers a static torque averaging close to 2 Nm at around rotor positions of 7 mechanical degrees to 10 mechanical degrees. As illustrated in FIGS. 23A and 23B, the torque measurements are in good agreement with simulation result at most excitation current levels.

Reference is next made to FIGS. 24A, 24B, 25A and 25B, which illustrate graphical representations of flux linkage loci measurements of interior and exterior machines under coupling effect. In the illustrated embodiments, the flux-linkage/current loci of a segmented double rotor SRM is obtained by operating a prototype segmented double rotor SRM at varying rotor positions, measuring the voltage and current of the segmented double rotor SRM and calculating the flux-linkage from the voltage and current waveform measurements using equation (1) below:

$$\varphi = \int_0^t (V - tR) dt \quad (1)$$

In FIGS. 24A, 24B, 25A and 25B, the solid lines indicate flux-linkage/current loci without magnetic coupling for interior and exterior machines, and dotted lines indicate flux-linkage/current loci with magnetic coupling for interior and exterior machines. In the illustrated embodiments, the without magnetic coupling condition is the result of operating isolated interior and exterior machines, such as isolated interior machine 1650 of FIG. 16B and isolated exterior machine 1600 of FIG. 16A.

FIG. 24A illustrates a graphical representation of flux linkage loci measurement 2400 of an interior machine under same phase coupling effect according to an example embodiment. FIG. 24B illustrates a graphical representation of flux linkage loci measurement 2450 of an interior machine under adjacent phase coupling effect according to an example embodiment. In FIGS. 24A and 24B, the solid lines indicate flux linkage loci measurement of interior machine without magnetic coupling and dotted lines indicate flux-linkage/current loci with magnetic coupling FIG. 25A illustrates a graphical representation of flux linkage loci measurement 2500 of an exterior machine under same phase coupling effect according to an example embodiment. FIG. 25B illustrates a graphical representation of flux linkage loci measurement 2550 of an exterior machine under adjacent phase coupling effect according to an example embodiment. In FIGS. 24A and 24B, the solid lines indicate flux linkage loci measurement of exterior machine without magnetic coupling and dotted lines indicate flux-linkage/current loci with magnetic coupling As illustrated in FIGS. 24A, 24B, 25A and 25B, flux-linkage loci points are mostly overlapping between coupled and isolated conditions, i.e. between with and without magnetic coupling conditions. This indicates that the difference in flux-linkage due to coupling between the machines is negligible for both the exterior and interior machines.

Reference is next made to FIGS. 26A and 26B, which illustrate graphical representations of phase current waveforms for interior and exterior machines under different conditions. In particular, FIG. 26A illustrates a graphical representation of phase current waveforms 2600 for an interior machine of a segmented double rotor SRM according to an example embodiment. FIG. 26B illustrates a graphical representation of phase current waveforms 2600 for an exterior machine of a segmented double rotor SRM according to an example embodiment.

In FIG. 26A, plot 2610 illustrates the phase current waveform of a coupled interior machine of a segmented double rotor SRM as a function of rotor position when the interior and the exterior machines of the segmented double rotor SRM are rotating in opposite directions. Similarly, plot 2620 illustrates the phase current waveform of a coupled interior machine of a segmented double rotor SRM as a function of rotor position when the interior and the exterior machines of the segmented double rotor SRM are rotating in the same direction. In FIG. 26A, plot 2630 illustrates the phase current waveform of an isolated interior machine as a function of rotor position.

In FIG. 26B, plot 2660 illustrates the phase current waveform of a coupled exterior machine of a segmented double rotor SRM as a function of rotor position when the interior and the exterior machines of the segmented double rotor SRM are rotating in opposite directions. Similarly, plot 2670 illustrates the phase current waveform of a coupled exterior machine of a segmented double rotor SRM as a function of rotor position when the interior and the exterior machines of the segmented double rotor SRM are rotating in the same direction. In FIG. 26B, plot 2680 illustrates the phase current waveform of an isolated exterior machine as a function of rotor position.

As illustrated in FIGS. 26A and 26B, no noticeable difference can be identified in phase current waveforms of both the interior and exterior machines regardless of the rotation direction. It is observed that the coupling between the exterior and the interior machines of a segmented double rotor SRM have negligible impact on machine performance.

In the various embodiments disclosed herein, compared to double rotor switched reluctance machines with a more conventional structure, the segmented double rotor machines exhibit potentials of achieving higher compactness and performance due to the yokeless rotor design and better machine integration.

The segmented double rotor switched reluctance machines disclosed herein may be applied to any systems that require two rotatory outputs. The topologies are suitable for a broad range of high performance applications in automotive, aerospace, locomotive, ship or marine industry etc., and in particular, in advanced hybrid electric vehicle powertrains typically requiring dual electro-mechanical ports. Some examples of powertrain architecture types where a segmented double rotor SRM can be used include a complex power split type and an electrical variable transmission type.

In various embodiments of the segmented double rotor switched reluctance machines disclosed herein, the machines have no rotor yoke, which result in a much thinner rotor section than a conventional design. Applying a segmented rotor design in a double rotor switched reluctance machine may have the advantages of reduced size and weight of the rotors. This may be utilized to improve the compactness (reduce overall machine size) or the performance (increase winding area thus reduce loss).

In various embodiments of the segmented double rotor switched reluctance machines disclosed herein, the stator yoke is shared between the exterior and the interior machines of the segmented double rotor SRM. By sharing the yoke section for magnetic flux passage, yoke thickness of the SRM may be significantly reduced, saving material and improving machine compactness.

In various embodiments of the segmented double rotor switched reluctance machines disclosed herein the stator is sandwiched between an exterior rotor and an interior rotor, and the stator yoke is shared between the exterior machine formed by the stator and the exterior rotor and the interior machine formed by the stator and the interior rotor. In such embodiments, the sharing feature tends neither to increase the machine loss nor affect independent operation and control of the two rotors, making the double rotor machine better off than two stand-alone regular machines.

The above-described embodiments and applications of the present invention are intended only to be examples. Alterations, modifications and variations may be effected to the particular embodiments by those of ordinary skill in the art, in light of this teaching, without departing from the spirit of or exceeding the scope of the claimed invention.

The invention claimed is:

1. A switched reluctance machine comprising:
an interior rotor;
an exterior rotor spaced from the interior rotor, the interior rotor and the exterior rotor being concentrically disposed; and
a stator disposed concentrically between the interior rotor and the exterior rotor, the stator comprising a stator yoke, the stator having an exterior side comprising a plurality of exterior stator poles and an interior side comprising a plurality of interior stator poles,
wherein the interior rotor and the interior side of the stator are configured to provide an interior switched reluctance machine, and the exterior rotor and the exterior side of the stator are configured to provide an exterior switched reluctance machine,
wherein at least one of the interior rotor and the exterior rotor comprises an array of magnetically isolated segments and filler segments, and
wherein each of the plurality of exterior stator poles and the plurality of interior stator poles comprise concentrated coils, and wherein adjacent concentrated coils are wound in opposite directions such that a first flux pattern corresponding to the exterior switched reluctance machine and a second flux pattern corresponding to the interior switched reluctance machine, sharing at least a same region within the stator, are generated in the stator yoke in opposite directions when same or adjacent phases in the exterior switched reluctance machine and the interior switched reluctance machine are excited.

2. The switched reluctance machine of claim 1, wherein the filler segments are manufactured using a magnetic non-conductive material.

3. The switched reluctance machine of claim 1, wherein the magnetically isolated segments are manufactured using a magnetic conductive material.

4. The switched reluctance machine of claim 1, wherein the magnetic conductive material comprises electrical steel.

5. The switched reluctance machine of claim 1, wherein the interior switched reluctance machine and the exterior switched reluctance machine have a same number of phases.

6. The switched reluctance machine of claim 5, wherein a number of exterior stator poles comprising the concentrated coils to generate a magnetic field is same as a number of interior stator poles comprising the concentrated coils to generate a magnetic field.

7. The switched reluctance machine of claim 6, wherein each phase of the interior switched reluctance machine and a corresponding phase of the exterior switched reluctance machine have same winding polarity.

8. The switched reluctance machine of claim 6, wherein polarities of adjacent concentrated coils at a junction of adjacent phases in each of the interior switched reluctance machine and the exterior switched reluctance machine are identical.

9. A method of manufacturing a switched reluctance machine, the method comprising:
providing an interior rotor;
disposing an exterior rotor spaced from the interior rotor, the exterior rotor being concentrically disposed;
disposing a stator concentrically between the interior rotor and the exterior rotor, the stator comprising a stator yoke, the stator further having an exterior side comprising a plurality of exterior stator poles and an interior side comprising a plurality of interior stator poles;
providing an array of magnetically isolated segments and filler segments in the at least one of the interior rotor and the exterior rotor, wherein the interior rotor and the interior side of the stator are configured to provide an interior switched reluctance machine, and the exterior rotor and the exterior side of the stator are configured to provide an exterior switched reluctance machine
providing concentrated coils around each of the plurality of exterior stator poles and the plurality of interior stator poles, wherein adjacent concentrated coils are wound in opposite directions; and
exciting same or adjacent phases in the interior switched reluctance machine and the exterior switched reluctance machine to generate a first flux pattern corresponding to the exterior switched reluctance machine and a second flux pattern corresponding to the interior switched reluctance machine, wherein the first flux pattern and the second flux pattern are generated in opposite directions in at least a same region within the stator yoke of the stator.

10. The method of claim 9, further comprising providing a same number of phases to the interior switched reluctance machine and the exterior switched reluctance machine.

11. A switched reluctance machine comprising:
an interior rotor;
an exterior rotor spaced from the interior rotor, the interior rotor and the exterior rotor being concentrically disposed and at least one of the interior rotor and the exterior rotor comprising an array of magnetically isolated segments and filler segments; and
a stator disposed concentrically between the interior rotor and the exterior rotor, the stator comprising a stator yoke, the stator having an exterior side comprising a plurality of exterior stator poles and an interior side comprising a plurality of interior stator poles,
the interior rotor and the interior side of the stator, being configured to provide an interior switched reluctance machine, and the exterior rotor and the exterior side of the stator being configured to provide an exterior switched reluctance machine, wherein each of the plurality of exterior stator poles and the plurality of interior stator poles comprise concentrated coils with adjacent concentrated coils are wound in opposite directions, wherein a first winding polarity corresponding to the exterior switched reluctance machine and a second winding polarity corresponding to the interior switched reluctance machine are identical, and wherein, at junction of adjacent phases in each of the interior switched reluctance machine and the exterior switched reluctance machine, winding polarity is identical such that a first flux pattern corresponding to the exterior switched reluctance machine and a second flux pattern corresponding to the interior switched reluctance machine are generated in opposite directions in at least a same region within the stator yoke of the stator when same or adjacent phases in the exterior switched reluctance machine and the interior switched reluctance machine are excited.

12. The switched reluctance machine of claim 11, wherein the filler segments are manufactured using a magnetic non-conductive material and the magnetically isolated segments are manufactured using a magnetic conductive material.

13. The method of claim 9, wherein the filler segments are manufactured using a magnetic non-conductive material.

14. The method of claim 9, wherein the magnetically isolated segments are manufactured using a magnetic conductive material.

15. The method of claim 14, wherein the magnetic conductive material comprises electrical steel.

16. The method of claim 9, further comprising providing a same number of phases to the interior switched reluctance machine and the exterior switched reluctance machine.

17. The method of claim 16, further comprising providing the concentrated coils to generate a magnetic field to a same number of exterior stator poles and interior stator poles.

18. The method of claim 17, further comprising providing a same winding polarity to all phases of the interior switched reluctance machine and corresponding phases of the exterior switched reluctance machine.

19. The method of claim 17, further comprising providing identical winding polarity to adjacent coil windings at a junction of adjacent phases in each of the interior switched reluctance machine and the exterior switched reluctance machine.

20. The switched reluctance machine of claim 12, wherein the magnetic conductive material comprises electrical steel.

* * * * *